United States Patent
Nakano et al.

(10) Patent No.: US 7,240,922 B2
(45) Date of Patent: Jul. 10, 2007

(54) IMPACT-ABSORBING STEERING COLUMN APPARATUS

(75) Inventors: Junichi Nakano, Toyota (JP); Kenji Imamura, Toyota (JP); Shigeru Hoshino, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 385 days.

(21) Appl. No.: 10/511,303

(22) PCT Filed: Aug. 19, 2003

(86) PCT No.: PCT/JP03/10417

§ 371 (c)(1),
(2), (4) Date: Oct. 15, 2004

(87) PCT Pub. No.: WO2004/031020

PCT Pub. Date: Apr. 15, 2004

(65) Prior Publication Data

US 2005/0173912 A1 Aug. 11, 2005

(30) Foreign Application Priority Data

Oct. 7, 2002 (JP) ............................. 2002-293237
May 15, 2003 (JP) ............................. 2003-137823

(51) Int. Cl.
B62D 1/19 (2006.01)
(52) U.S. Cl. ..................................... 280/777
(58) Field of Classification Search ............... 280/775, 280/777; 74/492, 493
See application file for complete search history.

(56) References Cited

U.S. PATENT DOCUMENTS

| 3,392,599 | A | * | 7/1968 | White ......................... 74/492 |
| 4,989,898 | A | * | 2/1991 | Yamaguchi et al. ........ 280/777 |
| 5,259,818 | A | * | 11/1993 | Kachi et al. .................. 464/89 |
| 5,673,937 | A | * | 10/1997 | Fevre et al. ................. 280/777 |
| 5,961,146 | A | * | 10/1999 | Matsumoto et al. ........ 280/777 |
| 6,183,012 | B1 | * | 2/2001 | Dufour et al. .............. 280/777 |
| 6,189,929 | B1 | * | 2/2001 | Struble et al. .............. 280/777 |
| 6,224,104 | B1 | | 5/2001 | Hibino |
| 6,234,528 | B1 | * | 5/2001 | Ben-Rhouma et al. ...... 280/777 |
| 6,322,103 | B1 | | 11/2001 | Li et al. |
| 6,729,648 | B2 | * | 5/2004 | Ulintz ......................... 280/777 |
| 2002/0011724 | A1 | | 1/2002 | Satou et al. |

(Continued)

FOREIGN PATENT DOCUMENTS

EP 0 655 383 A1 5/1995

(Continued)

Primary Examiner—Paul N. Dickson
Assistant Examiner—Joseph Rocca
(74) Attorney, Agent, or Firm—Oliff & Berridge, PLC

(57) ABSTRACT

Collision-energy-absorbing means of an impact-absorbing steering column apparatus includes guide slots $31a1$ and $31b1$, guide slots $31a2$ and $31b2$, and transition portions $31a3$ and $31b3$, as well as energy-absorbing members 36 and 37, so as to change absorption load for secondary collision energy. A collar 42 plastically deforms the energy-absorbing member 36 or 37, thereby absorbing secondary collision energy of an occupant in the event of a collision of a vehicle. The guide slots $31a1$ and $31b1$, the guide slots $31a2$ and $31b2$, and the transition portions $31a3$ and $31b3$ change an absorption load for secondary collision energy dependently on the direction of a secondary collision of the occupant with the steering system.

25 Claims, 49 Drawing Sheets

U.S. PATENT DOCUMENTS

2002/0167157 A1 11/2002 Matsumoto et al.
2002/0171235 A1* 11/2002 Riefe et al. ............... 280/775
2004/0195811 A1 10/2004 Imamura et al.

FOREIGN PATENT DOCUMENTS

| FR | 2 708 551 A1 | 2/1995 |
|---|---|---|
| GB | 1 497 275 | 1/1978 |
| GB | 2 331 964 A | 6/1999 |
| JP | 49-68127 | 6/1974 |
| JP | A 10-53145 | 2/1998 |
| JP | A 11-165643 | 6/1999 |
| JP | A 2001-278071 | 10/2001 |
| JP | A 2002-67978 | 3/2002 |
| JP | A 2002-67979 | 3/2002 |
| JP | A 2002-67980 | 3/2002 |
| JP | A 2002-79944 | 3/2002 |
| JP | A 2002-284017 | 10/2002 |

* cited by examiner

IMPACT-ABSORBING STEERING COLUMN APPARATUS

TECHNICAL FIELD

The present invention relates to an impact-absorbing steering column apparatus having collision-energy-absorbing means for absorbing secondary collision energy of an occupant (driver) in the event of a collision of a vehicle.

BACKGROUND ART

A conventional impact-absorbing steering column apparatus effects absorption of secondary collision energy such that column drive means causes a steering column to retreat in relation to an occupant in accordance with the distance between the occupant and a steering wheel or the position of the steering column in relation to the occupant or such that energy absorption quantity adjustment means varies, in accordance with the distance or the position, the quantity of secondary impact energy to be absorbed by collision-energy-absorbing means. Such an impact-absorbing steering column apparatus is disclosed in, for example, Japanese Patent Application Laid-Open (kokai) No. 2002-79944.

The above-mentioned conventional impact-absorbing steering column apparatus is configured such that the column drive means and the energy absorption quantity adjustment means are operated under the control of an electrical control unit. The distance between the occupant and the steering wheel or the position of the steering column in relation to the occupant is electrically detected. On the basis of the detected distance or position, at least either the column drive means or the energy absorption quantity adjustment means is electrically controlled. Thus, a problem of high cost is involved.

DISCLOSURE OF THE INVENTION

The present invention has been accomplished in order to solve the above problem, and an object of the invention is to change an absorption load for secondary collision energy of an occupant in the event of a secondary collision of the occupant with a steering system, by means of a mechanical action effected by the secondary collision.

An aspect of the present invention provides an impact-absorbing steering column apparatus comprising collision-energy-absorbing means for absorbing secondary collision energy of an occupant in the event of a collision of a vehicle. The collision-energy-absorbing means comprises energy-absorption-load-changing means for changing an absorption load for the secondary collision energy. The energy-absorption-load-changing means is adapted to change the absorption load in accordance with displacement of a steering column, the displacement changing dependently on a secondary collision of the occupant with a steering system.

According to the present invention, for example, in the event of a collision of the vehicle, the occupant moves in a certain direction toward the front of the vehicle while having certain kinetic energy, depending on whether or not the occupant wears a seat belt, a collision speed, a seat position, and like factors; and a certain secondary collision load is input to the steering system along a certain direction of a secondary collision.

Thus, the energy-absorption-load-changing means of the collision-energy-absorbing means can change the absorption load for secondary collision in accordance with displacement of the steering column, the displacement changing dependently on a secondary collision of the occupant with the steering system. In other words, in accordance with the direction of the secondary collision of the occupant with the steering system and/or the magnitude of the collision load, the steering column is displaced or allowed to be readily displaced in a direction different from a direction along which the steering column moves in relation to the vehicle body toward the front of the vehicle while absorbing energy. By means of association of displacement of the steering column with an action of the energy-absorption-load-changing means, an absorption load to be generated by the energy-absorption-load-changing means can be changed in accordance with the displacement of the steering column.

Another aspect of the present invention provides an impact-absorbing steering column apparatus comprising collision-energy-absorbing means for absorbing secondary collision energy of an occupant in the event of a collision of a vehicle. The collision-energy-absorbing means comprises energy-absorption-load-changing means for changing an absorption load for the secondary collision energy. The energy-absorption-load-changing means is adapted to change the absorption load in accordance with displacement of the steering column in a direction intersecting a direction of relative movement of the steering column for absorbing collision energy induced by a secondary collision of the occupant.

According to the present invention, for example, in the event of a collision of the vehicle, the occupant moves in a certain direction toward the front of the vehicle while having certain kinetic energy, depending on whether or not the occupant wears a seat belt, a collision speed, a seat position, and like factors; and a certain secondary collision load is input to the steering system along a certain direction of a secondary collision.

Thus, by utilizing displacement of the steering column in a direction intersecting a direction along which the steering column moves in relation to the vehicle body toward the front of the vehicle while absorbing collision energy, the energy-absorption-load-changing means adapted to absorb energy can change an absorption load. In other words, in accordance with the direction of the secondary collision of the occupant with the steering system and/or the magnitude of the collision load, the steering column is displaced or allowed to be readily displaced in a direction different from a direction along which the steering column moves in relation to the vehicle body toward the front of the vehicle while absorbing energy. By means of association of displacement of the steering column with an action of the energy-absorption-load-changing means, an absorption load to be generated by the energy-absorption-load-changing means can be changed in accordance with the displacement of the steering column.

According to a further aspect of the present invention, the energy-absorption-load-changing means changes the absorption load in accordance with a mode of displacement of the steering column. According to the present invention, for example, an absorption load to be generated by the energy-absorption-load-changing means is changed in accordance with a mode of displacement of the steering column, so that the absorption load can be changed in accordance with the displaced position of the steering column.

According to a further aspect of the present invention, the energy-absorption-load-changing means comprises an energy-absorbing member, and engagement means capable of engaging with the energy-absorbing member, and an engagement relation between the energy-absorbing member and the engagement means varies in accordance with a mode of displacement of the steering column, thereby changing the absorption load. According to the present invention, for example, the engagement relation between the energy-absorbing member and the engagement means can be varied in accordance with a mode of displacement of the steering column, whereby the absorption load can be changed.

According to a further aspect of the present invention, the engagement means is squeezing means for squeezing the energy-absorbing member; the energy-absorbing member has an energy-absorbing portion, which is squeezed by the squeezing means to thereby absorb energy; and an engagement relation between the squeezing means and the energy-absorbing portion varies in accordance with a mode of displacement of the steering column, thereby changing the absorption load. According to the present invention, for example, the engagement relation between the squeezing means and the energy-absorbing portion is varied in accordance with a mode of displacement of the steering column, whereby the absorption load can be changed.

According to a further aspect of the present invention, the engagement means is squeezing means for squeezing the energy-absorbing member; the energy-absorbing member has a plurality of energy-absorbing portions that differ in energy absorption load in relation to the squeezing means; and an engagement between the squeezing means and one of the plurality of energy-absorbing portions is selected in accordance with a mode of displacement of the steering column, thereby changing the absorption load. According to the present invention, for example, an engagement between the squeezing means and one of the plurality of energy-absorbing portions is selected in accordance with a mode of displacement of the steering column, whereby the absorption load can be changed.

According to a further aspect of the present invention, the engagement means is squeezing means for squeezing the energy-absorbing member; the squeezing means has a plurality of squeezing portions that differ in the quantity of draw/squeeze in squeezing the energy-absorbing member; and an engagement between the energy-absorbing member and one of the plurality of squeezing portions is selected in accordance with a mode of displacement of the steering column, thereby changing the absorption load. According to the present invention, for example, an engagement between the squeezing means and one of the plurality of squeezing portions is selected in accordance with a mode of displacement of the steering column, whereby the absorption load can be changed.

According to a further aspect of the present invention, the energy-absorbing member is a linear member capable of engaging with the engagement means; the engagement means is engaged with or is not engaged with the linear member in accordance with a mode of displacement of the steering column, thereby changing the absorption load. According to the present invention, for example, the engagement means is engaged with or is not engaged with the linear member in accordance with a mode of displacement of the steering column, whereby the absorption load can be changed.

According to a further aspect of the present invention, the energy-absorbing member is a plurality of linear members capable of engaging with the engagement means; the number of the linear members to be engaged with the engagement means varies in accordance with a mode of displacement of the steering column, thereby changing the absorption load. According to the present invention, for example, the number of the linear members to be engaged with the engagement means varies in accordance with a mode of displacement of the steering column, whereby the absorption load can be changed.

According to a further aspect of the present invention, the steering column comprises the energy-absorbing member, a ball adapted to plastically deform the energy-absorbing member, and ball support means for adjusting the quantity of plastic deformation to be effected by the ball; and the ball support means is moved in accordance with a mode of displacement of the steering column in such a manner as to vary an engagement relation between the energy-absorbing member and the ball in accordance with the mode, thereby changing the absorption load. According to the present invention, for example, the ball support means is moved in such a manner as to vary the engagement relation between the energy-absorbing member and the ball in accordance with a mode of displacement of the steering column, whereby the absorption load can be changed.

According to a further aspect of the present invention, the energy-absorbing member has an elongated groove having a predetermined width; the engagement means is squeezing means assuming a special shape and capable of being displaced in the elongated groove in relation to the energy-absorbing member; and an engagement relation between the special-shape squeezing means and the elongated groove of the energy-absorbing member varies in accordance with a mode of displacement of the steering column, thereby changing the absorption load. According to the present invention, for example, the engagement relation between the special-shape squeezing means and the elongated groove of the energy-absorbing member varies in accordance with a mode of displacement of the steering column, whereby the absorption load can be changed.

According to a further aspect of the present invention, an energy-absorbing member is provided on either a vehicle-body-side member or the steering column, the energy-absorbing member generating an energy absorption load by means of displacement in relation to either the vehicle-body-side member or the steering column on which the energy-absorbing member is provided; the engagement means capable of engaging with the energy-absorbing member is provided on either the vehicle-body-side member or the steering column on which the energy-absorbing member is not provided; and when the energy-absorbing member is engaged with the engagement means in accordance with a mode of displacement of the steering column, the mode changing dependently on a secondary collision, the energy-absorbing member incrementally changes the absorption load by means of displacement in relation to either the vehicle-body-side member or the steering column on which the energy-absorbing member is provided. According to the present invention, for example, when the energy-absorbing member is engaged with the engagement means in accordance with a mode of displacement of the steering column, the mode of displacement changing dependently on a secondary collision, the energy-absorbing member can incrementally change the absorption load by means of displacement in relation to either the vehicle-body-side member or the steering column on which the energy-absorbing member is provided.

According to a further aspect of the present invention, the energy-absorption-load-changing means changes the absorption load in accordance with displacement of the steering column, the displacement changing dependently on the direction of a secondary collision of the occupant with the steering system. According to the present invention, for example, the energy-absorption-load-changing means can change the absorption load in accordance with displacement of the steering column, the displacement changing dependently on the direction of a secondary collision of the occupant with the steering system.

According to a further aspect of the present invention, the energy-absorption-load-changing means changes the absorption load in accordance with displacement of the steering column, the displacement changing dependently on the direction of a secondary collision of the occupant with the steering system at an initial stage of the secondary collision. According to the present invention, for example, the energy-absorption-load-changing means can change the absorption load in accordance with displacement of the steering column, the displacement changing dependently on the direction of a secondary collision of the occupant with the steering system at an initial stage of the secondary collision.

According to a further aspect of the present invention, when a collision load associated with a secondary collision of the occupant with the steering system is equal to or greater than a predetermined value, the energy-absorption-load-changing means increases the absorption load. According to the present invention, for example, when a collision load associated with a secondary collision of the occupant with the steering system is equal to or greater than a predetermined value, the energy-absorption-load-changing means can increase the absorption load.

According to a further aspect of the present invention, the energy-absorption-load-changing means increases the absorption load in accordance with such displacement that the steering column tilts upward as a result of a secondary collision of the occupant with the steering system. According to the present invention, for example, the energy-absorption-load-changing means can increase the absorption load in accordance with such displacement that the steering column tilts upward as a result of a secondary collision of the occupant with the steering system.

According to a further aspect of the present invention, the energy-absorption-load-changing means changes the absorption load in accordance with a direction of displacement of the steering column, the direction of displacement changing dependently on the direction of a secondary collision of the occupant with the steering system. According to the present invention, for example, the energy-absorption-load-changing means can increase the absorption load in accordance with the displaced position of the steering column, the displaced position changing dependently on the direction of a secondary collision of the occupant with the steering system.

According to a further aspect of the present invention, impact-absorbing means for absorbing a predetermined collision load is provided separately from the collision-energy-absorbing means. According to the present invention, for example, the impact-absorbing means for absorbing a predetermined collision load can be provided separately from the collision-energy-absorbing means.

According to a further aspect of the present invention, the collision-energy-absorbing means selectively provides the absorption load, or changes the magnitude of the absorption load. According to the present invention, for example, the collision-energy-absorbing means can determine whether to effect the absorption load or can change the magnitude of the absorption load.

According to a further aspect of the present invention, in accordance with a load of pressing the steering column against a vehicle-body-side member and a load of moving the steering column toward the front of the vehicle, the loads changing dependently on a secondary collision of the occupant with the steering system, deformation of an energy-absorbing member provided on either the steering column or the vehicle-body-side member is passively changed by engagement means provided on either the steering column or the vehicle-body-side member on which the energy-absorbing member is not provided, whereby the energy-absorption-load-changing means changes the absorption load. According to the present invention, for example, in accordance with a load of pressing the steering column against the vehicle-body-side member and a load of moving the steering column toward the front of the vehicle, the loads changing dependently on a secondary collision of the occupant with the steering system, deformation of the energy-absorbing member provided on either the steering column or the vehicle-body-side member is passively changed by the engagement means provided on either the steering column or the vehicle-body-side member on which the energy-absorbing member is not provided, whereby the absorption load can be changed.

According to a further aspect of the present invention, the engagement means is formed on the vehicle-body-side member; the energy-absorbing member is provided on the steering column in opposition to the engagement means and assumes an elongated shape extending along an axis of the steering column; and the engagement means provided on the vehicle-body-side member causes the deformation of the energy-absorbing member provided on the steering column. According to the present invention, for example, the engagement means is formed on the vehicle-body-side member; the energy-absorbing member is provided on the steering column in opposition to the engagement means and assumes an elongated shape extending along the axis of the steering column; and the engagement means provided on the vehicle-body-side member can cause the deformation of the energy-absorbing member provided on the steering column.

According to a further aspect of the present invention, only when a collision load imposed on the vehicle-body-side member from the steering column is equal to or greater than a predetermined value, abutment between the engagement means and the energy-absorbing member is enabled. According to the present invention, for example, only when a collision load imposed on the vehicle-body-side member from the steering column is equal to or greater than a predetermined value, the engagement means can abut the energy-absorbing member.

According to a further aspect of the present invention, in the event of a secondary collision, the steering column is allowed to be displaced in such a manner as to tilt toward the vehicle-body-side member. According to the present invention, for example, in the event of a secondary collision, the steering column can be displaced in such a manner as to tilt toward the vehicle-body-side member.

According to a further aspect of the present invention, the absorption load is increased with a load of pressing the steering column against the vehicle-body-side member. According to the present invention, for example, the absorption load can be increased with the load of pressing the steering column against the vehicle-body-side member.

According to a further aspect of the present invention, impact-absorbing means for absorbing a predetermined collision load is provided separately from the collision-energy-absorbing means. According to the present invention, for example, the impact-absorbing means for absorbing a predetermined collision load can be provided separately from the collision-energy-absorbing means.

BEST MODE FOR CARRYING OUT THE INVENTION

Figure 1:
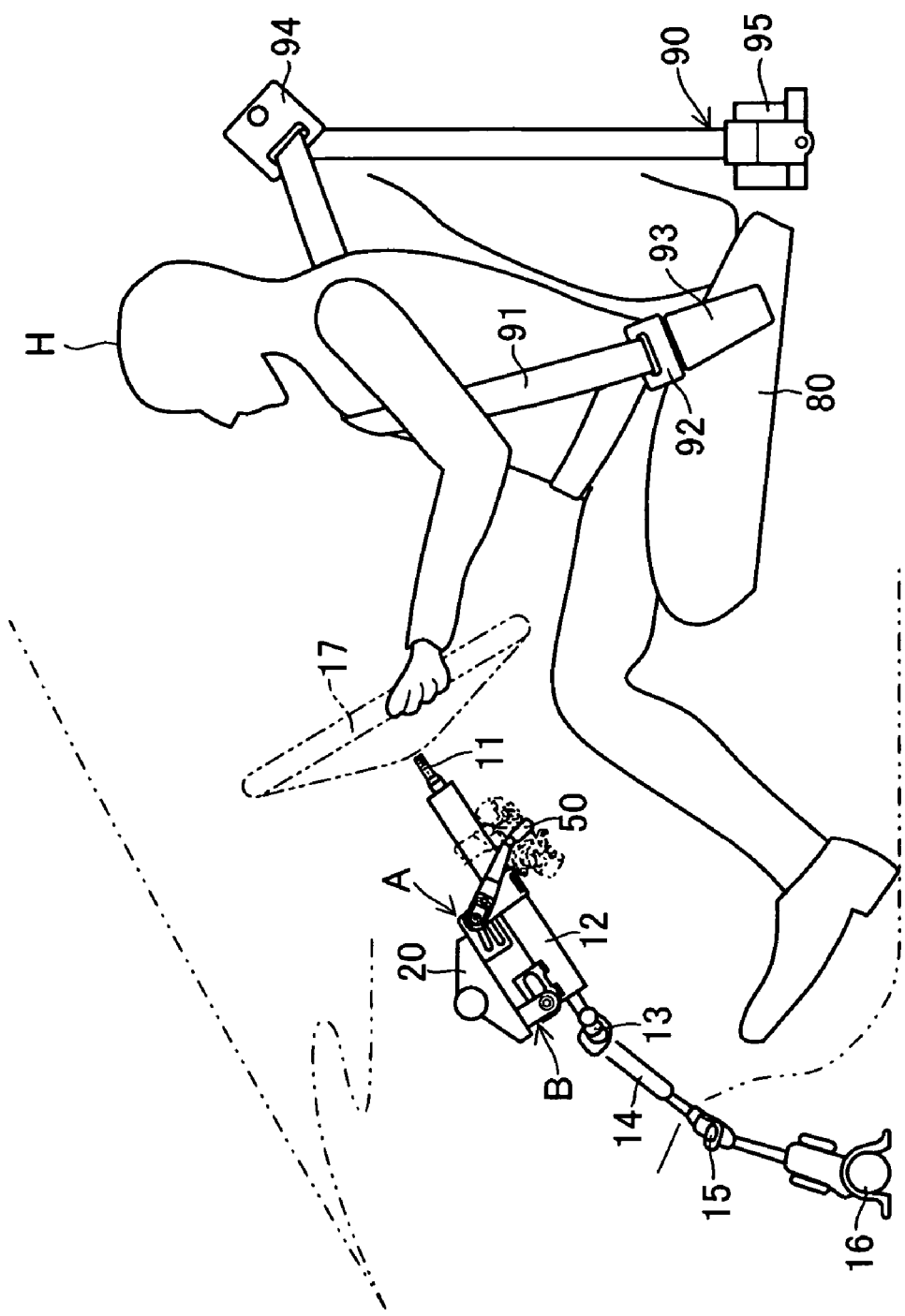
FIG. 1 is a side view showing a first embodiment of an impact-absorbing steering column apparatus according to the present invention.

Embodiments of the present invention will next be described in detail with reference to the drawings. FIGS. 1 to 8 show a first embodiment of an impact-absorbing steering column apparatus according to the present invention. In the first embodiment, a steering column 12 supports a steering shaft 11 rotatably and in an axially unmovable condition and is supported by a steering mounting member 20, which is a portion of a vehicle body, at a predetermined tilt angle by means of an upper support mechanism A and a lower support mechanism B.

The lower end (front end) of the steering shaft 11 is linked to an intermediate shaft 14, which can extend and contract and can transmit torque, via a universal joint 13. A steering wheel 17, into which an airbag device is incorporated, is attached to the upper end (rear end) of the steering shaft 11 in a unitarily rotatable condition.

Figure 2:
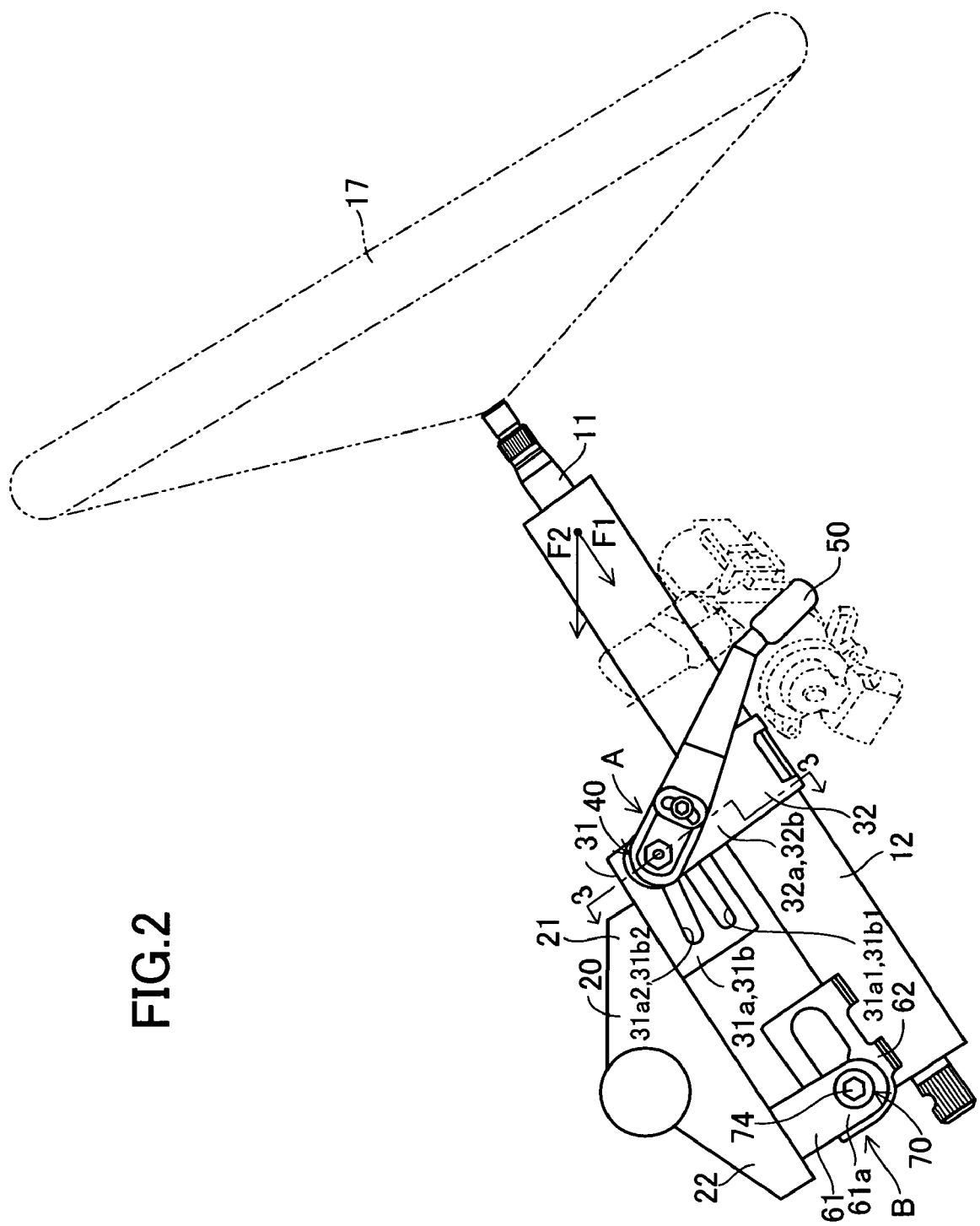
FIG. 2 is an enlarged side view showing essential portions of FIG. 1.
Figure 3:
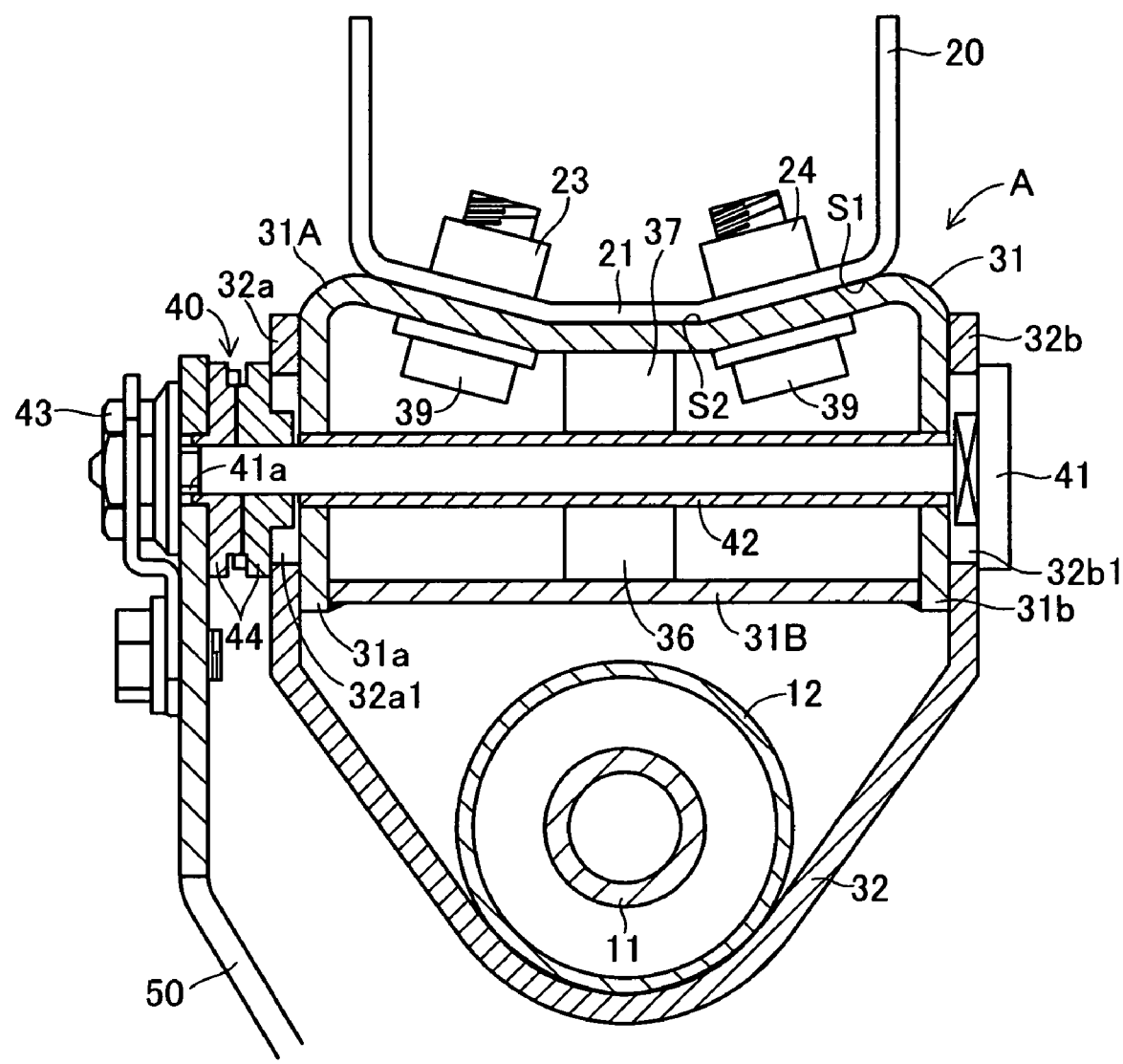
FIG. 3 is an enlarged sectional view taken along line 3-3 of FIG. 2.
Figure 4:
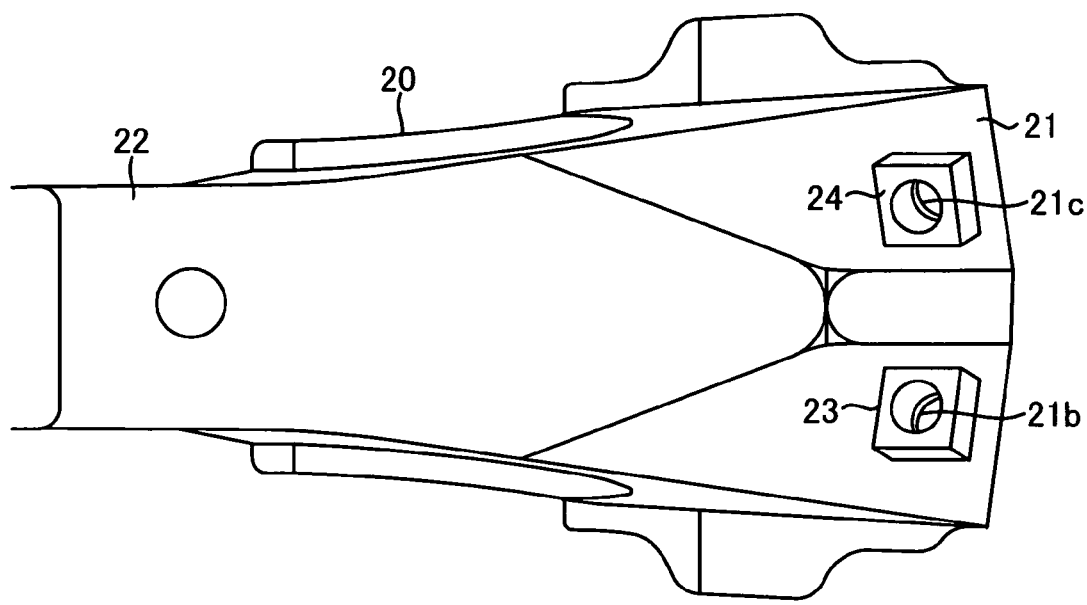
FIG. 4 is an enlarged plan view of a steering mounting member shown in FIGS. 1 to 3.

The upper support mechanism A is adapted to support an upper region of the steering column 12. During ordinary use, the upper support mechanism A supports the upper region of the steering column 12 such that the steering column 12 can be vertically moved for adjustment (the tilt of the steering column 12 can be adjusted). In the event of a secondary collision that accompanies a collision of the vehicle, the upper support mechanism A supports the upper region of the steering column 12 such that the steering column 12 can tilt upward and can move frontward along its axis. As shown in FIGS. 1 to 3, the upper support mechanism A includes a support bracket 31 made of an iron plate, a column-side bracket 32 made of an iron plate, clamp means 40, and an operation lever 50 used to operate the clamp means 40. The support bracket 31 has laterally paired arms 31a and 31b extending downward and is fixedly attached to the steering mounting member 20 by use of laterally paired mounting bolts 39. The column-side bracket 32 has laterally paired arms 32a and 32b extending upward and is welded to the steering column 12. The clamp means 40 is adapted to frictionally engage the arms 32a and 32b of the column-side bracket 32 with the arms 31a and 31b of the support bracket 31 in a fixed condition or to disengage them.

As shown in FIGS. 1 to 4, the steering mounting member 20 has a mounting portion 21 in its upper region for attachment of the upper support mechanism A and a mounting portion 22 in its lower region for attachment of the lower support mechanism B. As shown in FIG. 3, the mounting portion 21 for the upper support mechanism A has a substantially U-shaped cross section, and a substantially V-shaped convex surface S1 located at its lower end. Laterally paired bolt insertion holes 21b and 21c are formed in the mounting portion 21 and allow the corresponding mounting bolts 39 to extend therethrough. Laterally paired nuts 23 and 24 into which the corresponding mounting bolts 39 are screwed are welded to the mounting portion 21 in alignment with the bolt insertion holes 21b and 21c, respectively.

Figure 6:
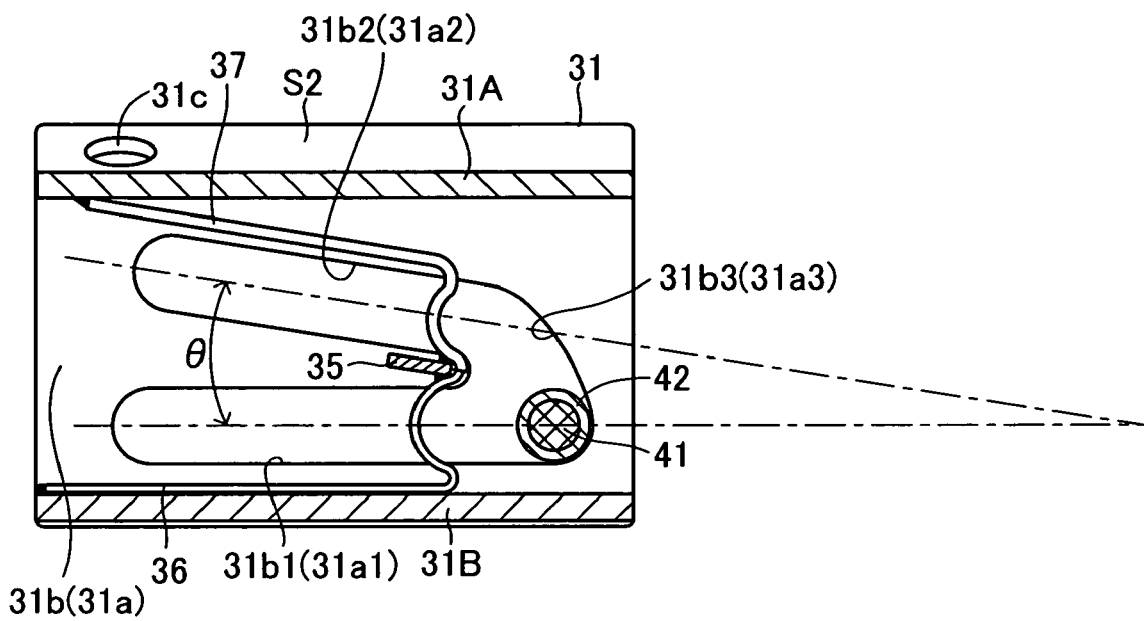
FIG. 6 is a vertical, longitudinal sectional view showing the configurational relation among a support bracket, energy-absorbing members, a bush, a collar, and a bolt, among others shown in FIG. 3.

As shown in FIGS. 3 and 6, the support bracket 31 is composed of a plate 31A and a reinforcement plate 31B. The plate 31A has a substantially M-shaped cross section, and a substantially V-shaped concave surface S2 located at its top and coming into close contact with the substantially V-shaped convex surface S1 of the steering mounting member 20. The reinforcement plate 31B is welded to laterally opposite lower end portions of the plate 31A so as to reinforce the plate 31A. The plate 31A includes the laterally paired arms 31a and 31b extending downward. Laterally paired bolt insertion holes 31c (see FIG. 6) are formed in the plate 31A and allow the corresponding mounting bolts 39 to extend therethrough. As shown in FIGS. 1 and 2, laterally paired guide slots 31a1 and 31b1 extending frontward and laterally paired guide slots 31a2 and 31b2 extending frontward are formed in the arms 31a and 31b.

As shown in FIGS. 1, 2, and 6, the lower guide slots 31a1 and 31b1 are formed linearly, substantially in parallel with the axial direction of the steering column 12. The lower guide slots 31a1 and 31b1 and the corresponding upper guide slots 31a2 and 31b2 communicate with each other via corresponding transition portions 31a3 and 31b3 located at rear end portions of the guide slots. As shown in FIG. 6, the upper guide slots 31a2 and 31b2 are formed linearly and extend upward at a predetermined angle θ with respect to the corresponding lower guide slots 31a1 and 31b1.

As shown in FIGS. 1, 2, 3, and 5, the column-side bracket 32 includes the laterally paired arms 32a and 32b, which extend upward and are slidably engaged with the corresponding arms 31a and 31b of the support bracket 31 from the outside. Arcuately elongated holes 32a1 and 32b1 are formed in the corresponding arms 32a and 32b arcuately about support center O1 of the lower support mechanism B.

As shown in FIGS. 1 to 3, the clamp means 40 includes a nonrotatable lock bolt 41, a collar 42, a nut 43, and a pair of laterally adjacent cam plates 44. The lock bolt 41 extends through the arcuately elongated holes 32a1 and 32b1 formed in the laterally opposite arms 32a and 32b of the column-side bracket 32 and through the guide slots 31a1 and 31b1 or the guide slots 31a2 and 31b2 formed respectively in the laterally opposite arms 31a and 31b of the support bracket 31. The collar 42 is fitted onto the lock bolt 41 while extending between the laterally opposite arms 32a and 32b of the column-side bracket 32 and is fitted, at its laterally opposite end portions, into the guide slots 31a1 and 31b1 or the guide slots 31a2 and 32b2. The nut 43 is screwed on an externally threaded portion 41a of the lock bolt 41 and rotated by means of the operation lever 50. The paired cam plates 44 are mounted on the lock bolt 41 between the operation lever 50 and the left arm 32a of the column-side bracket 32. The detailed configuration of the paired, laterally adjacent cam plates 44 is the same as hat described in Japanese Patent Application Laid-Open (kokai) No. 2000-62624; therefore, repeated description thereof is omitted.

The clamp means 40 functions as follows. When the operation lever 50 is rotated counterclockwise in FIG. 1, the nut 43 is fastened to the lock bolt 41, and the paired cam plates 44 convert rotation of the operation lever 50 to an axial stroke of the lock bolt 41. As a result, a predetermined frictional engagement is established between the arms 31a and 32a of the brackets 31 and 32 and between the arms 31b and 32b of the brackets 31 and 32, whereby the column-side bracket 32 is fixed (locked) to the support bracket 31. When the operation lever 50 is rotated clockwise in FIG. 1, the nut 43 is loosened, and thus the above frictional engagement is canceled. As a result, the column-side bracket 32 becomes tiltable in relation to the support bracket 31.

In the first embodiment, as shown in FIGS. 3 and 6, a support plate 35 is attached to the support bracket 31, and vertically paired energy-absorbing members 36 and 37 are also attached to the support bracket 31. The support plate 35 extends laterally within the support bracket 31 and is welded, at its laterally opposite ends, to the arms 31a and 31b of the support bracket 31.

The lower energy-absorbing member 36 is provided for use with the lower guide slots 31a1 and 31b1, and is a thin elongated plate having a predetermined width (a plate whose absorption load is small when absorbing secondary collision energy). In the event of a secondary collision that accompanies a collision of the vehicle, when the column-side bracket 32 moves frontward by a set value or more in relation to the support bracket 31 and thus the lock bolt 41 and the collar 42 move frontward along the guide slots 31a1 and 31b1, the energy-absorbing member 36 is squeezed by the lock bolt 41 and the collar 42 and plastically deformed, thereby absorbing secondary collision energy. The energy-absorbing member 36 is welded, at its rear end, to the support plate 35 and welded, at its front end, to the upper surface of the reinforcement plate 31B of the support bracket 31.

The upper energy-absorbing member 37 is provided for use with the upper guide slots 31a2 and 31b2, and is a thick elongated plate having a predetermined width (a plate whose absorption load is large when absorbing secondary collision energy). In the event of a secondary collision that accompanies a collision of the vehicle, when the column-side bracket 32 moves frontward by a set value or more in relation to the support bracket 31 and thus the lock bolt 41 and the collar 42 move frontward along the guide slots 31a2 and 31b2, the energy-absorbing member 37 is squeezed by the lock bolt 41 and the collar 42 and plastically deformed, thereby absorbing secondary collision energy. The energy-absorbing member 37 is welded, at its rear end, to the support plate 35 and welded, at its front end, to the lower surface of the upper wall of the plate 31A of the support bracket 31.

Figure 5:
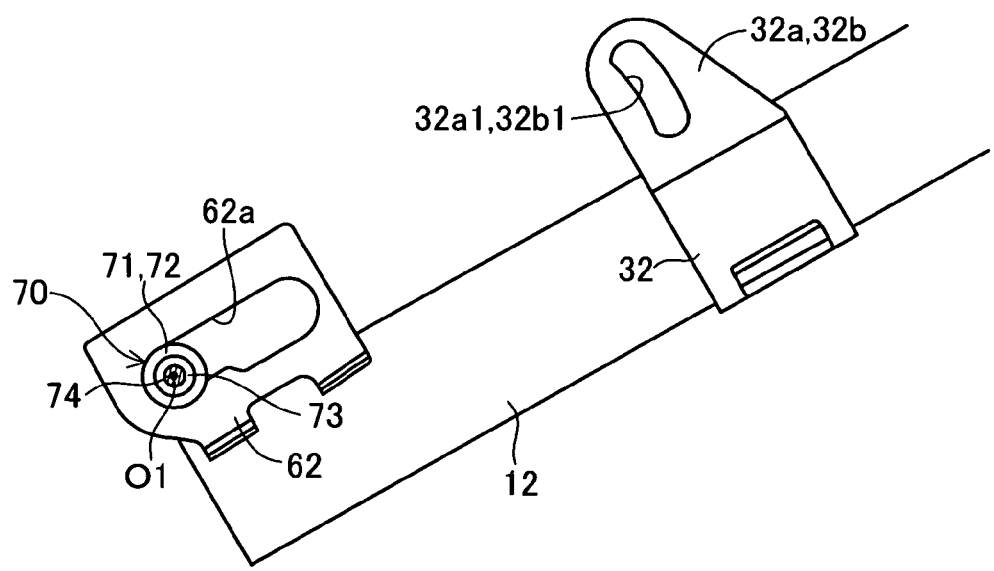
FIG. 5 is an enlarged side view partially showing a steering column, an upper support mechanism, and a lower support mechanism shown in FIGS. 1 and 2.

The lower support mechanism B is adapted to support a lower region of the steering column 12. During ordinary use, the lower support mechanism B supports the lower region of the steering column 12 in a tiltable (pivotable) condition. In the event of a secondary collision that accompanies a collision of the vehicle, the lower support mechanism B supports the steering column 12 such that the steering column 12 can move frontward along its axis. As shown in FIGS. 1, 2, and 5, the lower support mechanism B is composed of a vehicle-body-side bracket 61 made of an iron plate, a column-side bracket 62 made of an iron plate, and connection means 70. The vehicle-body-side bracket 61 includes laterally paired arms 61a extending downward and is fixed to the steering mounting member 20. The column-side bracket 62 has a cross section resembling a squarish letter U and is welded to the steering column 12 at an upper portion of the column's outer circumferential surface in the column's lower region. The connection means 70 connects the column-side bracket 62 to the vehicle-body-side bracket 61 such that the column-side bracket 62 is movable along the column axis and tiltable.

The connection means 70 is composed of laterally paired resin bushes 71 and 72, a collar 73, a bolt 74, and a nut (welded to the right-hand arm of the vehicle-body-side bracket 61), into which the bolt 74 is screwed in a fixed condition. The bushes 71 and 72 are fitted to corresponding laterally paired elongated holes 62a formed in the column-side bracket 62 and extending along the column axis and break under a predetermined load. The collar 73 is fitted into the resin bushes 71 and 72 and engaged, at its opposite ends, with the arms 61a of the vehicle-body-side bracket 61. The bolt 74 extends through the collar 73 and through round mounting holes formed in the corresponding arms 61a of the vehicle-body-side bracket 61 and unites the resin bushes 71 and 72 and the collar 73 with the vehicle-body-side bracket 61.

In the first embodiment, as shown in FIG. 1, a seat belt device 90 is attached to a seat 80 for an occupant H. The seat belt device 90 includes a seat belt 91, a tongue plate 92, a buckle 93, and a shoulder belt anchor 94, as well as a retractor 95 into which a pretensioner mechanism and a force limiter mechanism are incorporated. When the occupant H wears the seat belt 91, the seat belt 91 can restrain the occupant H.

In the thus-configured first embodiment, when the clamp means 40 of the upper support mechanism A is unlocked by means of rotating the operation lever 50 clockwise in FIGS. 1 and 2, the frictional engagement is canceled between the arms 31a and 32a of the brackets 31 and 32 and between the arms 31b and 32b of the brackets 31 and 32. Thus, the steering column 12 becomes movable (tiltable) by a predetermined amount along the elongated holes 32a1 and 32b1 of the column-side bracket 32. Since the lower support mechanism B always allows the column-side bracket 62 to move in a tilting condition in relation to the vehicle-body-side bracket 61, the tilt of the steering wheel 17 can be adjusted by means of vertically moving the steering column 12 within a tiltable range.

When the clamp means 40 of the upper support mechanism A is locked by means of rotating the operation lever 50 counterclockwise in FIGS. 1 and 2, a predetermined frictional engagement is established between the arms 31a and 32a of the brackets 31 and 32 and between the arms 31b and 32b of the brackets 31 and 32, whereby the column-side bracket 32 is fixed to the support bracket 31. Thus, the steering column 12 is fixedly supported by the steering mounting member 20, which is a portion of a vehicle body, at a predetermined tilt angle by means of the upper support mechanism A and the lower support mechanism B.

For example, in the event of a collision of the vehicle while the occupant H wears the seat belt 91, the first embodiment functions as follows. Since the occupant H is restrained by the seat belt 91, the occupant H moves frontward while bending himself/herself forward. At the initial stage of a secondary collision of this case, a collision load from the occupant H is exerted on the steering column 12 in the direction of F1 (along the axis of the steering column 12) in FIG. 2 via the steering wheel 17 and the steering shaft 11. As a result of the collision load overcome the above-mentioned frictional engagement and a rupture load of the bushes 71 and 72, the steering column 12 moves frontward along its axial direction.

Figure 7:
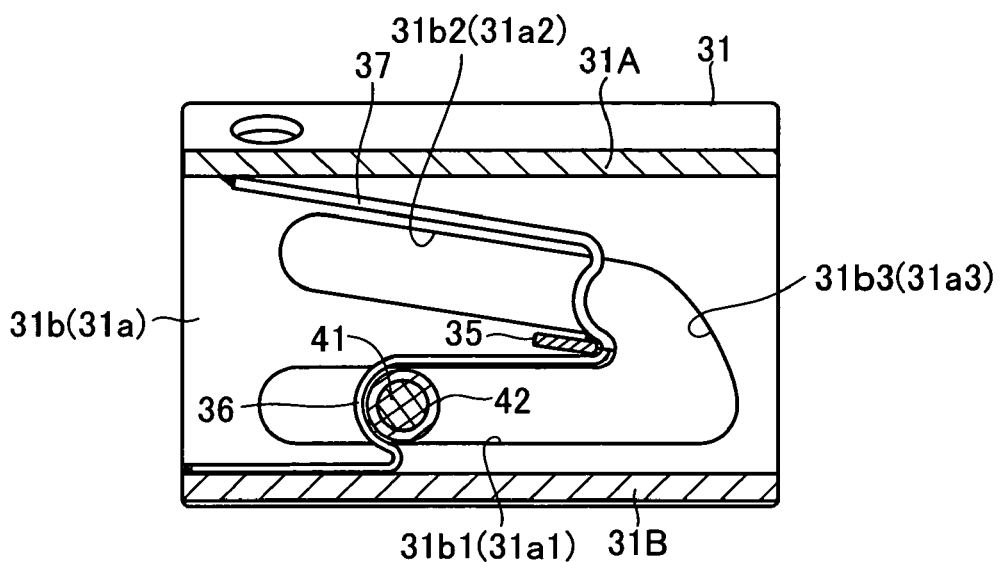
FIG. 7 is an explanatory view for explaining the action of essential portions when the steering column moves frontward in the event of a collision of the vehicle in the case of an occupant wearing a seat belt.

When the steering column 12 moves frontward along its axial direction, as shown in FIG. 7, the lock bolt 41 and the collar 42 in the upper support mechanism A move frontward along the guide slots 31a1 and 31b1, thereby plastically deforming the lower energy-absorbing member 36. The plastic deformation yields a small absorption load for secondary collision energy. In this case, the seat belt device 90 functions; and an air bag device incorporated in the steering wheel 17, and the energy-absorbing member 36, which is provided for use with the lower guide slots 31a1 and 31b1 in the upper support mechanism A, function sequentially, thereby absorbing secondary collision energy of the occupant H.

In the event of a collision of the vehicle while the occupant H does not wear the seat belt 91, since the occupant H is not restrained by the seat belt 91, the occupant H moves frontward inertially. As a result, at the initial stage of a secondary collision of this case, a collision load is exerted on the steering column 12 in the direction of F2 in FIG. 2. As a result of the collision load overcome the above-mentioned frictional engagement and the rupture load of the bushes 71 and 72, the steering column 12 moves frontward along its axial direction while being displaced in a tilting-upward manner.

Figure 8:
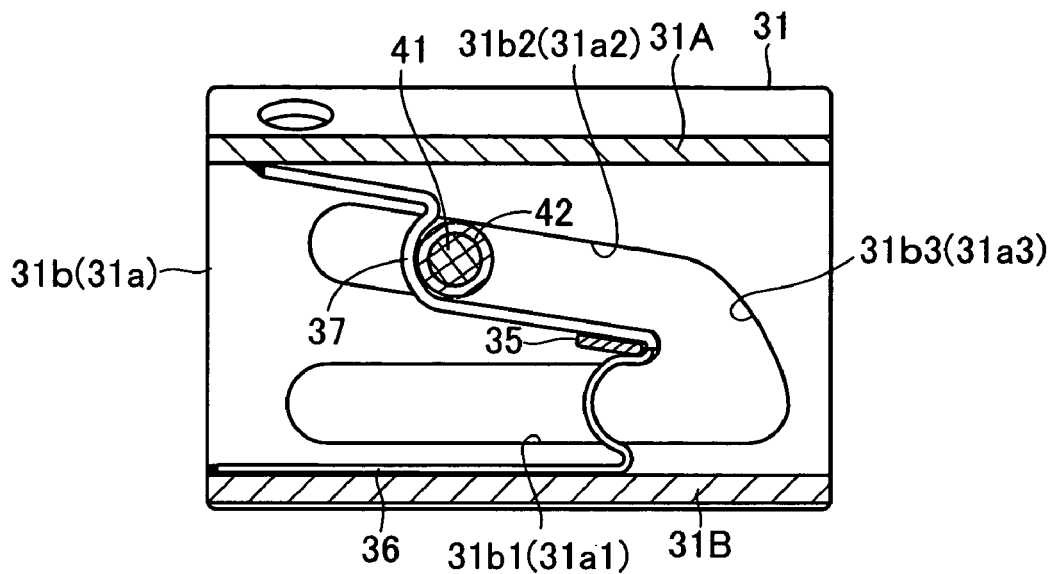
FIG. 8 is an explanatory view for explaining the action of essential portions when the steering column moves frontward in the event of a collision of the vehicle in the case of the occupant not wearing the seat belt.

In this case, in the upper support mechanism A, the lock bolt 41 and the collar 42 move from rear end portions of the lower guide slots 31a1 and 31b1 to rear end portions of the upper guide slots 31a2 and 31b2 via the transition portions 31a3 and 31b3. Subsequently, as shown in FIG. 8, the lock bolt 41 and the collar 42 move frontward along the upper guide slots 31a2 and 31b2, thereby plastically deforming the upper energy-absorbing member 37. The plastic deformation yields a large absorption load for secondary collision energy. In this case, the air bag device incorporated in the steering wheel 17, and the energy-absorbing member 37, which is provided for use with the upper guide slots 31a2 and 31b2 in the upper support mechanism A, function sequentially, thereby absorbing secondary collision energy of the occupant H.

As described above, according to the first embodiment, in the event of a collision of the vehicle, in accordance with, for example, whether or not the occupant H wears the seat belt 91, the occupant H moves frontward in a certain direction while having certain kinetic energy; and a certain secondary collision load (for example, F1 or F2) is input to the steering column 12 along a certain direction of a secondary collision. Thus, at the initial stage of a secondary collision of the occupant H with the steering system, the steering column 12 is displaced in the direction of the secondary collision while being guided by the guide slots provided in the support bracket 31; specifically, by the guide slots 31a1 and 31b1, the guide slots 31a2 and 31b2, and the transition portions 31a3 and 31b3. The displacement causes the energy-absorbing member 36 provided for use with the guide slots 31a1 and 31b1 or the energy-absorbing member 37 provided for use with the guide slots 31a2 and 31b2 to function, whereby in the event of a secondary collision an absorption load for secondary collision energy is changed.

As described above, according to the first embodiment, in the event of a secondary collision of the occupant H with the steering system, energy-absorption-load-changing means including the guide slots 31a1 and 31b1, the guide slots 31a2 and 31b2, and the transition portions 31a3 and 31b3 provided in the support bracket 31 changes the absorption load by means of a mechanical action effected in accordance with the direction of a secondary collision of the occupant H with the steering system. In other words, the first embodiment can be mechanically implemented by means of appropriately setting, for example, the shape of the guide slots 31a1 and 31b1, the shape of the guide slots 31a2 and 31b2, the shape of the transition portions 31a3 and 31b3, and the shape of the energy-absorbing members 36 and 37, without need to employ electrical control, whose cost is high, and thus at low cost.

In the above-described first embodiment, the lower energy-absorbing member 36 is formed of a thin, elongated plate having a predetermined width, and the upper energy-absorbing member 37 is formed of a thick, elongated plate having a predetermined width. However, the energy-absorbing members 36 and 37 may be embodied as follows: the lower energy-absorbing member 36 is formed of a narrow, elongated plate having a predetermined thickness, and the upper energy-absorbing member 37 is formed of a wide, elongated plate having the predetermined thickness.

According to the above-described first embodiment, the present invention is embodied in relation to a steering column assembly having a tilt function. However, the present invention may be similarly embodied in relation to a steering column assembly having no tilt function. In the above-described first embodiment, two pairs of guide slots 31a1 and 31b1, and 31a2 and 31b2, are provided in the support bracket 31, and the energy-absorbing members 36 and 37 are provided for use with the corresponding guide slots. However, the number of guide slots and the number of energy-absorbing members may be increased as appropriate.

In the above-described first embodiment, two pairs of guide slots 31a1 and 31b1, and 31a2 and 31b2, and two kinds of corresponding energy-absorbing members 36 and 37 are provided in the support bracket 31, which is a vehicle-body-side member in the upper support mechanism A. However, the following configuration may be employed: two guide means are provided in the column-side bracket 32, which is a column-side member in the upper support mechanism A, and two kinds of energy-absorbing members are provided which correspond to these guide means. In this case, a support shaft (a member corresponding to the lock bolt 41) is fixedly attached to a vehicle-body-side support bracket.

Figure 9:
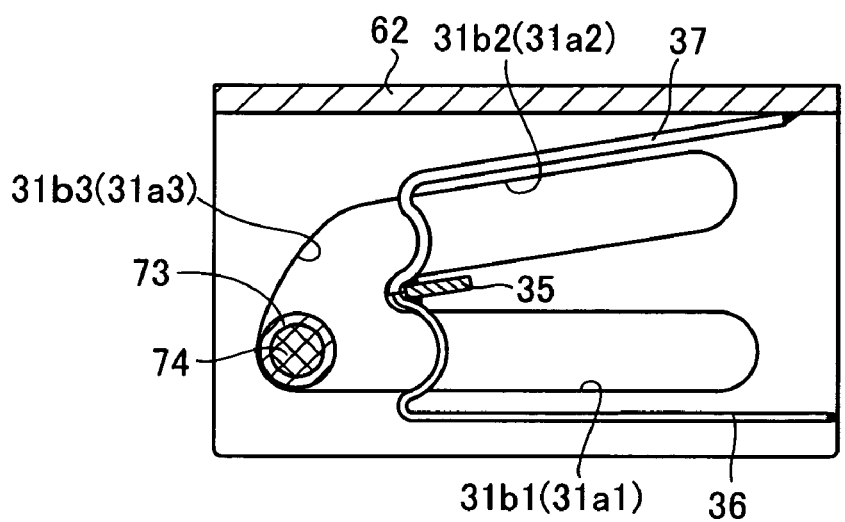
FIG. 9 is a side view showing essential portions of a modification of the first embodiment.
Figure 10:
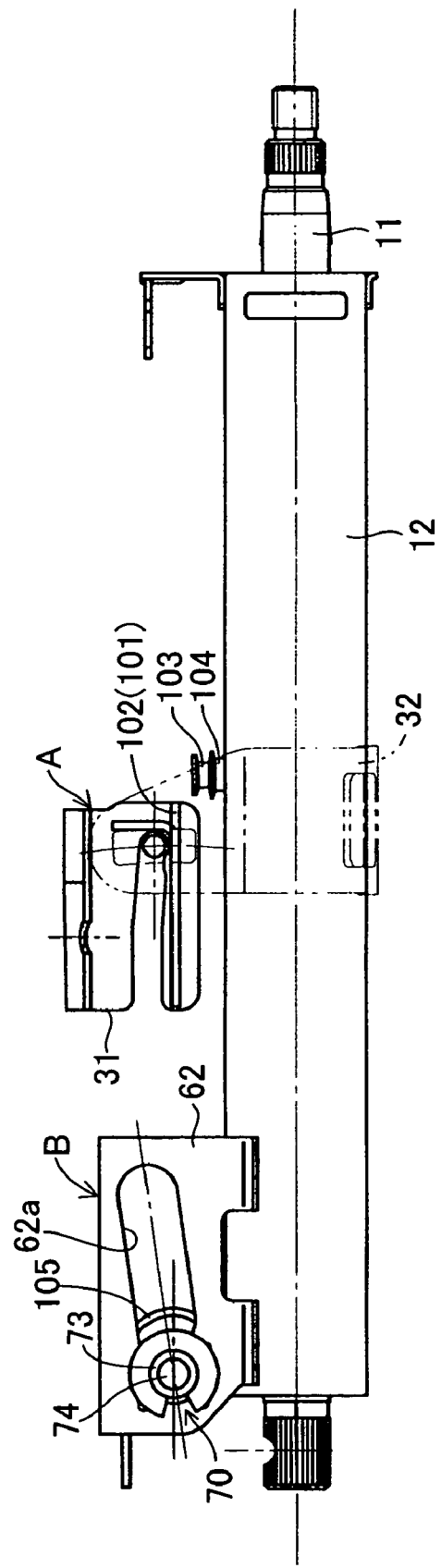
FIG. 10 is a side view showing a second embodiment of the impact-absorbing steering column apparatus according to the present invention.
Figure 11:
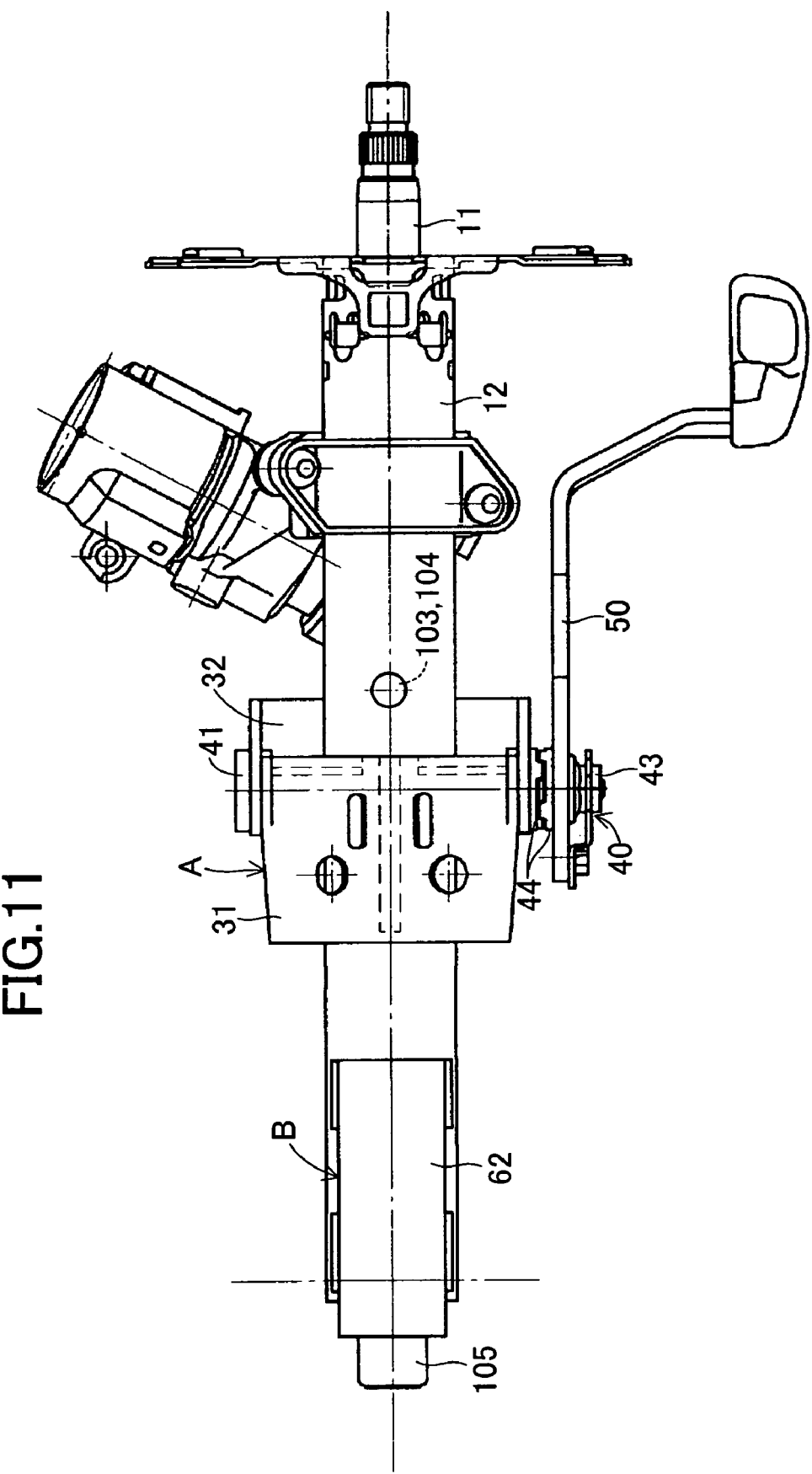
FIG. 11 is a plan view of the steering column assembly shown in FIG. 10.
Figure 12:
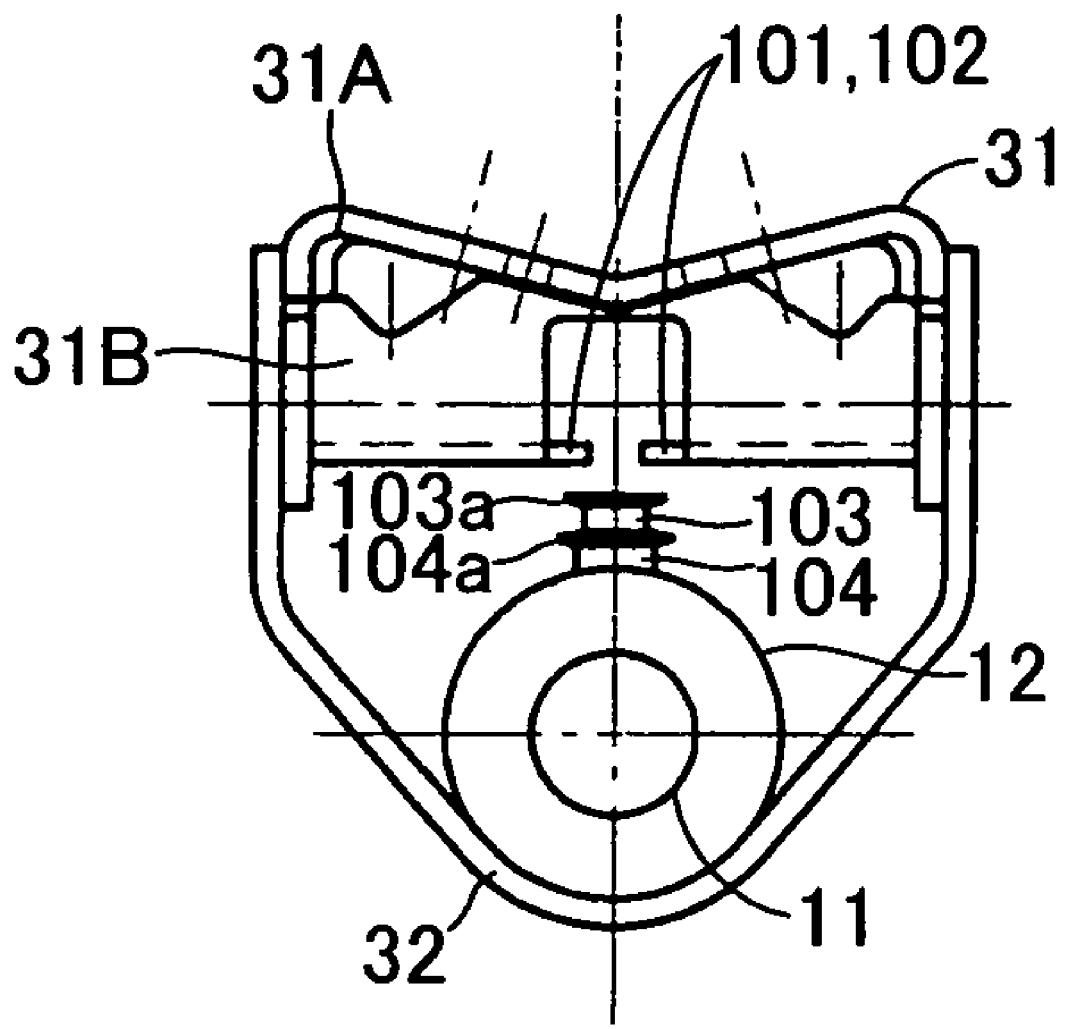
FIG. 12 is a vertical, transverse sectional view showing the configurational relation between energy-absorbing members and engagement pins shown in FIG. 10.

In the above-described first embodiment, collision-energy-absorbing means, which includes two pairs of guide slots 31a1 and 31b1, and 31a2 and 31b2, and two kinds of energy-absorbing members 36 and 37, is provided in the upper support mechanism A. However, a configuration shown in FIG. 9 may be employed; specifically, the collision-energy-absorbing means, which includes two pairs of guide slots 31a1 and 31b1, and 31a2 and 31b2, and two kinds of energy-absorbing members 36 and 37, is provided in the lower support mechanism B. In this case, the rear end of the energy-absorbing member 36 is welded to the upper surface of the steering column 12, and the rear end of the energy-absorbing member 37 is welded to the lower surface of the upper wall of the column-side bracket 62.

In the above-described first embodiment, the energy-absorbing members 36 and 37, which are plastically deformed by means of the lock bolt 41 and the collar 42 to thereby absorb secondary collision energy, are formed of corresponding elongated plates provided separately from the support bracket 31. However, the following configuration may be employed: the guide slots 31a1 and 31b1 and the guide slots 31a2 and 31b2 formed in the support bracket 31 assume different widths such that the guide slot portions are plastically deformed by means of the lock bolt 41 and the collar 42 to thereby absorb secondary collision energy.

According to the above-described first embodiment, the present invention is embodied in relation to a steering column assembly configured such that an upper region of the steering column 12 is supported by the upper support mechanism A in a frontward movable condition, and a lower region of the steering column 12 is supported by the lower support mechanism B in a frontward movable condition. However, the present invention may be similarly embodied in relation to a steering column assembly configured such that a steering column is supported by a single support mechanism in a frontward movable condition.

FIGS. 10 to 14 show a second embodiment of the impact-absorbing steering column apparatus according to the present invention. In the second embodiment, collision-energy-absorbing means for absorbing secondary collision energy of the occupant H includes laterally paired energy-absorbing members 101 and 102 provided in the upper support mechanism A, engagement pins 103 and 104 provided on the steering column 12, and an energy-absorbing member 105 provided in the lower support mechanism B. Structural features other than the collision-energy-absorbing means for absorbing secondary collision energy of the occupant H are substantially identical with those of the above-described first embodiment and are thus denoted by common reference numerals, and repeated description thereof is omitted.

The laterally paired energy-absorbing members 101 and 102 are elongated plates. When the engagement pin 103 or 104 is engaged with the energy-absorbing members 101 and 102 and passes frontward therebetween, the energy-absorbing members 101 and 102 are plastically deformed to thereby absorb secondary collision energy. The energy-absorbing members 101 and 102 are formed integrally with the reinforcement plate 31B of the support bracket 31 in the upper support mechanism A. The energy-absorbing members 101 and 102 face each other with a predetermined gap formed therebetween and extend along the axial direction of the steering column 12.

The engagement pins 103 and 104 are provided on the steering column 12 in such a manner as to project upward. Stoppers 103a and 104a are integrally formed at distal end portions of the engagement pins 103 and 104, respectively. The main purpose of the stoppers 103a and 104a is to prevent the engagement pin 103 or 104 from coming out of the gap between the energy-absorbing members 101 and 102 when the engagement pin 103 or 104 is fitted into the gap and moves frontward through the gap.

The distal engagement pin 103 has a diameter slightly greater than the gap between the energy-absorbing members 101 and 102. When the steering column 12 tilts upward by θ1 from the condition of FIG. 10 and moves frontward, the engagement pin 103 can be fitted into the gap between the energy-absorbing members 101 and 102. The engagement pin 103 fitted into the gap between the energy-absorbing members 101 and 102 can plastically deform the energy-absorbing members 101 and 102.

The proximal engagement pin 104 has a diameter slightly greater than that of the distal engagement pin 103. When the steering column 12 tilts upward by θ2 (θ1<θ2) from the condition of FIG. 10 and moves frontward, the engagement pin 104 can be fitted into the gap between the energy-absorbing members 101 and 102. The engagement pin 104 fitted into the gap between the energy-absorbing members 101 and 102 can plastically deform the energy-absorbing members 101 and 102.

Figure 13:
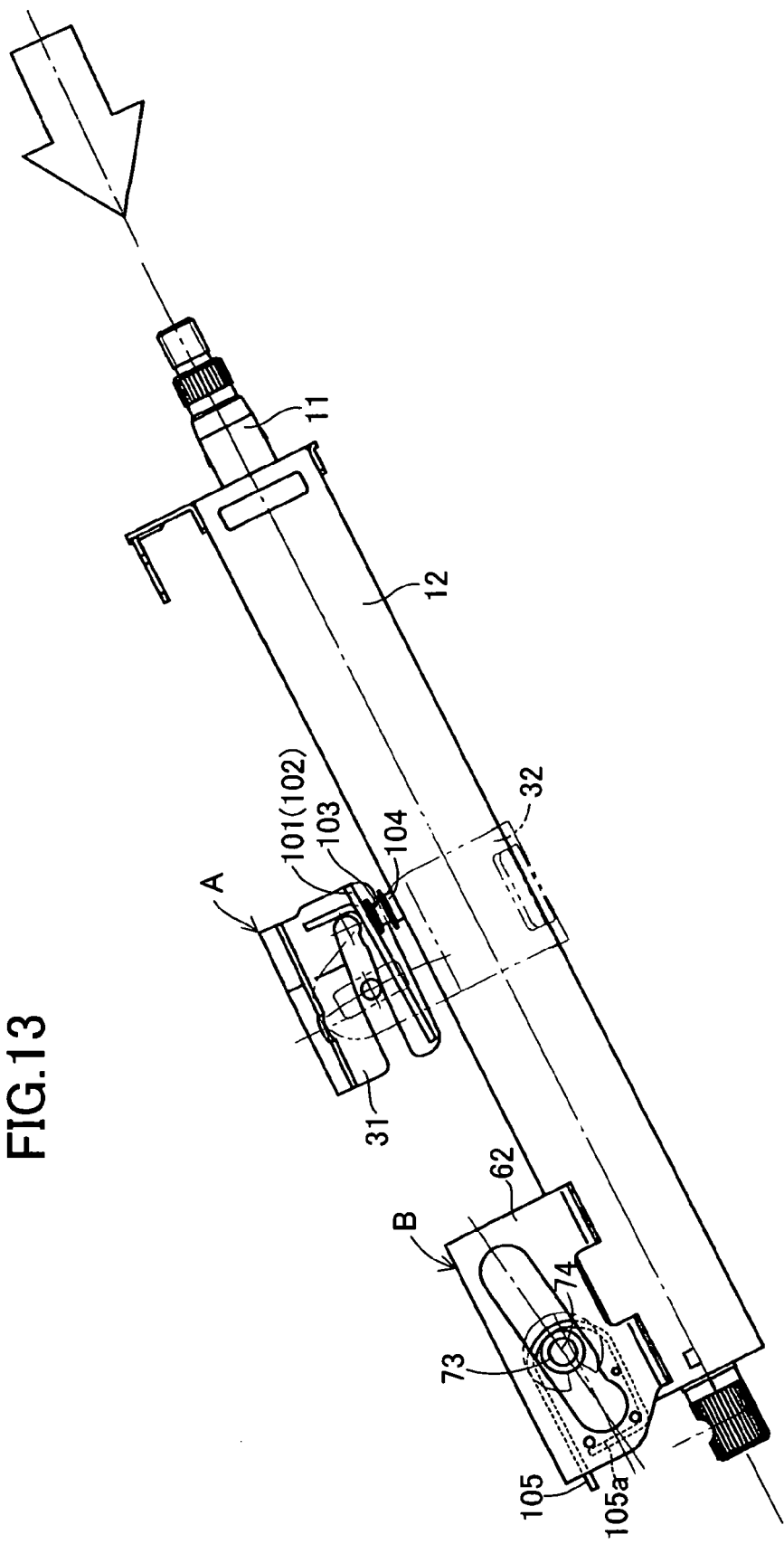
FIG. 13 is an explanatory view for explaining an action in the event of input of a secondary collision load in the direction of the column axis into the steering column assembly shown in FIG. 10.

As shown in FIG. 13, the energy-absorbing member 105 provided in the lower support mechanism B is an elongated plate. When the steering column 12 moves frontward, the energy-absorbing member 105 is engaged with the collar 73 of the connection means 70 and plastically deformed to thereby absorb secondary collision energy. The energy-absorbing member 105 is fixedly attached, at its one end portion 105a, to the column-side bracket 62 in the lower support mechanism B; loops around the collar 73; and extends frontward.

According to the thus-configured second embodiment, in the event of a secondary collision that accompanies a collision of the vehicle; for example, when, as shown in FIG. 13, a secondary collision load is input to the steering column 12 in the direction of the arrow (in the direction of the column axis) via the steering shaft 11, the steering column 12 moves frontward along its axial direction. In this case, while neither of the engagement pins 103 and 104 is fitted into the gap between the energy-absorbing members 101 and 102, the energy-absorbing member 105 is plastically deformed by means of the collar 73. As a result, since secondary collision energy is absorbed by means of plastic deformation of only the energy-absorbing member 105 caused by the collar 73, an absorption load for secondary collision energy is small.

Figure 14:
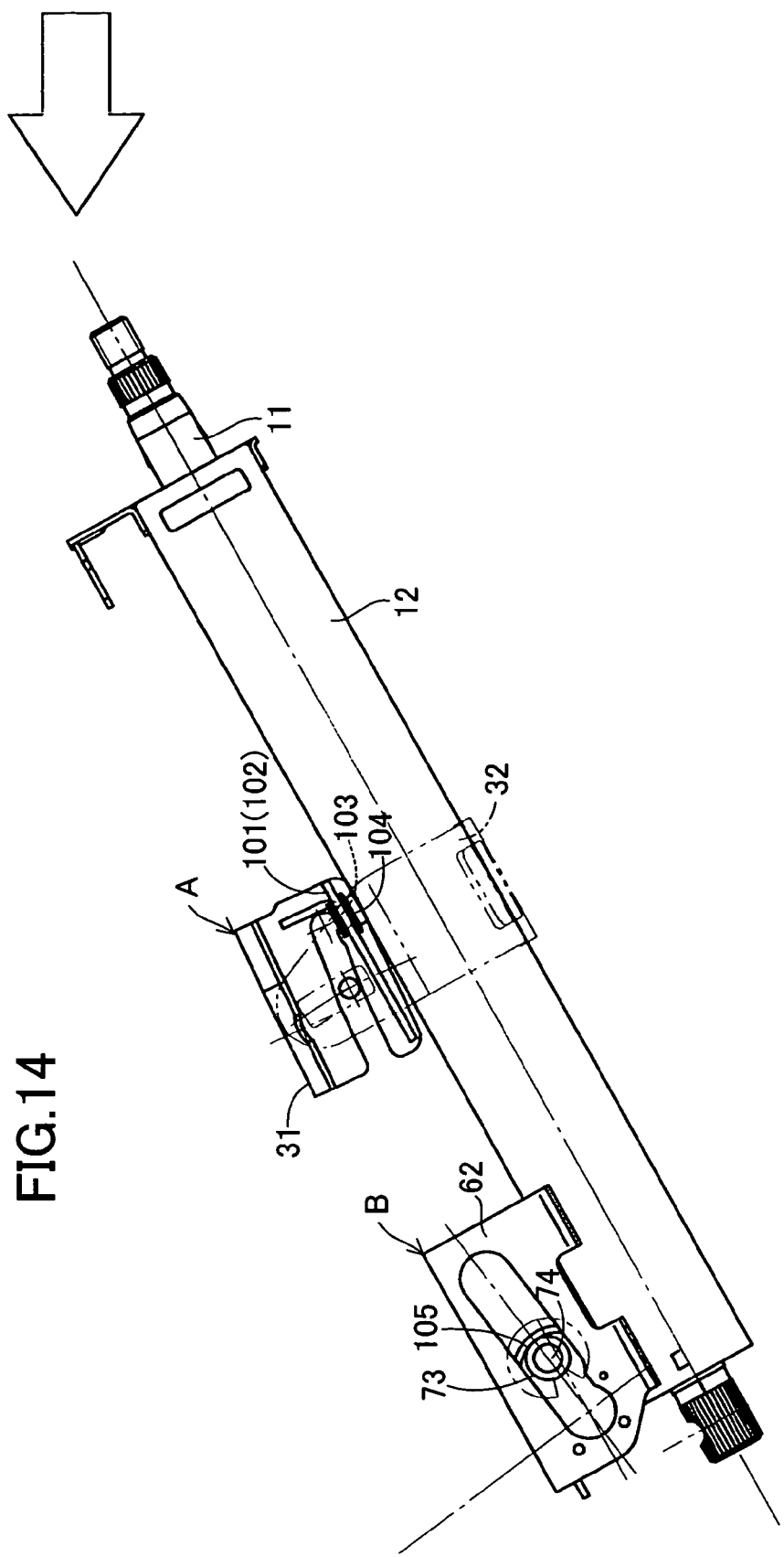
FIG. 14 is an explanatory view for explaining an action in the event of input of a secondary collision load substantially in the horizontal direction into the steering column assembly shown in FIG. 10.
Figure 15:
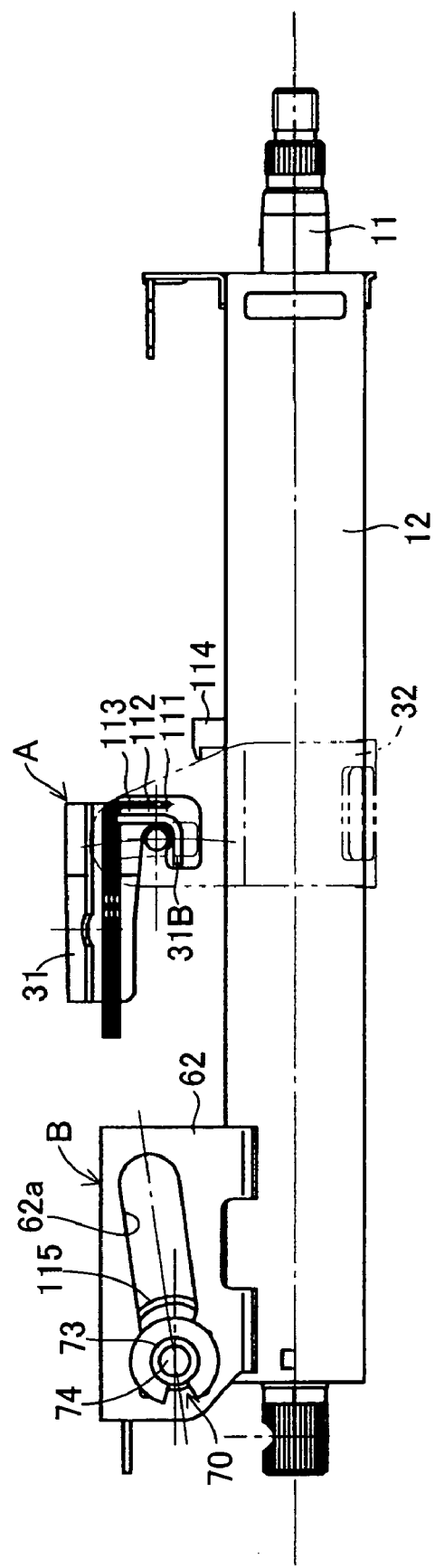
FIG. 15 is a side view showing a third embodiment of the impact-absorbing steering column apparatus according to the present invention.
Figure 16:
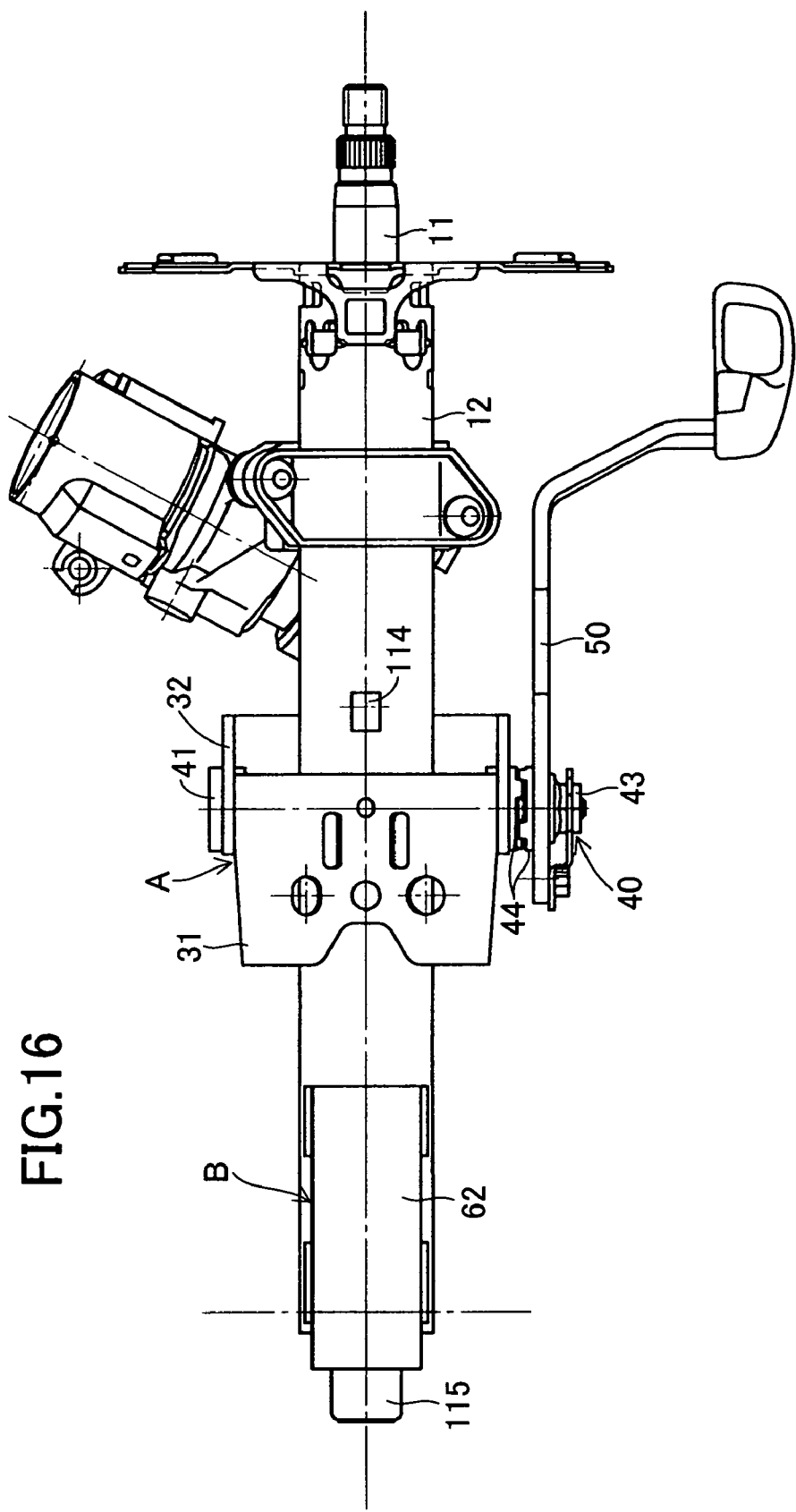
FIG. 16 is a plan view of the steering column assembly shown in FIG. 15.

In the event of a secondary collision that accompanies a collision of the vehicle; for example, when, as shown in FIG. 14, a secondary collision load is input to the steering column 12 in the direction of the arrow (substantially in the horizontal direction) via the steering shaft 11, the steering column 12 tilts upward in response to a secondary collision load exerted in the direction of the arrow at the initial stage of the secondary collision and subsequently moves frontward along its axial direction.

Thus, the distal engagement pin 103 is fitted into the gap between the energy-absorbing members 101 and 102 to thereby plastically deform the energy-absorbing members 101 and 102, while the energy-absorbing member 105 is plastically deformed by means of the collar 73. In this case, since secondary collision energy is absorbed by means of plastic deformation of the energy-absorbing members 101 and 102 caused by the distal engagement pin 103 and plastic deformation of the energy-absorbing member 105 caused by the collar 73, an absorption load for secondary collision energy is larger than that in the case of FIG. 13.

In the case where, as a result of input of a large secondary collision load in the direction of the arrow of FIG. 14, the steering column 12 tilts upward more than in the condition shown in FIG. 14 and subsequently moves frontward along its axial direction, the proximal engagement pin 104 is fitted into the gap between the energy-absorbing members 101 and 102 to thereby plastically deform the energy-absorbing members 101 and 102, while the energy-absorbing member 105 is plastically deformed by means of the collar 73. In this case, since secondary collision energy is absorbed by means of plastic deformation of the energy-absorbing members 101 and 102 caused by the proximal engagement pin 104 and plastic deformation of the energy-absorbing member 105 caused by the collar 73, an absorption load for secondary collision energy is larger than that in the case of FIG. 14.

As described above, according to the second embodiment, in the event of a secondary collision of the occupant H with the steering system, energy-absorption-load-changing means including the engagement pins 103 and 104 changes an absorption load for secondary collision energy in accordance with the direction and load of a secondary collision of the occupant H with the steering system. In other words, the second embodiment can be mechanically implemented by means of appropriately setting, for example, the shape and arrangement of the engagement pins 103 and 104, without need to employ electrical control, whose cost is high, and thus at low cost.

FIGS. 15 to 19 show a third embodiment of the impact-absorbing steering column apparatus according to the present invention. In the third embodiment, collision-energy-absorbing means for absorbing secondary collision energy of the occupant H includes three energy-absorbing members 111, 112, and 113 provided in the upper support mechanism A; an engagement hook 114 provided on the steering column 12; and an energy-absorbing member 115 provided on the lower support mechanism B. Structural features other than the collision-energy-absorbing means for absorbing secondary collision energy of the occupant H are substantially identical with those of the above-described first embodiment and are thus denoted by common reference numerals, and repeated description thereof is omitted.

Figure 17:
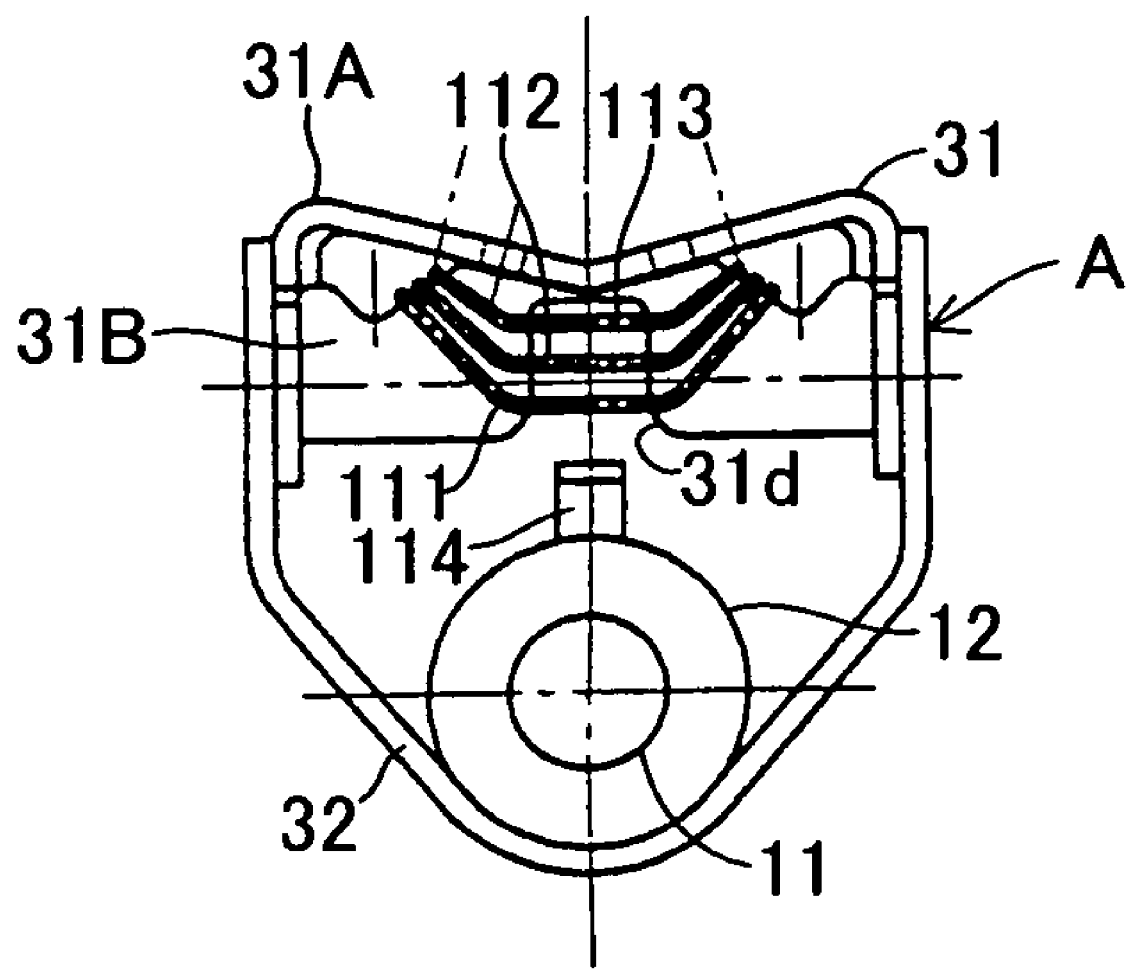
FIG. 17 is a vertical, transverse sectional view showing the configurational relation between energy-absorbing members and an engagement hook shown in FIG. 15.

The energy-absorbing members 111, 112, and 113 are iron bars and plastically deformed when the engagement hook 114 is engaged with them and moves frontward, thereby absorbing secondary collision energy. The energy-absorbing members 111, 112, and 113 are attached in array to the reinforcement plate 31B of the support bracket 31 in the upper support mechanism A. Each of the energy-absorbing members 111, 112, and 113 is formed into a shape resembling the lying letter U that opens frontward and includes portions extending between its intermediate region and its front ends along the axial direction of the steering column 12. As shown in FIG. 17, a rear end portion of each of the energy-absorbing members 111, 112, and 113 is curved downward and thus can be engaged with the engagement hook 114 substantially at its center. A cutout 31d is formed in the reinforcement plate 31B of the support bracket 31 in order to allow frontward movement of the engagement hook 114 engaged with the energy-absorbing member(s) 111 (112 and 113).

The engagement hook 114 is provided on the steering column 12 in an upward projecting condition. When the steering column 12 tilts upward and moves frontward from the condition of FIG. 15, the engagement hook 114 can engage with the energy-absorbing member(s) 111 (112 and 113). Being engaged with the energy-absorbing member(s) 111 (112 and 113), the engagement hook 114 can plastically deform the energy-absorbing member(s) 111 (112 and 113).

Figure 18:
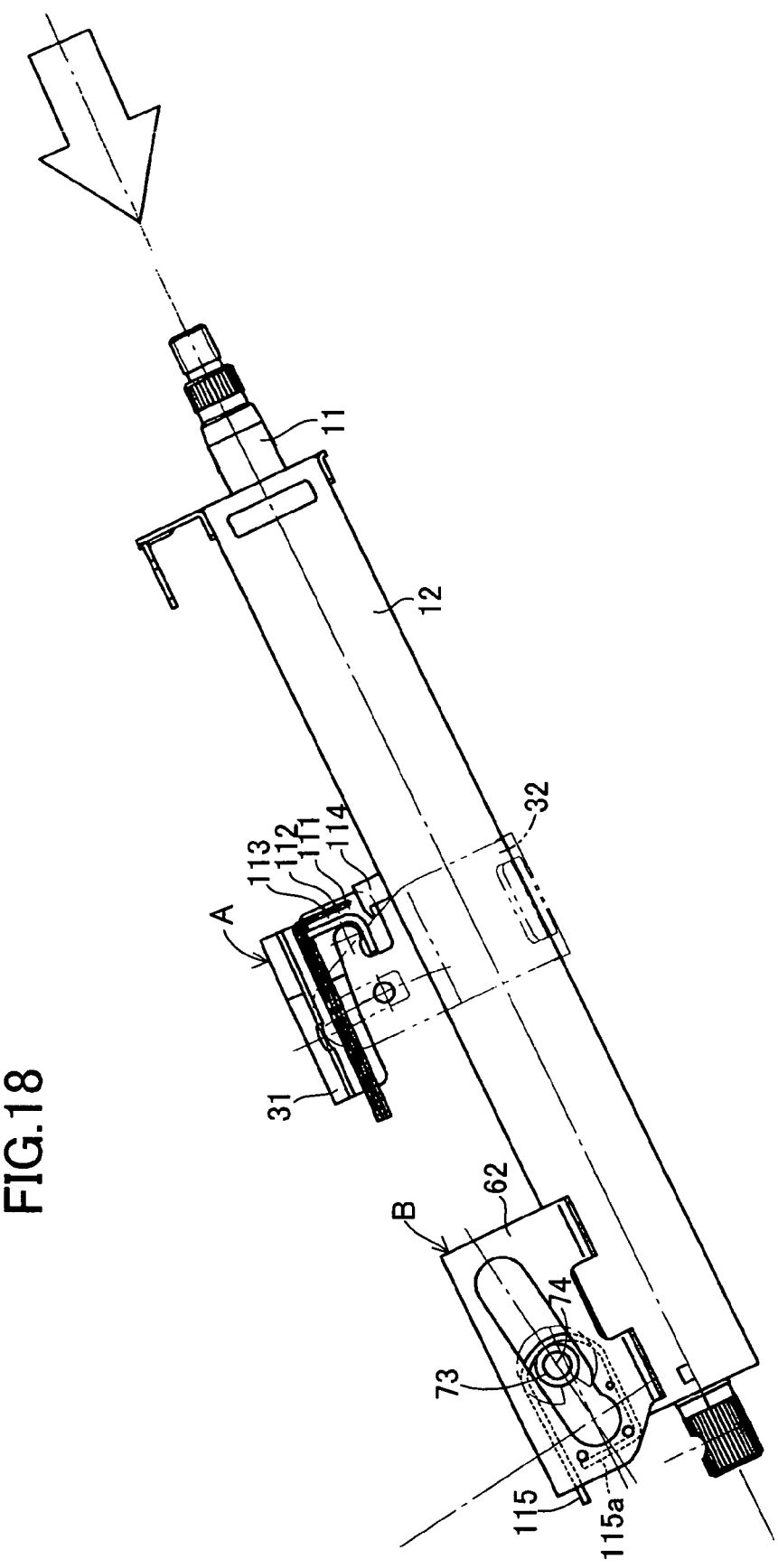
FIG. 18 is an explanatory view for explaining an action in the event of input of a secondary collision load in the direction of the column axis into the steering column assembly shown in shown in FIG. 15.

As shown in FIG. 18, the energy-absorbing member 115 provided in the lower support mechanism B is an elongated plate. When the steering column 12 moves frontward, the energy-absorbing member 115 is engaged with the collar 73 of the connection means 70 and plastically deformed to thereby absorb secondary collision energy. The energy-absorbing member 115 is fixedly attached, at its one end portion 105a, to the column-side bracket 62 in the lower support mechanism B; loops around the collar 73; and extends frontward.

According to the thus-configured third embodiment, in the event of a secondary collision that accompanies a collision of the vehicle; for example, when, as shown in FIG. 18, a secondary collision load is input to the steering column 12 in the direction of the arrow (in the direction of the column axis) via the steering shaft 11, the steering column 12 moves frontward along its axial direction. In this case, while the engagement hook 114 is engaged with none of the energy-absorbing members 111, 112, and 113, the energy-absorbing member 115 is plastically deformed by means of the collar 73. As a result, since secondary collision energy is absorbed by means of plastic deformation of only the energy-absorbing member 115 caused by the collar 73, an absorption load for secondary collision energy is small.

Figure 19:
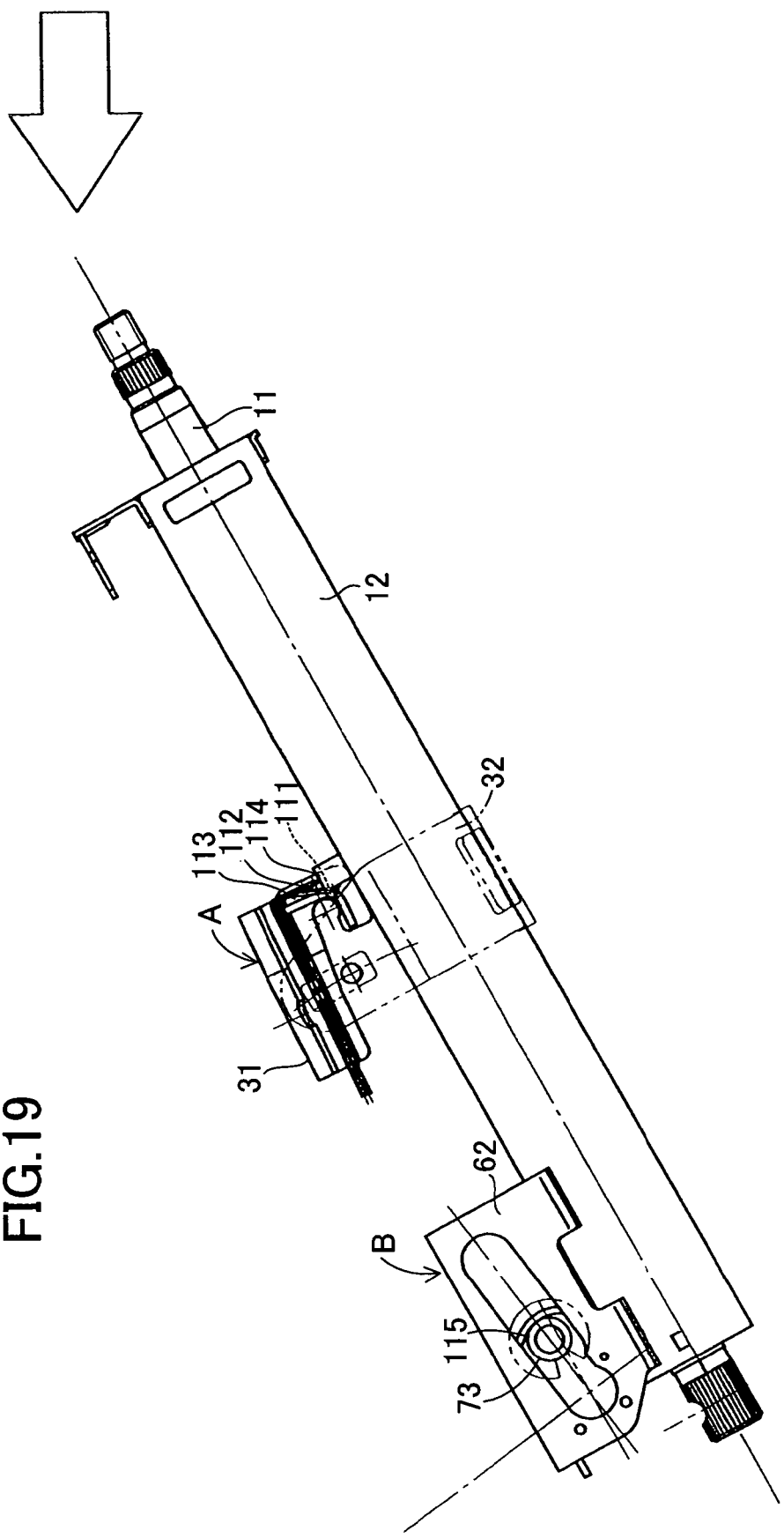
FIG. 19 is an explanatory view for explaining an action in the event of input of a secondary collision load substantially in the horizontal direction into the steering column assembly shown in FIG. 15.
Figure 20:
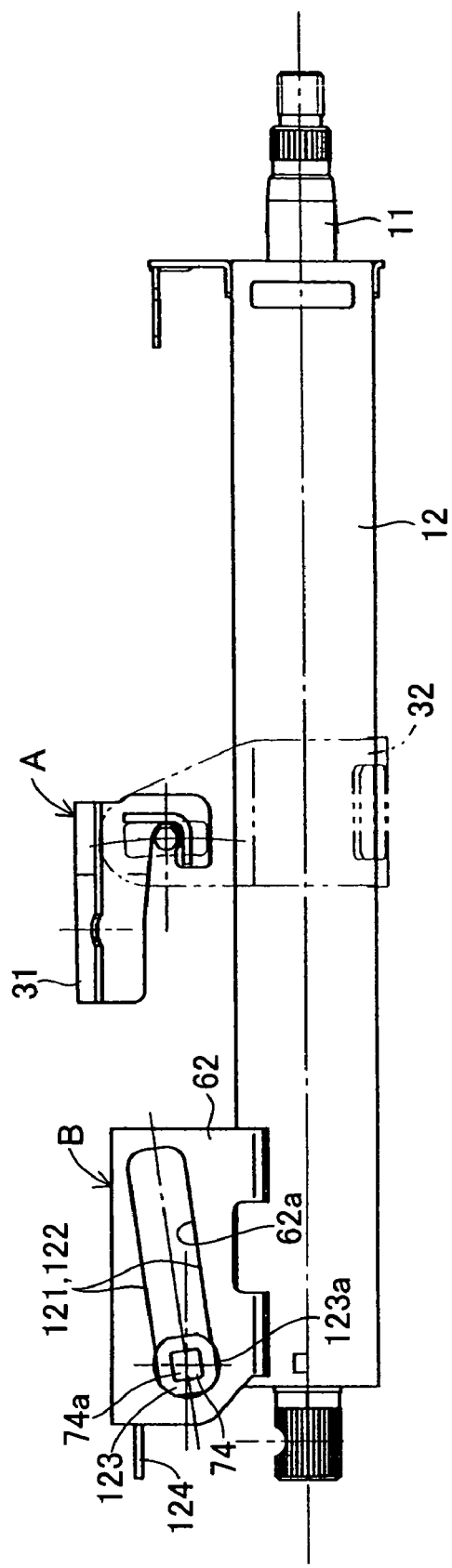
FIG. 20 is a side view showing a fourth embodiment of the impact-absorbing steering column apparatus according to the present invention.
Figure 21:
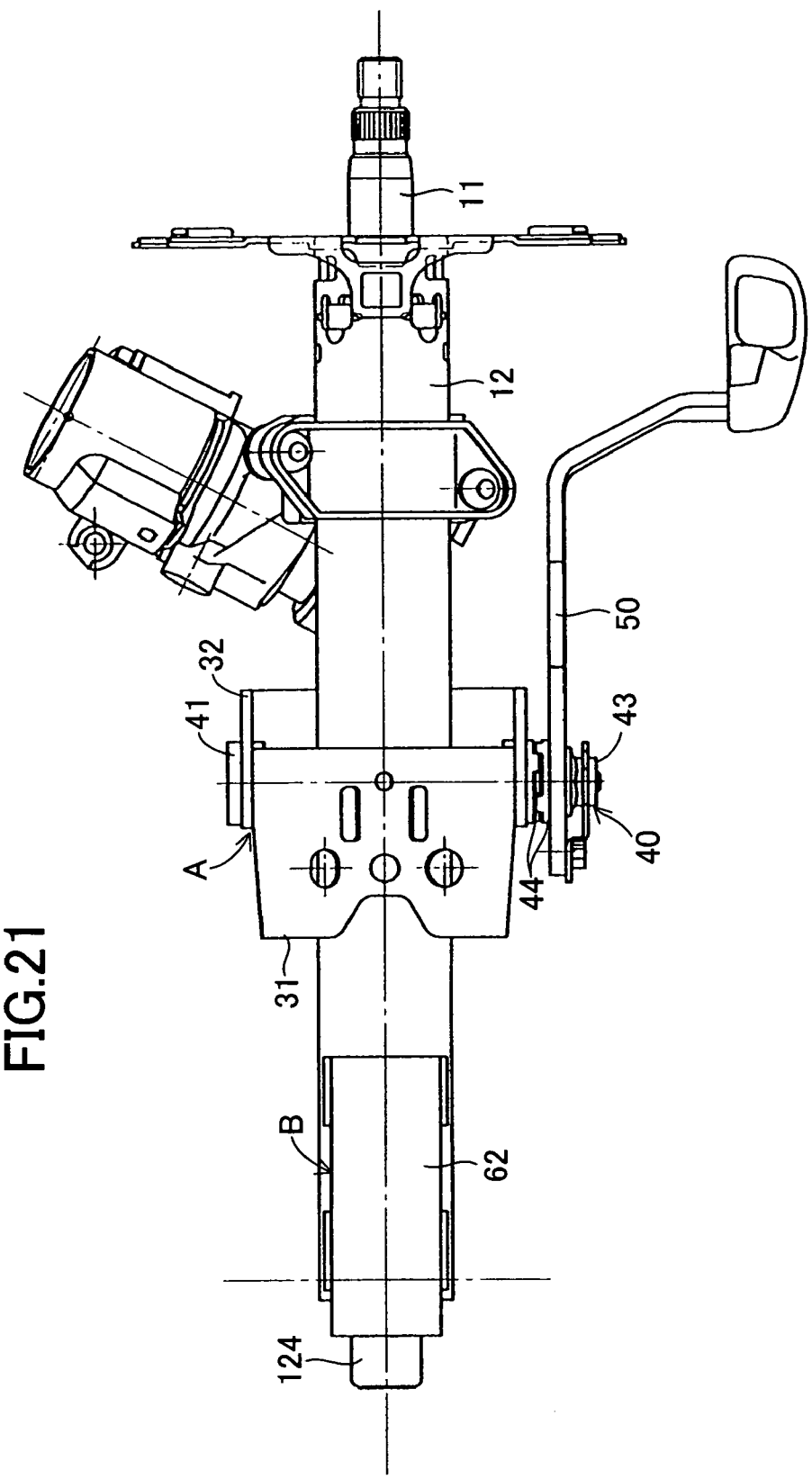
FIG. 21 is a plan view of the steering column assembly shown in FIG. 20.
Figure 22:
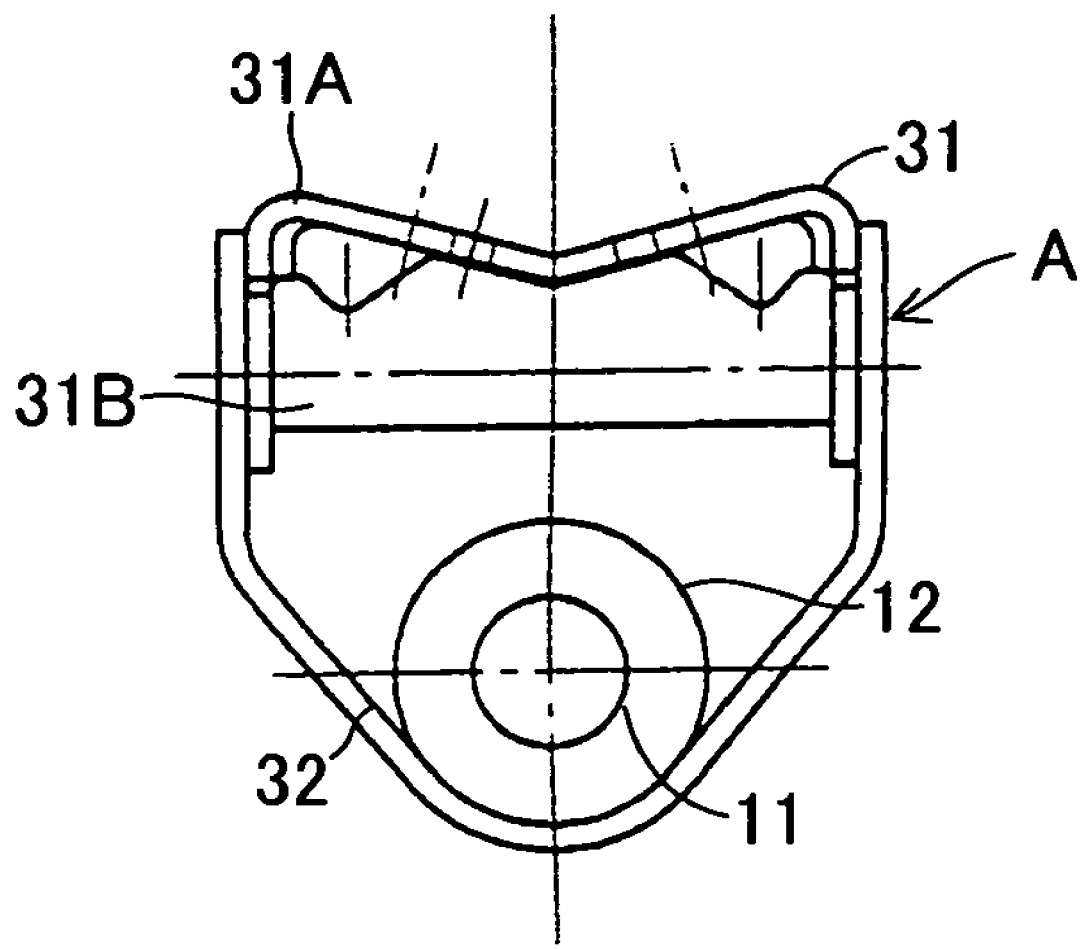
FIG. 22 is a vertical, transverse sectional view showing the configurational of an upper support mechanism shown in FIG. 20.

In the event of a secondary collision that accompanies a collision of the vehicle; for example, when, as shown in FIG. 19, a secondary collision load is input to the steering column 12 in the direction of the arrow (substantially in the horizontal direction) via the steering shaft 11, the steering column 12 tilts upward in response to a secondary collision load exerted in the direction of the arrow at the initial stage of the secondary collision and subsequently moves frontward along its axial direction.

Thus, the engagement hook 114 is engaged with the bottom energy-absorbing member 111 to thereby plastically deform the energy-absorbing member 111, while the energy-absorbing member 115 is plastically deformed by means of the collar 73. In this case, since secondary collision energy is absorbed by means of plastic deformation of the energy-absorbing member 111 caused by the engagement hook 114 and plastic deformation of the energy-absorbing member 115 caused by the collar 73, an absorption load for secondary collision energy is larger than that in the case of FIG. 18.

In the case where, as a result of input of a large secondary collision load in the direction of the arrow of FIG. 19, the steering column 12 tilts upward more than in the condition shown in FIG. 19 and subsequently moves frontward along its axial direction, the engagement hook 114 is engaged with the energy-absorbing members 111 and 112 or 111 to 113 to thereby plastically deform the energy-absorbing members 111 and 112 or 111 to 113, while the energy-absorbing member 115 is plastically deformed by means of the collar 73. In this case, since secondary collision energy is absorbed by means of plastic deformation of the energy-absorbing members 111 and 112 or 111 to 113 caused by the engagement hook 114 and plastic deformation of the energy-absorbing member 115 caused by the collar 73, an absorption load for secondary collision energy is larger than that in the case of FIG. 19.

As described above, according to the third embodiment, in the event of a secondary collision of the occupant H with the steering system, energy-absorption-load-changing means including the energy-absorbing members 111, 112, and 113 and the engagement hook 114 changes an absorption load for secondary collision energy in accordance with the direction and load of a secondary collision of the occupant H with the steering system. In other words, the third embodiment can be mechanically implemented by means of appropriately setting, for example, the shape of the energy-absorbing members 111, 112, and 113 and the shape and arrangement of the engagement hook 114, without need to employ electrical control, whose cost is high, and thus at low cost.

FIGS. 20 to 24 show a fourth embodiment of the impact-absorbing steering column apparatus according to the present invention. In the fourth embodiment, collision-energy-absorbing means for absorbing secondary collision energy of the occupant H includes laterally paired energy-absorbing members 121 and 122, a cam 123, and an energy-absorbing member 124 provided on the lower support mechanism B. Structural features other than the collision-energy-absorbing means for absorbing secondary collision energy of the occupant H are substantially identical with those of the above-described first embodiment and are thus denoted by common reference numerals, and repeated description thereof is omitted.

The laterally paired energy-absorbing members 121 and 122 are iron plates and plastically deformed when moving frontward while being engaged with the cam 123, thereby absorbing secondary collision energy. The laterally paired energy-absorbing members 121 and 122 are integrally formed with corresponding laterally paired vertical walls of the column-side bracket 62 in the lower support mechanism B and extend in the front-rear direction while being slightly inclined upward in relation to the axial direction of the steering column 12.

The cam 123 is employed in place of the bushes 71, 72 and the collar 73 of the connection means 70. The cam 123 is nonrotatably attached to a square portion 74a of the bolt 74 at such an angle that one of four flat portions 123a formed on its outer surface in a diagonally facing condition is substantially aligned with the longitudinal direction of the laterally paired elongated holes 62a provided in the column-side bracket 62. At a front end portion of each of the laterally paired elongated hole 62a provided in the column-side bracket 62, the cam 123 is rotatable in relation to the elongated holes 62a. At a portion of each of the elongated holes 62a other than the front end portion, the cam 123 can be engaged with the energy-absorbing members 121, 122, and 124. Being engaged with the energy-absorbing members 121 and 122 and the energy-absorbing member 124, the cam 123 can plastically deform the energy-absorbing members 121, 122, and 124.

Figure 23:
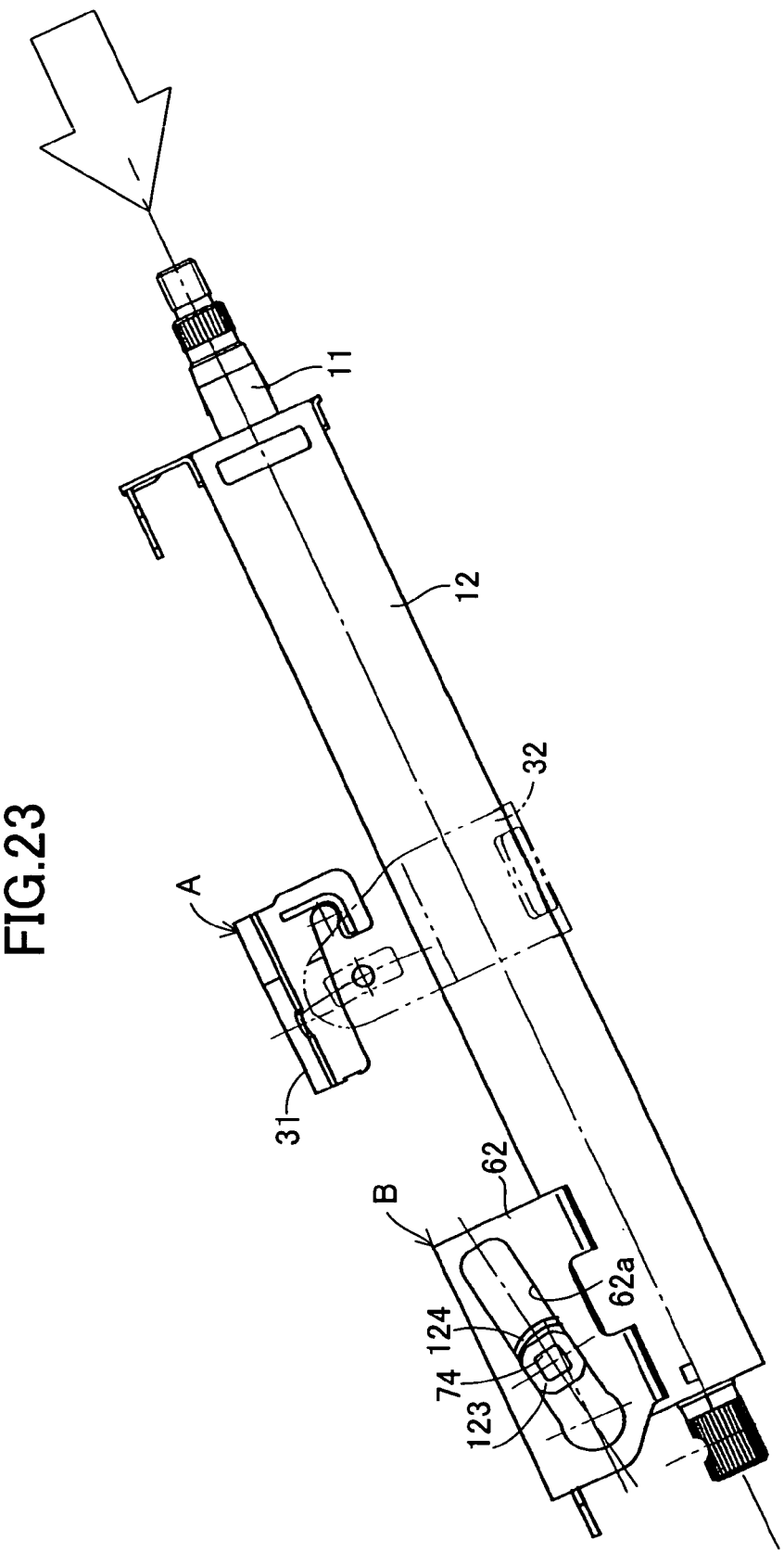
FIG. 23 is an explanatory view for explaining an action in the event of input of a secondary collision load in the direction of the column axis into the steering column assembly shown in FIG. 20.
Figure 24:
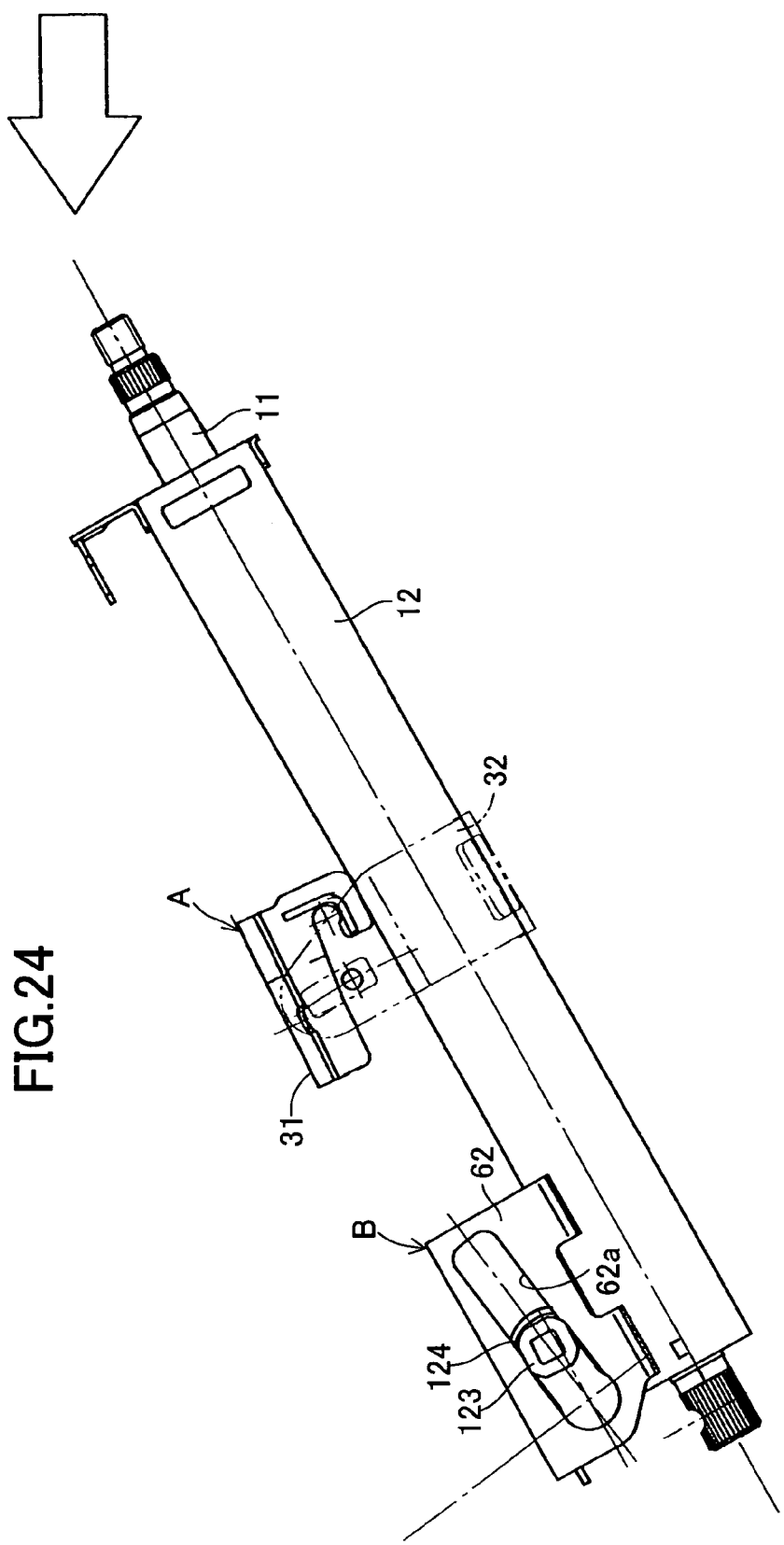
FIG. 24 is an explanatory view for explaining an action in the event of input of a secondary collision load substantially in the horizontal direction into the steering column assembly shown in FIG. 20.
Figure 25:
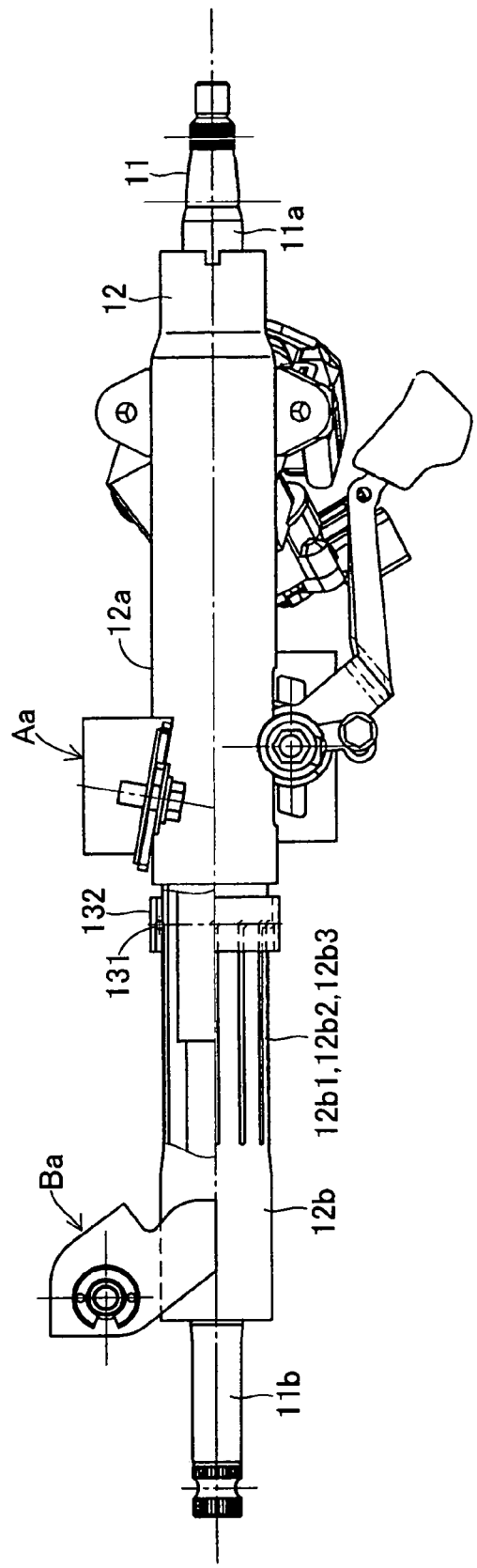
FIG. 25 is a side view showing a fifth embodiment of the impact-absorbing steering column apparatus according to the present invention.
Figure 26:
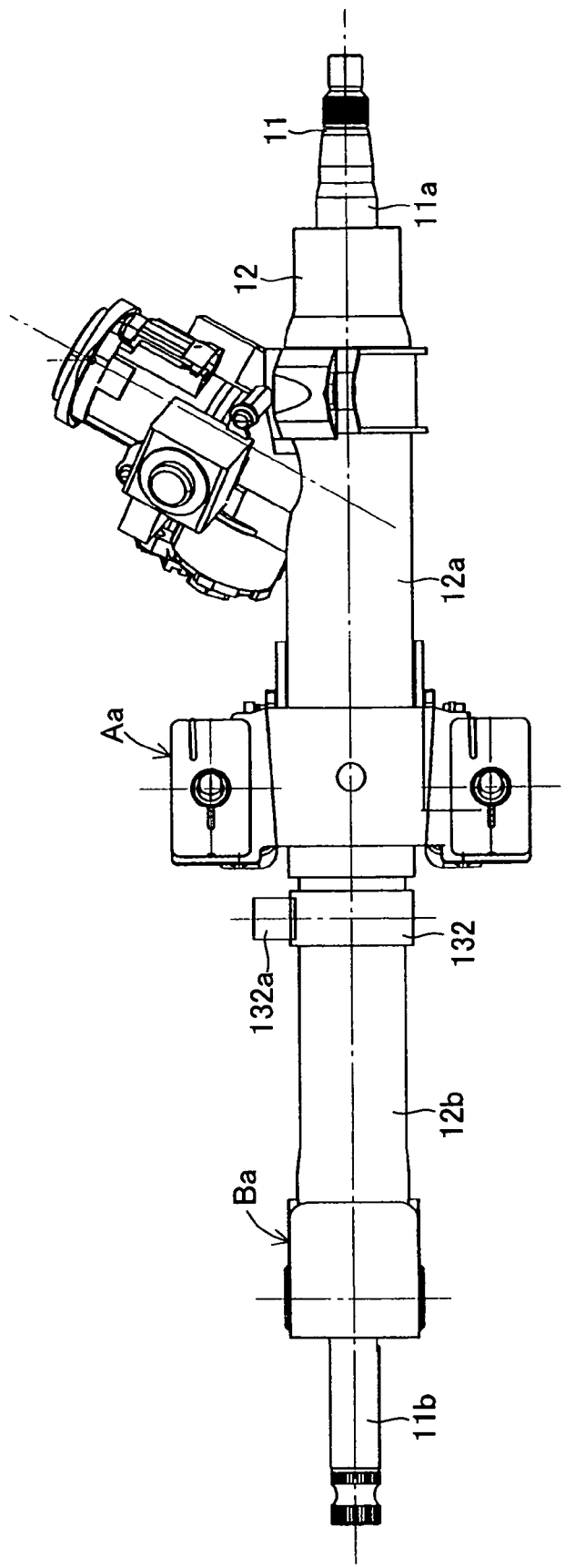
FIG. 26 is a plan view of the steering column assembly shown in FIG. 25.
Figure 27:
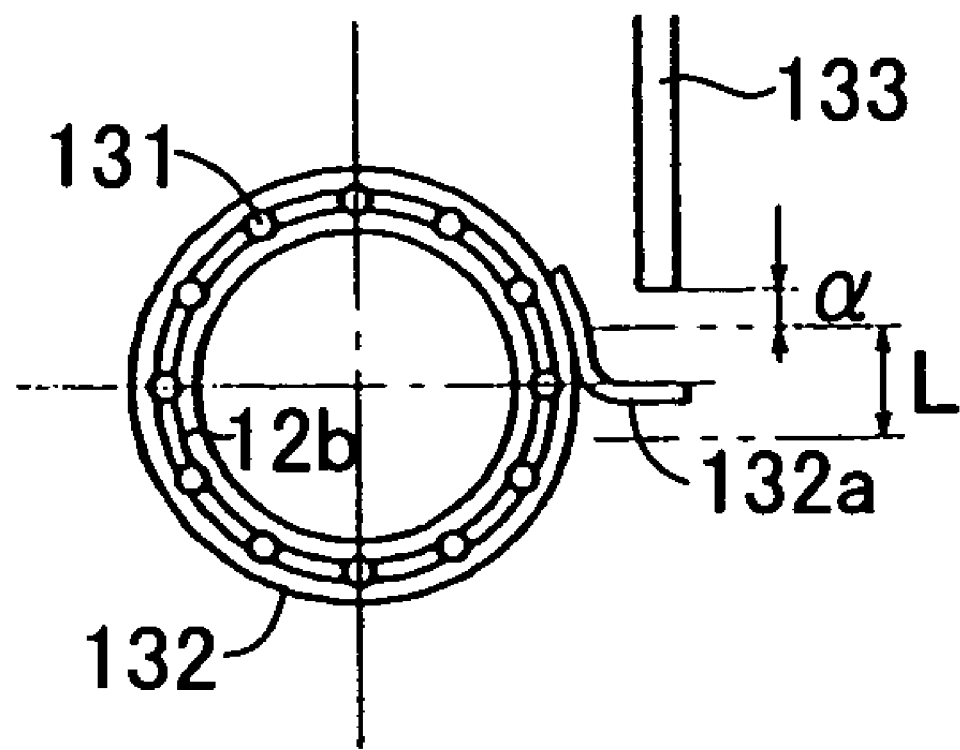
FIG. 27 is a vertical, transverse sectional view showing the configurational relation between balls and a ring shown in FIG. 25 and a rod capable of engaging with an arm of the ring.

As shown in FIG. 23 or 24, the energy-absorbing member 124 is an elongated plate. When the steering column 12 moves frontward, the energy-absorbing member 124 is engaged with the cam 123 and plastically deformed to thereby absorb secondary collision energy. The energy-absorbing member 124 is fixedly attached, at its one end portion (not shown), to the column-side bracket 62; loops around the cam 123; and extends frontward (see FIG. 20).

According to the thus-configured fourth embodiment, in the event of a secondary collision that accompanies a collision of the vehicle; for example, when, as shown in FIG. 23, a secondary collision load is input to the steering column 12 in the direction of the arrow (in the direction of the column axis) via the steering shaft 11, the steering column 12 moves frontward along its axial direction. In this case, while the flat portions 123a of the cam 123 are engaged with the energy-absorbing members 121 and 122 (the energy-absorbing members 121 and 122 are hardly plastically deformed by means of the cam 123), the energy-absorbing member 124 is plastically deformed by means of the cam 123. As a result, since secondary collision energy is absorbed by means of plastic deformation of only the energy-absorbing member 124 caused by the cam 123, an absorption load for secondary collision energy is small.

In the event of a secondary collision that accompanies a collision of the vehicle; for example, when, as shown in FIG. 24, a secondary collision load is input to the steering column 12 in the direction of the arrow (substantially in the horizontal direction) via the steering shaft 11, the steering column 12 tilts upward in response to a secondary collision load exerted in the direction of the arrow at the initial stage of the secondary collision and subsequently moves frontward along its axial direction.

Thus, corner portions of the cam 123 are engaged with the energy-absorbing members 121 and 122 to thereby plastically deform the energy-absorbing members 121 and 122, while the energy-absorbing member 124 is plastically deformed by means of the cam 123. In this case, since secondary collision energy is absorbed by means of plastic deformation of the energy-absorbing members, 121, 122, and 124 caused by the cam 123, an absorption load for secondary collision energy is larger than that in the case of FIG. 23.

In the case where, as a result of input of a large secondary collision load in the direction of the arrow of FIG. 24, the steering column 12 tilts upward more than in the condition shown in FIG. 24 and subsequently moves frontward along its axial direction, the quantity of plastic deformation of the energy-absorbing members 121 and 122 increases with the quantity of upward tilting of the steering column 12. Thus, an absorption load for secondary collision energy increases accordingly.

As described above, according to the fourth embodiment, in the event of a secondary collision of the occupant H with the steering system, energy-absorption-load-changing means including the energy-absorbing members 121, 122, and 124 and the cam 123 changes an absorption load for secondary collision energy in accordance with the direction and load of a secondary collision of the occupant H with the steering system. In other words, the fourth embodiment can be mechanically implemented by means of appropriately setting, for example, the shape and arrangement of the energy-absorbing members 121, 122, and 124 and the cam 123, without need to employ electrical control, whose cost is high, and thus at low cost.

FIGS. 25 to 31 show a fifth embodiment of the impact-absorbing steering column apparatus according to the present invention. The fifth embodiment employs a ball-type collision-energy-absorbing device as collision-energy-absorbing means for absorbing secondary collision energy of the occupant H. The ball-type collision-energy-absorbing device includes a plurality of balls 131, a ring 132 for holding the balls 131, and a rod 133 capable of press-rotating the ring 132.

In the fifth embodiment, the steering shaft 11 is composed of an upper shaft 11a and a lower shaft 11b. The upper shaft 11a and the lower shaft 11b can axially extend and contract in relation to each other and can transmit torque. The steering column 12 is composed of an upper column 12a and a lower column 12b. The upper column 12a and the lower column 12b can axially extend and contract in relation to each other and support respectively the upper shaft 11a and the lower shaft 11b rotatably and in an axially immovable condition.

The upper column 12a is supported at a predetermined tilt angle to a steering mounting member, which is a portion of a vehicle body, by means of the upper support mechanism Aa, in a tiltable condition and in such a condition as to be detachable frontward under a set load. The lower column 12b is supported at a predetermined tilt angle to the steering mounting member, which is a portion of the vehicle body, by means of the lower support mechanism Ba, in a tiltable (pivotable) condition. Three engagement grooves 12b1, 12b2, and 12b3 (see FIG. 31) are axially formed for each of the balls 131 on the outer circumferential surface of the lower column 12b.

The engagement grooves 12b1, 12b2, and 12b3 differ in depth and are formed on the lower column 12b in a circumferentially arranged condition. Initially, the balls 131 are engaged with the corresponding engagement grooves 12b1. The engagement grooves 12b1 are the deepest; the engagement grooves 12b2 are the next deepest; and the engagement grooves 12b3 are the shallowest.

The balls 131 are of steel and held within the ring 132 at predetermined circumferential intervals. The balls 131 and the ring 132 are rotatable and axially movable in a unitary condition. When the balls 131, together with the ring 132, move frontward in the axial direction, the balls 131 can plastically deform the outer circumference of the lower column 12b along the engagement grooves 12b1, 12b2, or 12b3.

The ring 132 has a plurality of spherical holes 132b (see FIG. 31) formed along its inner circumference. The spherical holes 132b are adapted to partially accommodate the corresponding balls 131. The ring 132 is attached to the outer circumference of the lower column 12b via the balls 131. An arm 132a is provided on the right-hand side of the ring 132 and projects radially outward. The arm 132a can be engaged with the rod 133.

Figure 28A:
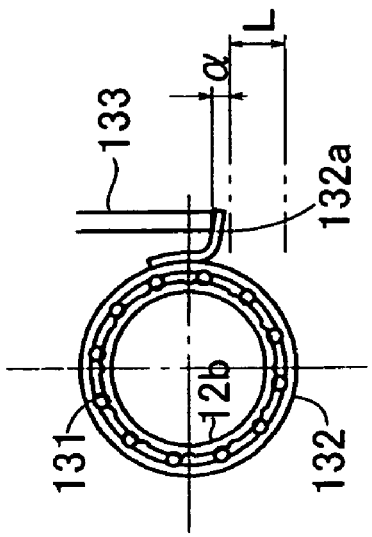
FIG. 28 is a series of vertical, transverse sectional views showing engagement relations between the rod and the arm of the ring shown in FIG. 27.
Figure 28B:
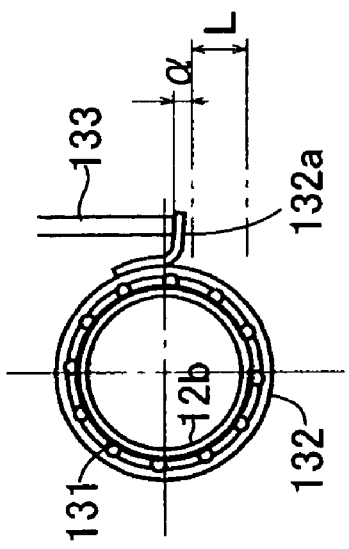

The rod 133 is fixedly attached to the steering mounting member and projects downward. As shown in FIG. 28, when the lower column 12b of the steering column 12 tilts upward by a predetermined amount a beyond a tilt stroke L, the rod 133 is engaged with the arm 132a to thereby rotate the ring 132 clockwise in FIG. 28.

Figure 29:
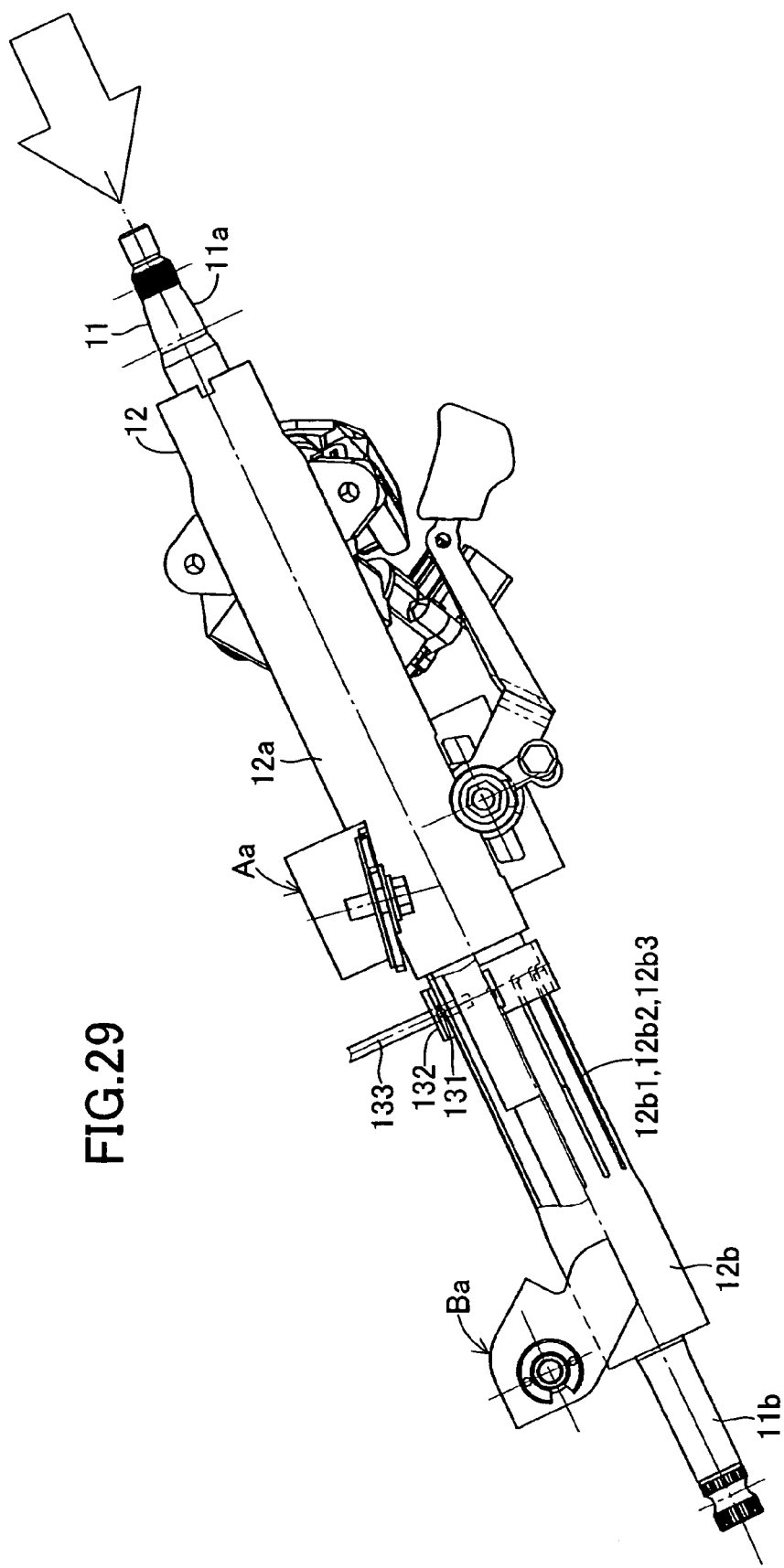
FIG. 29 is an explanatory view for explaining an action in the event of input of a secondary collision load in the direction of the column axis into the steering column assembly shown in FIG. 25.

According to the thus-configured fifth embodiment, in the event of a secondary collision that accompanies a collision of the vehicle; for example, when, as shown in FIG. 29, a secondary collision load is input to the upper column 12a of the steering column 12 in the direction of the arrow (in the direction of the column axis) via the upper shaft 11a of the steering shaft 11, the upper column 12a moves frontward along its axial direction and pushes the ring 132 frontward.

In this case, the balls 131, together with the ring 132, move frontward while being engaged with the corresponding deepest engagement grooves 12b1, thereby plastically deforming the outer circumference of the lower column 12b along the engagement grooves 12b1. Since secondary collision energy is absorbed by means of slight plastic deformation of the outer circumference of the lower column 12b caused by the balls 131, an absorption load for secondary collision energy is small.

Figure 30:
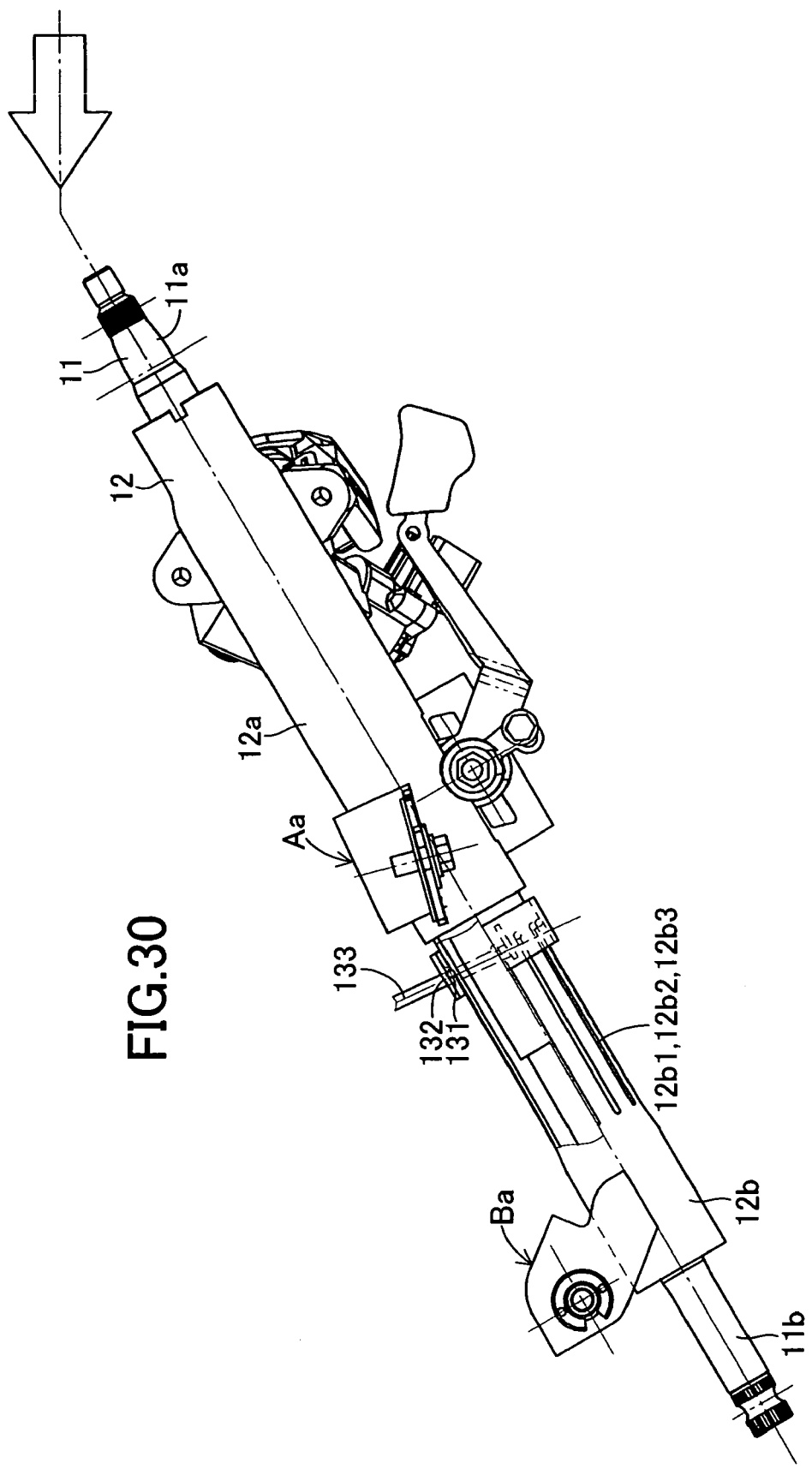
FIG. 30 is an explanatory view for explaining an action in the event of input of a secondary collision load substantially in the horizontal direction into the steering column assembly shown in FIG. 25.

In the event of a secondary collision that accompanies a collision of the vehicle; for example, when, as shown in FIG. 30, a secondary collision load is input to the upper column 12a of the steering column 12 in the direction of the arrow (substantially in the horizontal direction) via the upper shaft 11a of the steering shaft 11, the upper and lower columns 12a and 12b of the steering column 12 tilt upward in response to a secondary collision load exerted in the direction of the arrow at the initial stage of the secondary collision and subsequently move frontward along their axial direction.

Figure 28C:
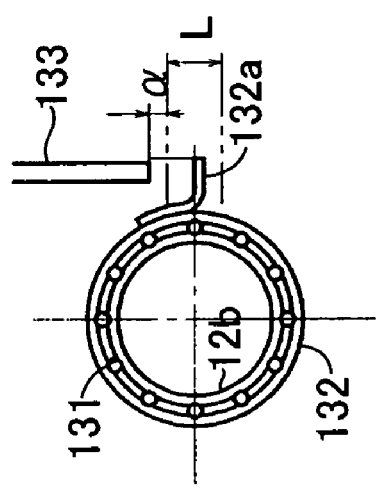
Figure 31:
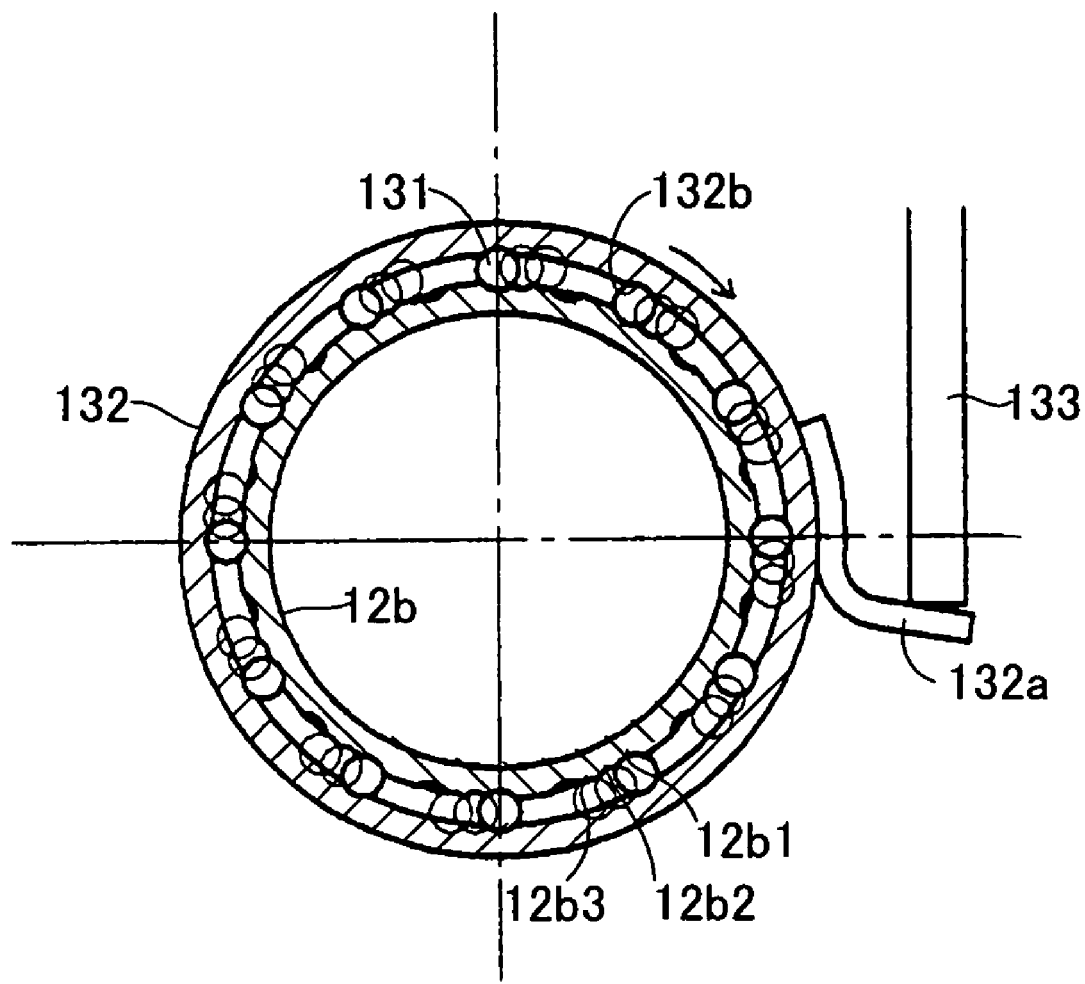
FIG. 31 is an enlarged vertical, transverse sectional view showing the configurational relation between the balls and engagement grooves formed in a lower column as viewed when the ring shown in FIG. 27 is rotated by means of the rod.

In the case where, at the initial stage of the secondary collision, the lower column 12b tilts upward by the predetermined quantity α or more beyond the tilt stroke L, the arm 132a of the ring 132 is engaged with the rod 133. As a result, as shown in FIG. 28(c) and FIG. 31, the ring 132 is rotated clockwise. In this case, the balls 131 shift from the deepest corresponding engagement grooves 12b1 to the shallower corresponding engagement grooves 12b2 or 12b3 and subsequently move frontward together with the ring 132 while being engaged with the corresponding engagement grooves 12b2 or 12b3, thereby plastically deforming the outer circumference of the lower column 12b along the engagement grooves 12b2 or 12b3. In this case, the outer circumference of the lower column 12b is plastically deformed by means of the balls 131 to a greater extent than in the case where the ring 132 is not rotated, whereby secondary collision energy is absorbed. Thus, an absorption load for secondary collision energy is larger than that in the case where the ring 132 is not rotated.

As described above, according to the fifth embodiment, in the event of a secondary collision of the occupant H with the steering system, energy-absorption-load-changing means including the rod 133, the ring 132, and the balls 131 changes an absorption load for secondary collision energy in accordance with the direction and load of a secondary collision of the occupant H with the steering system. In other words, the fifth embodiment can be mechanically implemented by means of appropriately setting, for example, the shape and arrangement of the rod 133, the ring 132, the balls 131, and the engagement grooves 12b1 to 12b3, without need to employ electrical control, whose cost is high, and thus at low cost.

FIGS. 32 to 36 show a sixth embodiment of the impact-absorbing steering column apparatus according to the present invention. In the sixth embodiment, collision-energy-absorbing means for absorbing secondary collision energy of the occupant H includes an energy-absorbing member 141 provided in the upper support mechanism A and an energy-absorbing member 143 provided in the lower support mechanism B. Structural features other than the collision-energy-absorbing means for absorbing secondary collision energy of the occupant H are substantially identical with those of the above-described first embodiment and are thus denoted by common reference numerals, and repeated description thereof is omitted.

The energy-absorbing member 141 is an iron plate and plastically deformed when moving frontward while being engaged with the reinforcement plate 31B of the support bracket 31 in the upper support mechanism A, thereby absorbing secondary collision energy. The energy-absorbing member 141, together with a base plate 142 formed of an iron plate, is welded to the upper surface of the steering column 12. The energy-absorbing member 141 includes a bulge portion 141a bulging upward and extending from its intermediate portion to its rear end portion. The bulge portion 141a extends along the axial direction of the steering column 12 and can be engaged with a curved lower end portion of the reinforcement plate 31B, which is bent to have an L-shaped cross section.

Figure 32:
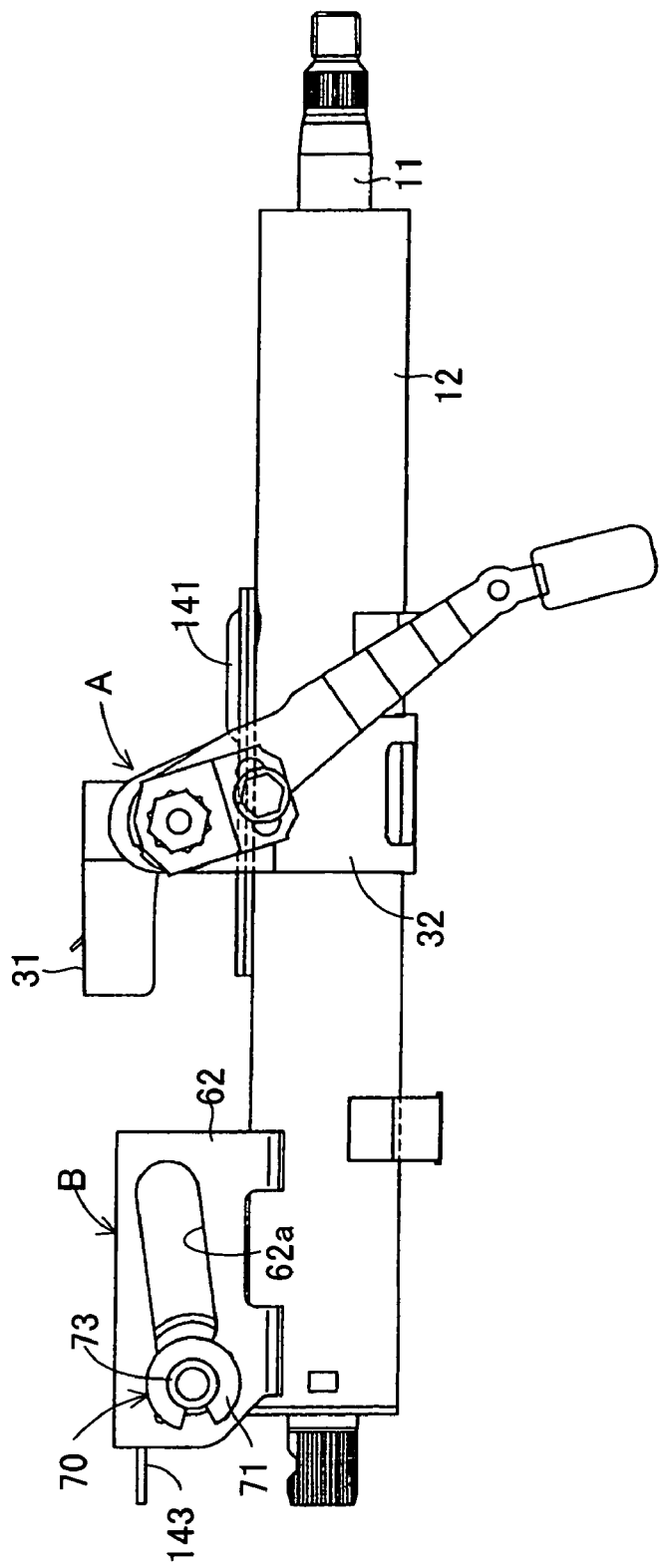
FIG. 32 is a side view showing a sixth embodiment of the impact-absorbing steering column apparatus according to the present invention.
Figure 33:
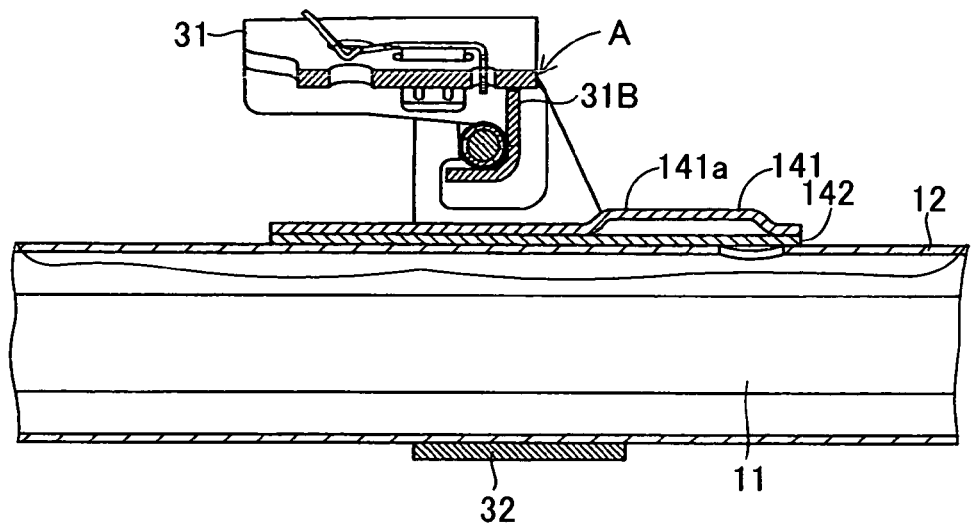
FIG. 33 is a vertical, longitudinal sectional view showing the configurational relation between an upper energy-absorbing member and a reinforcement plate of a support bracket shown in FIG. 32.
Figure 34:
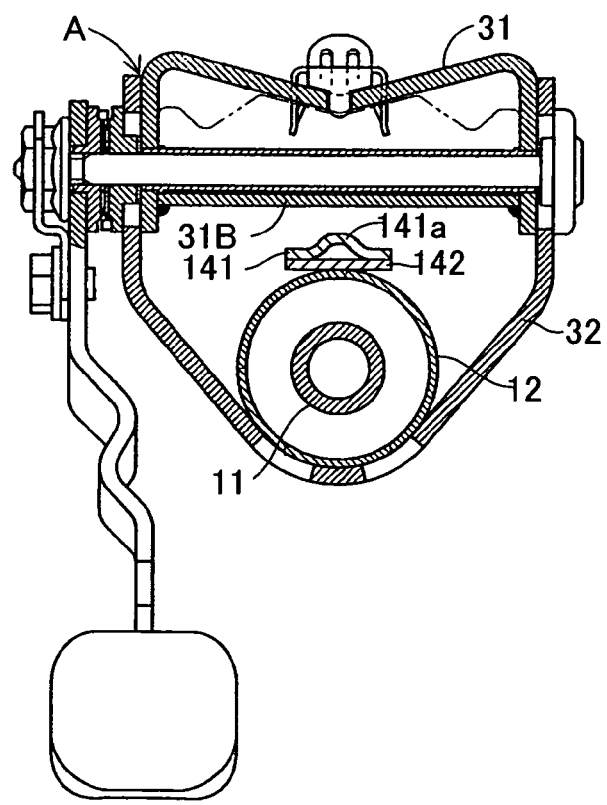
FIG. 34 is a vertical, transverse sectional view showing the configurational relation between the upper energy-absorbing member and the reinforcement plate of the support bracket shown in FIG. 32.

As shown in FIG. 32, the energy-absorbing member 143 provided in the lower support mechanism B is an elongated plate. When the steering column 12 moves frontward, the energy-absorbing member 143 is engaged with the collar 73 of the connection means 70 and plastically deformed to thereby absorb secondary collision energy. The energy-absorbing member 143 is fixedly attached, at its one end portion, to the column-side bracket 62 in the lower support mechanism B; loops around the collar 73; and extends frontward.

Figure 35:
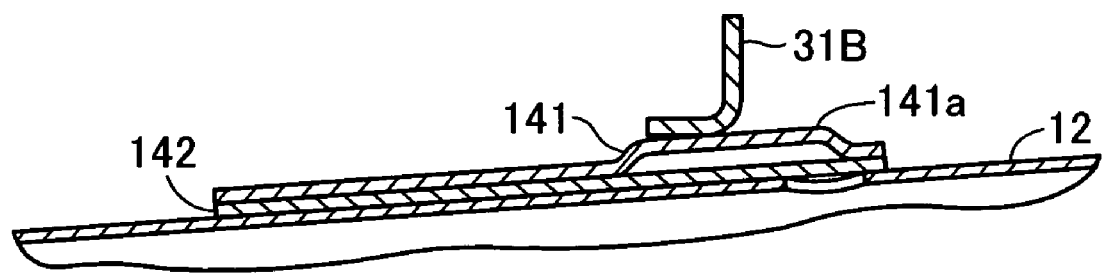
FIG. 35 is an explanatory view for explaining an action in the case where the upper component of a secondary collision load input to a steering column of the steering column assembly shown in FIG. 32 is small.

According to the thus-configured sixth embodiment, in the event of a secondary collision that accompanies a collision of the vehicle, usually, in accordance with a secondary collision load input to the steering column 12 via the steering shaft 11, the steering column 12 tilts upward at the initial stage of the secondary collision and subsequently moves frontward along its axial direction. In the case where an upward component of the secondary collision load input to the steering column 12 is small, as shown in FIG. 35, the bulge portion 141a of the upper energy-absorbing member 141 is engaged with the curved lower end portion of the reinforcement plate 31B of the support bracket 31 and moves frontward. However, the upper energy-absorbing member 141 may not be plastically deformed. In this case, the lower energy-absorbing member 143 is plastically deformed by means of the collar 73. Since secondary collision energy is absorbed by means of plastic deformation of only the energy-absorbing member 143 caused by the collar 73, an absorption load for secondary collision energy is small.

Figure 36:
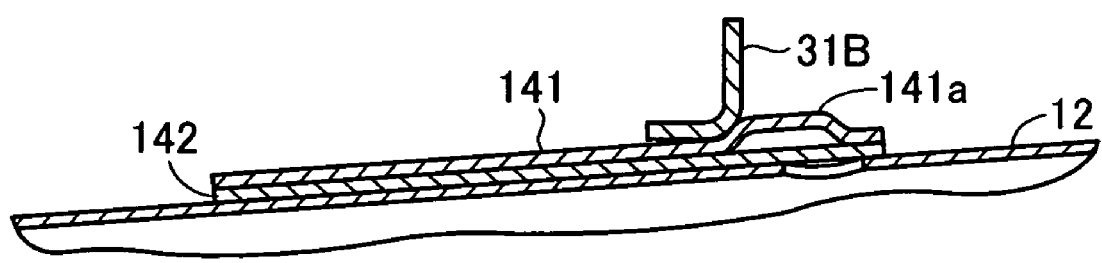
FIG. 36 is an explanatory view for explaining an action in the case where the upper component of the secondary collision load input to the steering column of the steering column assembly shown in FIG. 32 is large.

In the case where the upward component of the secondary collision load input to the steering column 12 is large, as shown in FIG. 36, the bulge portion 141a of the upper energy-absorbing member 141 may be engaged with the curved lower end portion of the reinforcement plate 31B of the support bracket 31. In this case, the energy-absorbing member 141 moves frontward while being plastically deformed. Since secondary collision energy is absorbed by means of plastic deformation of the energy-absorbing member 141 caused by the reinforcement plate 31B and plastic deformation of the energy-absorbing member 143 caused by the collar 73, an absorption load for secondary collision energy is larger than that in the case where the upward component of load is small. In this case, the quantity of plastic deformation of the energy-absorbing member 141 caused by the reinforcement member 31B varies dependently on the upward component of the secondary collision load input to the steering column 12.

As described above, according to the sixth embodiment, in the event of a secondary collision of the occupant H with the steering system, energy-absorption-load-changing means including the energy-absorbing member 141 and the reinforcement plate 31B changes an absorption load for secondary collision energy in accordance with the direction and load of a secondary collision of the occupant H with the steering system. In other words, the sixth embodiment can be mechanically implemented by means of appropriately setting, for example, the shape of the bulge portion 141a of the energy-absorbing member 141 and the shape and arrangement of the reinforcement plate 31B, without need to employ electrical control, whose cost is high, and thus at low cost.

FIGS. 37 to 42 show a seventh embodiment of the impact-absorbing steering column apparatus according to the present invention. In the seventh embodiment, collision-energy-absorbing means for absorbing secondary collision energy of the occupant H includes an energy-absorbing member 151 provided in the upper support mechanism A and an energy-absorbing member 153 provided in the lower support mechanism B. Structural features other than the collision-energy-absorbing means for absorbing secondary collision energy of the occupant H are substantially identical with those of the above-described first embodiment and are thus denoted by common reference numerals, and repeated description thereof is omitted.

The energy-absorbing member 151 is an iron plate and plastically deformed when moving frontward while being engaged with the reinforcement plate 31B of the support bracket 31 in the upper support mechanism A, thereby absorbing secondary collision energy. The energy-absorbing member 151, together with a base plate 152, is welded to the upper surface of the steering column 12. The energy-absorbing member 151 assumes an arcuate cross-sectional shape so as to be curved similarly to the outer circumference of the steering column 12 with a predetermined gap held therebetween. An upper surface of the energy-absorbing member 151 extending from its intermediate portion to its rear end portion can be engaged with a curved lower end portion of the reinforcement plate 31B, which is bent to have an L-shaped cross section.

Figure 38:
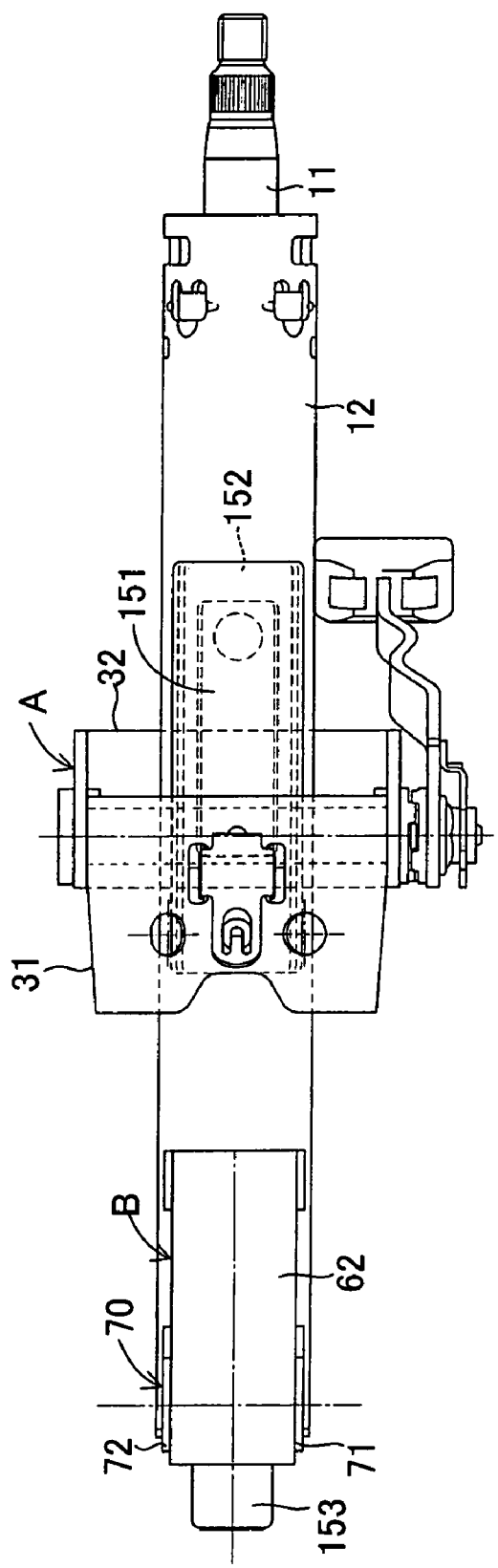
FIG. 38 is a plan view of the steering column assembly shown in FIG. 37.
Figure 39:
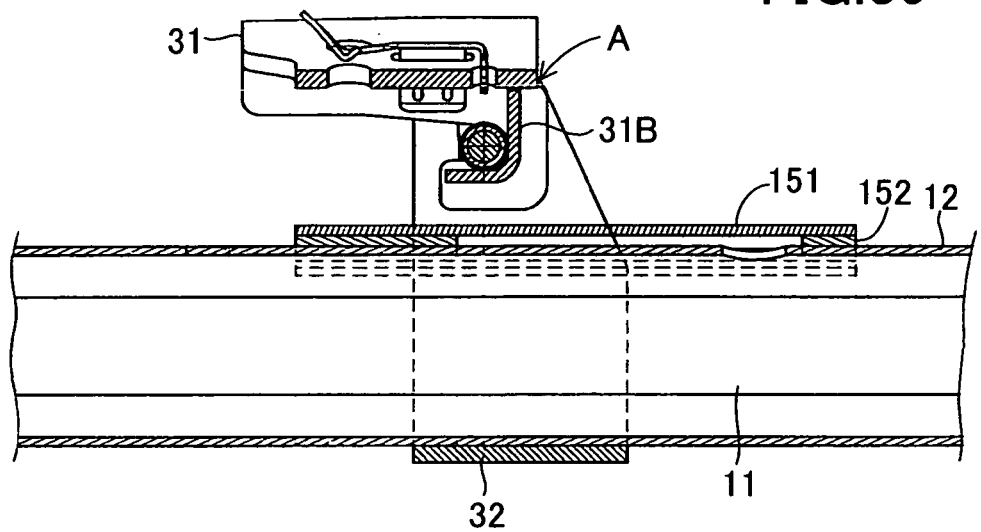
FIG. 39 is a vertical, longitudinal sectional view showing the configurational relation between an upper energy-absorbing member and a reinforcement plate of a support bracket shown in FIG. 37.
Figure 40:
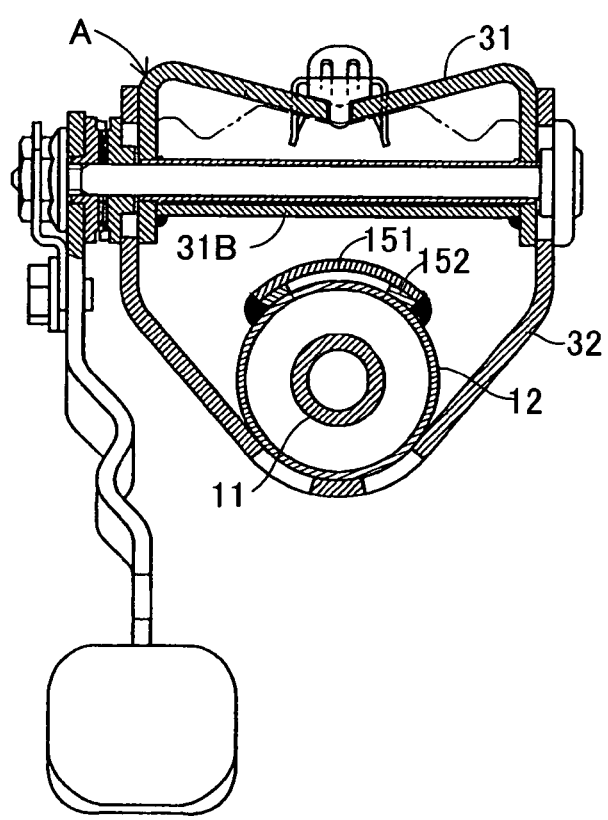
FIG. 40 is a vertical, transverse sectional view showing the configurational relation between the upper energy-absorbing member and the reinforcement plate of the support bracket shown in FIG. 37.

The base plate 152 is an iron plate and adapted to form a space (a space that enables plastic deformation of the energy-absorbing member 151) between the steering column 12 and the energy-absorbing member 151. The base plate 152 assumes an arcuate cross-sectional shape so as to be curved similarly to the outer circumference of the steering column 12. As shown in FIG. 38, the base plate 152 has a cutout that assumes a rectangular shape as viewed in plane. The cutout is formed in a region extending from an intermediate portion of the base plate 152 to a rear end portion of the base plate 152.

Figure 37:
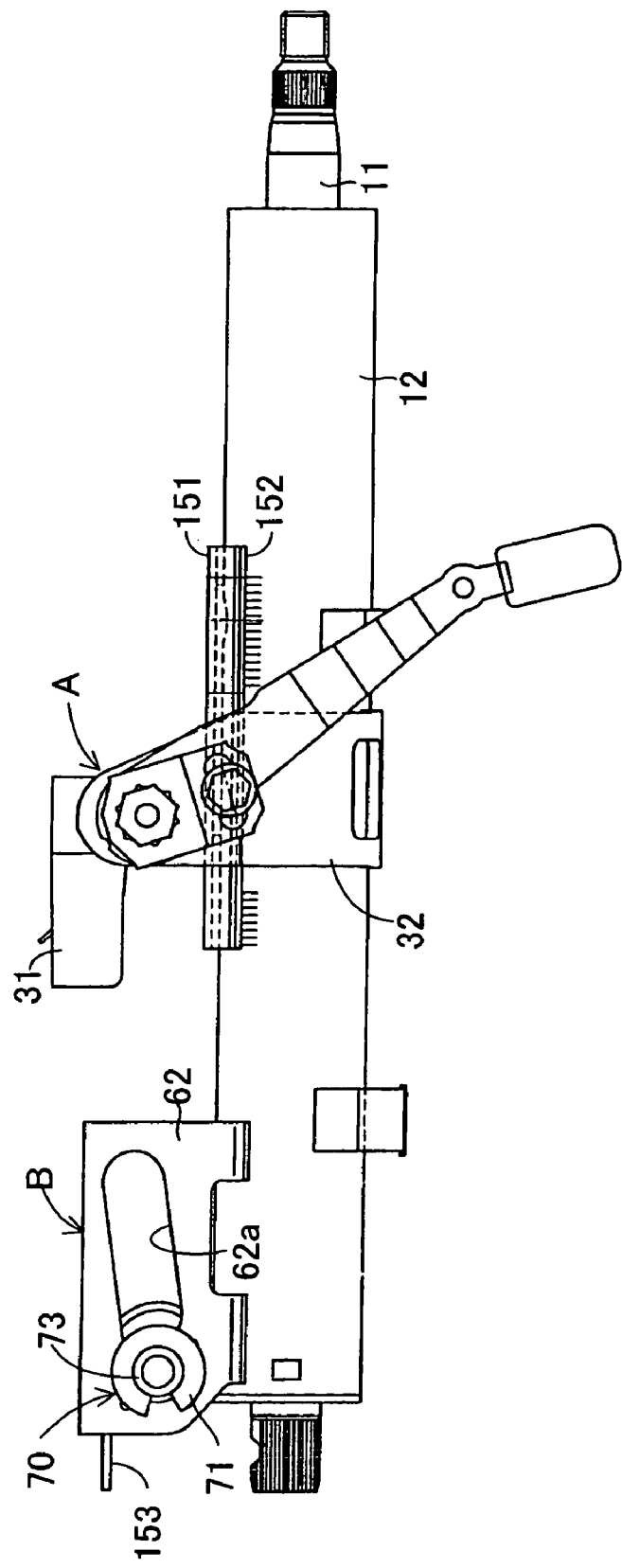
FIG. 37 is a side view showing a seventh embodiment of the impact-absorbing steering column apparatus according to the present invention.

As shown in FIGS. 37 and 38, the energy-absorbing member 153 provided in the lower support mechanism B is an elongated plate. When the steering column 12 moves frontward, the energy-absorbing member 153 is engaged with the collar 73 of the connection means 70 and plastically deformed to thereby absorb secondary collision energy. The energy-absorbing member 153 is fixedly attached, at its one end portion, to the column-side bracket 62 in the lower support mechanism B; loops around the collar 73; and extends frontward.

Figure 41:
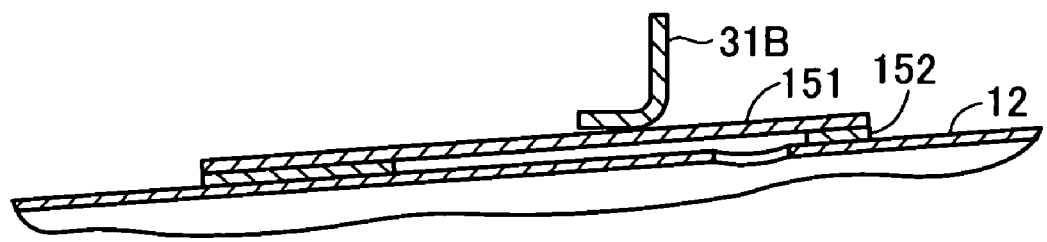
FIG. 41 is an explanatory view for explaining an action in the case where the upper component of a secondary collision load input to a steering column of the steering column assembly shown in FIG. 37 is small.

According to the thus-configured seventh embodiment, in the event of a secondary collision that accompanies a collision of the vehicle, usually, in accordance with a secondary collision load input to the steering column 12 via the steering shaft 11, the steering column 12 tilts upward at the initial stage of the secondary collision and subsequently moves frontward along its axial direction. In the case where an upward component of the secondary collision load input to the steering column 12 is small, as shown in FIG. 41, the upper energy-absorbing member 151 is engaged with the curved lower end portion of the reinforcement plate 31B of the support bracket 31 and moves frontward. However, the upper energy-absorbing member 151 may not be plastically deformed. In this case, the lower energy-absorbing member 153 is plastically deformed by means of the collar 73. Since secondary collision energy is absorbed by means of plastic deformation of only the energy-absorbing member 153 caused by the collar 73, an absorption load for secondary collision energy is small.

Figure 42:
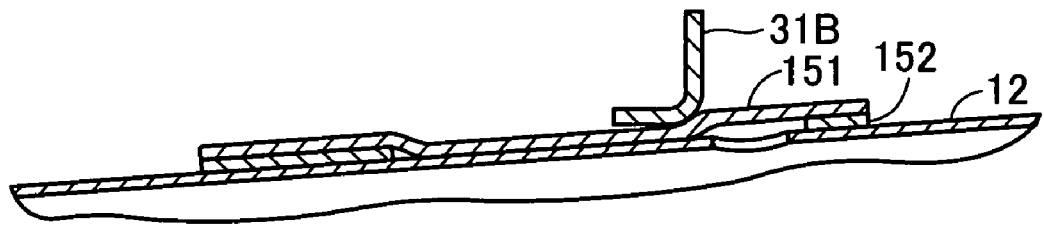
FIG. 42 is an explanatory view for explaining an action in the case where the upper component of the secondary collision load input to the steering column of the steering column assembly shown in FIG. 37 is large.

In the case where the upward component of the secondary collision load input to the steering column 12 is large, as shown in FIG. 42, a portion of the upper energy-absorbing member 151 may be engaged with the curved lower end portion of the reinforcement plate 31B of the support bracket 31. In this case, the energy-absorbing member 151 moves frontward while being plastically deformed. Since secondary collision energy is absorbed by means of plastic deformation of the energy-absorbing member 151 caused by the reinforcement plate 31B and plastic deformation of the energy-absorbing member 153 caused by the collar 73, an absorption load for secondary collision energy is larger than that in the case where the upward component of load is small. In this case, the quantity of plastic deformation of the energy-absorbing member 151 caused by the reinforcement member 31B varies dependently on the upward component of the secondary collision load input to the steering column 12.

As described above, according to the seventh embodiment, in the event of a secondary collision of the occupant H with the steering system, energy-absorption-load-changing means including the energy-absorbing member 151 and the reinforcement plate 31B changes an absorption load for secondary collision energy in accordance with the direction and load of a secondary collision of the occupant H with the steering system. In other words, the seventh embodiment can be mechanically implemented by means of appropriately setting, for example, the shape of the energy-absorbing member 151, the shape of the base plate 152, and the shape and arrangement of the reinforcement plate 31B, without need to employ electrical control, whose cost is high, and thus at low cost.

FIGS. 43 to 50 show an eighth embodiment of the impact-absorbing steering column apparatus according to the present invention. In the eighth embodiment, collision-energy-absorbing means for absorbing secondary collision energy of the occupant H includes an energy-absorbing member 161 provided in the upper support mechanism A, a deformable portion 31e provided in the plate 31A of the support bracket 31 in the upper support mechanism A, and an energy-absorbing member 165 provided in the lower support mechanism B. Structural features other than the collision-energy-absorbing means for absorbing secondary collision energy of the occupant H are substantially identical with those of the above-described first embodiment and are thus denoted by common reference numerals, and repeated description thereof is omitted.

The energy-absorbing member 161 is a thin iron plate and squeeze-deformed when the steering column 12 moves frontward with the energy-absorbing member 161 being engaged with the reinforcement plate 31B of the support bracket 31 in the upper support mechanism A, thereby absorbing secondary collision energy. The energy-absorbing member 161 is provided on the upper surface of the steering column 12 in such a manner as to be movable in the direction of the column axis, by use of a guide plate 162, a holder 163, and a round bar 164. The energy-absorbing member 161 has a projection 161a projecting upward from its rear end portion. The projection 161a can be engaged with an engagement hole 31f formed in the reinforcement palate 31B.

The guide plate 162 is an iron plate and allows the energy-absorbing member 161 to move along the steering column 12 when the energy-absorbing member 161 is squeeze-deformed. The guide plate 162 is welded to the upper surface of the steering column 12. The holder 163 is an iron plate and causes squeeze-deformation of the energy-absorbing member 161 in cooperation with the round bar 164. The holder 163 is welded to an upper portion of the steering column 12 while straddling a portion of the energy-absorbing member 161 and a portion of the guide plate 162. The round bar 164 is made of iron and is incorporated in the holder 163 together with a portion of the energy-absorbing member 161.

The deformable portion 31e provided on the plate 31A of the support bracket 31 in the upper support mechanism A is formed by means of forming in the plate 31A an elongated hole 31e1 extending in the front-rear direction. When an upward load exerted on the deformable portion 31e from the collar 42 and the lock bolt 41 of the clamp means 40 becomes a predetermined value or greater, the deformable portion 31e is plastically deformed upward, thereby allowing the projection 161a of the energy-absorbing member 161 to be fitted into the engagement hole 31f formed in the reinforcement plate 31B.

Figure 43:
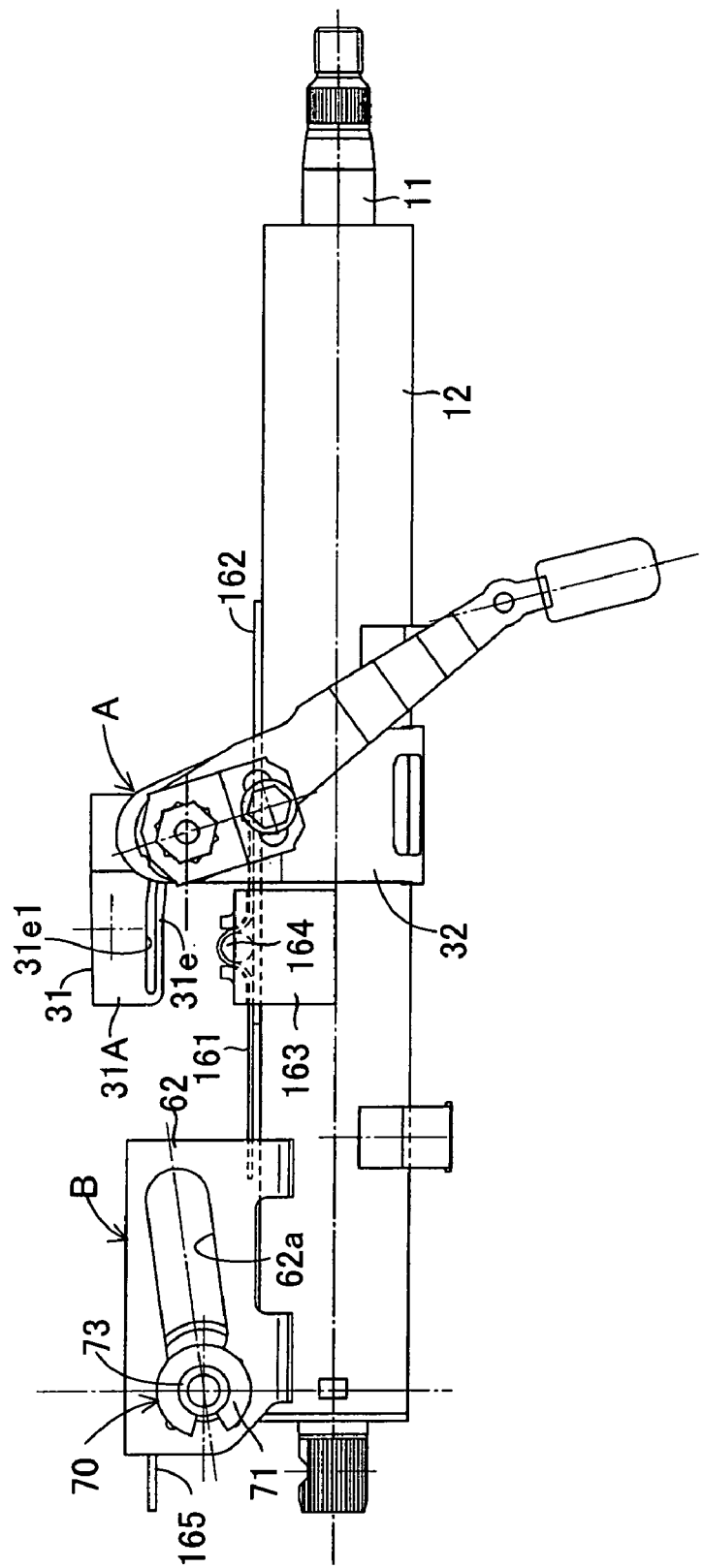
FIG. 43 is a side view showing an eighth embodiment of the impact-absorbing steering column apparatus according to the present invention.
Figure 44:
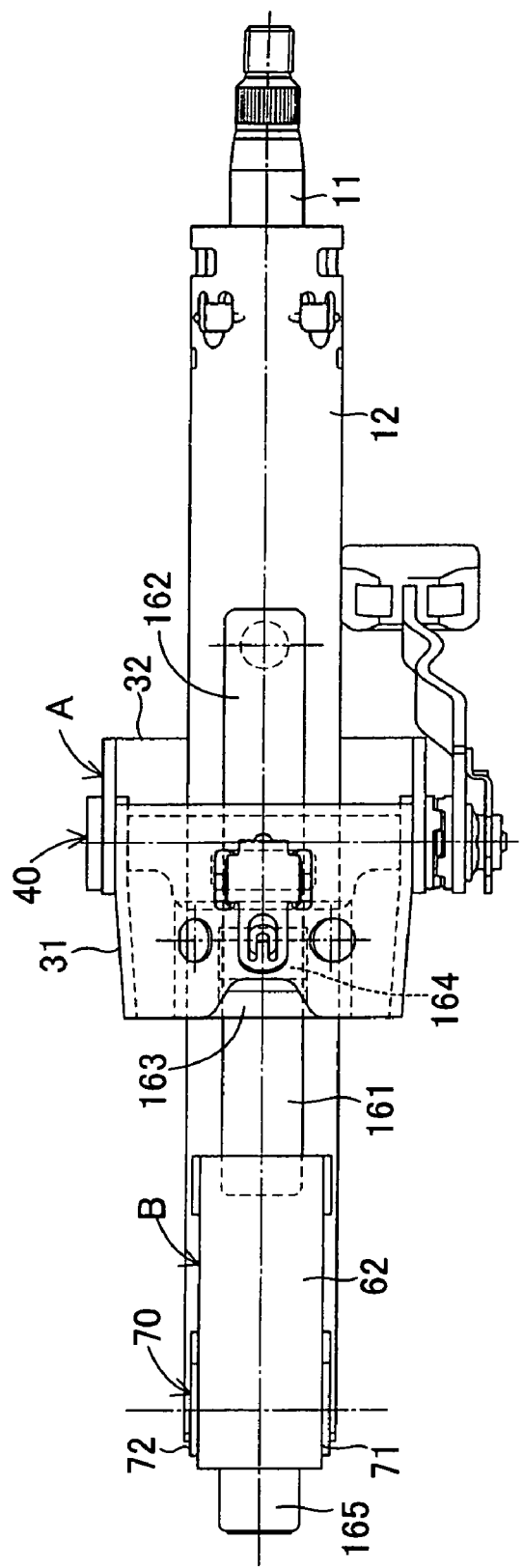
FIG. 44 is a plan view of the steering column assembly shown in FIG. 43.
Figure 45:
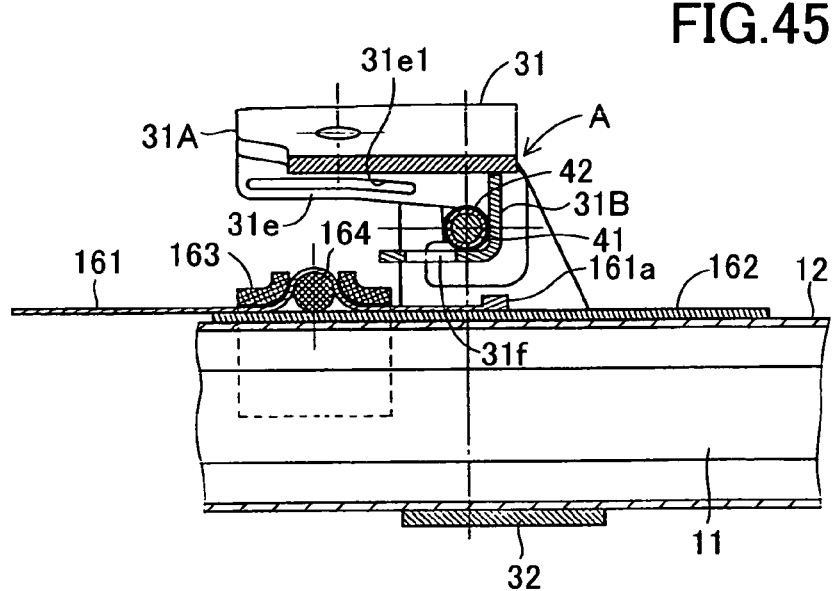
FIG. 45 is a vertical, longitudinal sectional view showing the configurational relation between an upper energy-absorbing member and a support bracket shown in FIG. 43.
Figure 46:
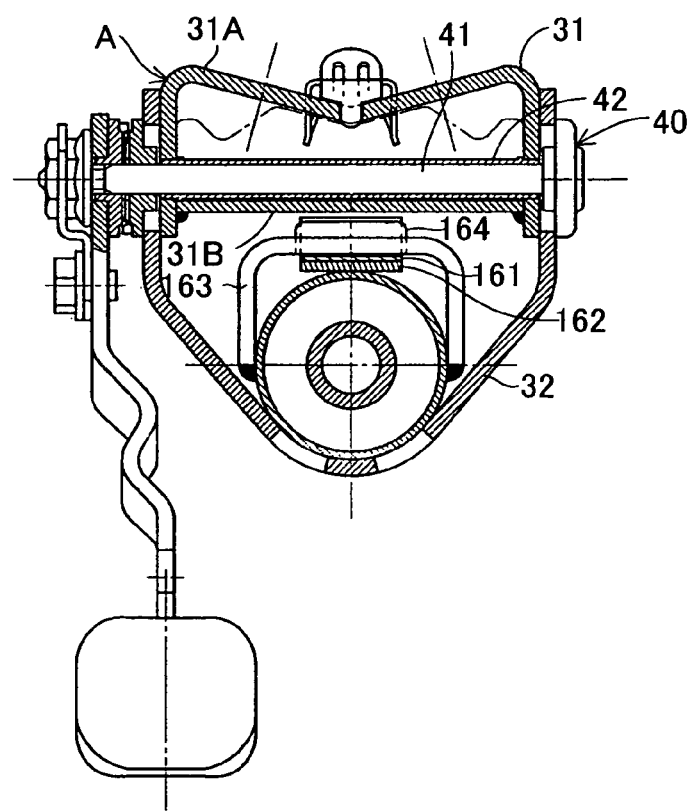
FIG. 46 is a vertical, transverse sectional view showing the configurational relation between the upper energy-absorbing member and the support bracket shown in FIG. 43.

As shown in FIGS. 43 and 44, the energy-absorbing member 165 provided in the lower support mechanism B is an elongated plate. When the steering column 12 moves frontward, the energy-absorbing member 165 is engaged with the collar 73 of the connection means 70 and plastically deformed to thereby absorb secondary collision energy. The energy-absorbing member 165 is fixedly attached, at its one end portion, to the column-side bracket 62 in the lower support mechanism B; loops around the collar 73; and extends frontward.

Figure 47:
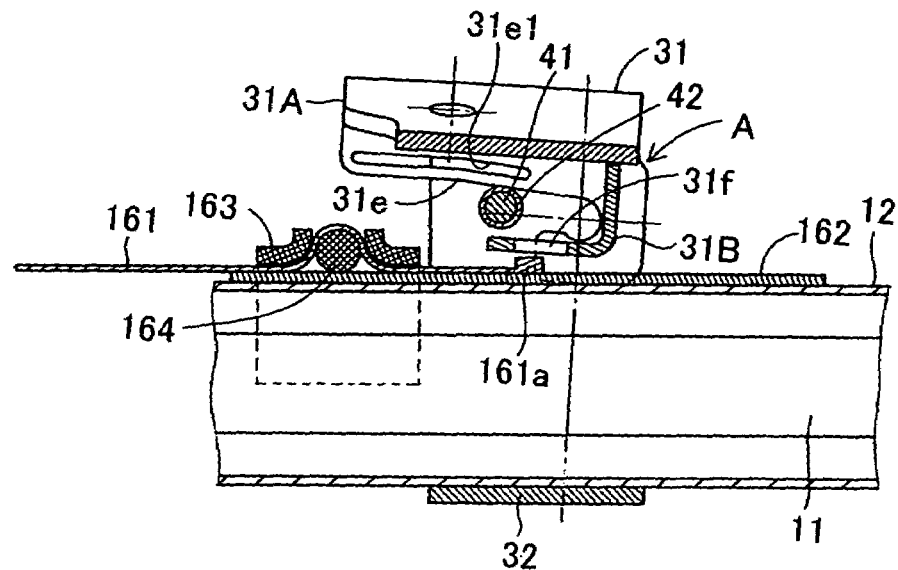
FIG. 47 is an explanatory view for explaining an action as viewed at its initial stage in the case where the upper component of a secondary collision load input to a steering column of the steering column assembly shown in FIG. 43 is small.
Figure 48:
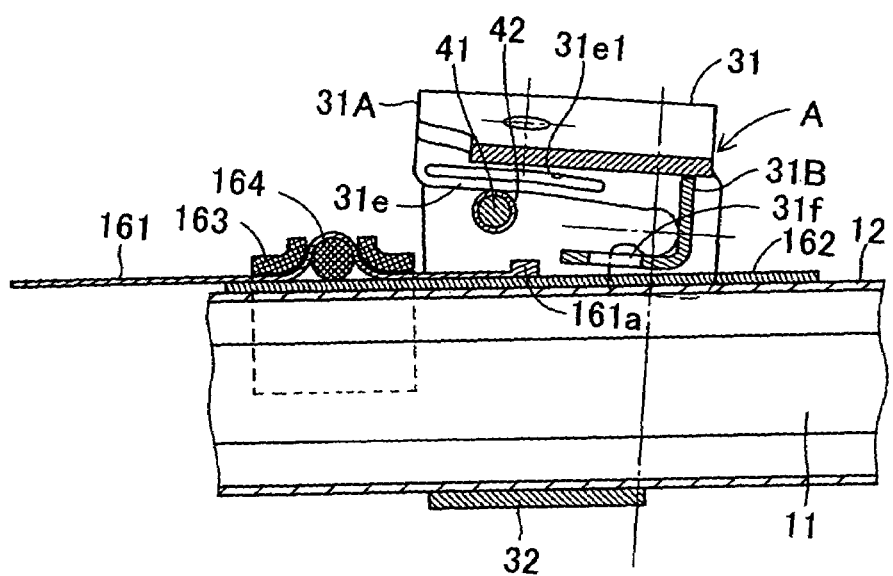
FIG. 48 is an explanatory view for explaining an action as viewed at its intermediate stage in the case where the upper component of the secondary collision load input to the steering column of the steering column assembly shown in FIG. 43 is small.

According to the thus-configured eighth embodiment, in the event of a secondary collision that accompanies a collision of the vehicle, usually, in accordance with a secondary collision load input to the steering column 12 via the steering shaft 11, the steering column 12 tilts upward at the initial stage of the secondary collision and subsequently moves frontward along its axial direction. In the case where an upward component of the secondary collision load input to the steering column 12 is small, as shown in FIGS. 47 and 48, the deformable portion 31e provided on the plate 31A of the support bracket 31 in the upper support mechanism A is not plastically deformed. While the projection 161a of the upper energy-absorbing member 161 is not engaged with the engagement hole 31f formed in the reinforcement plate 31B of the support bracket 31, the lower energy-absorbing member 165 is plastically deformed by means of the collar 73. In this case, since secondary collision energy is absorbed by means of plastic deformation of only the energy-absorbing member 165 caused by the collar 73, an absorption load for secondary collision energy is small.

Figure 49:
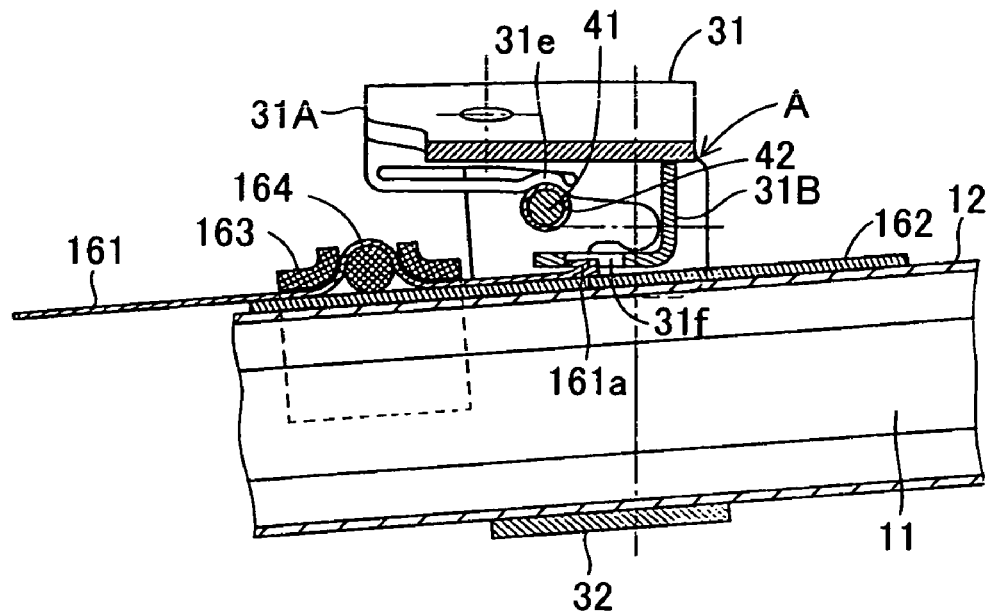
FIG. 49 is an explanatory view for explaining an action as viewed at its initial stage in the case where the upper component of the secondary collision load input to the steering column of the steering column assembly shown in FIG. 43 is large.
Figure 50:
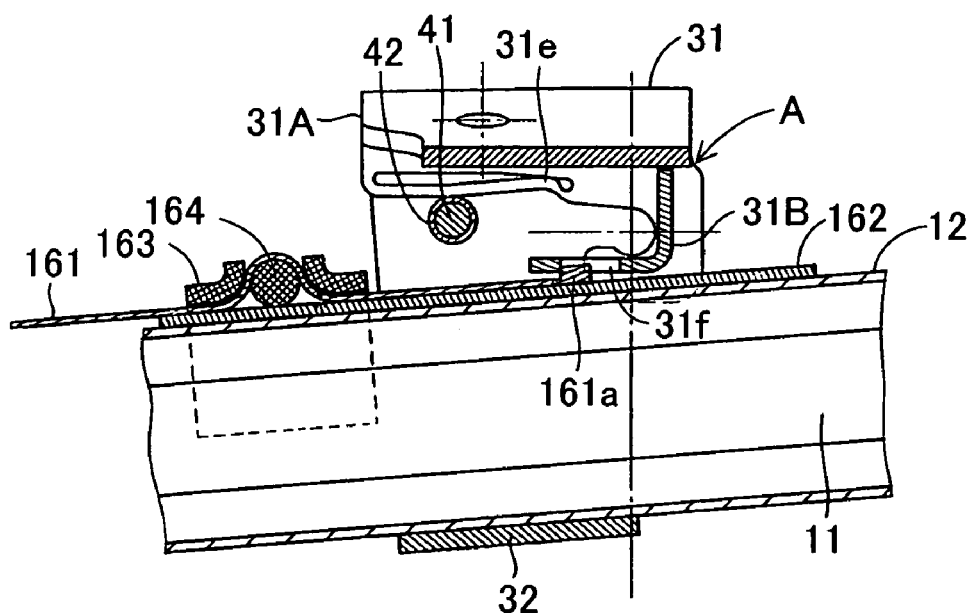
FIG. 50 is an explanatory view for explaining an action as viewed at its intermediate stage in the case where the upper component of the secondary collision load input to the steering column of the steering column assembly shown in FIG. 43 is large.

In the case where the upward component of the secondary collision load input to the steering column 12 is large, as shown in FIGS. 49 and 50, the deformable portion 31e provided on the plate 31A of the support bracket 31 receives an upward load equal to or greater than a set value from the collar 42 and the lock bolt 41 of the clamp means 40 to thereby be plastically deformed upward. The projection 161a of the energy-absorbing member 161 is fitted into the engagement hole 31f formed in the reinforcement plate 31B. As a result, as the steering column 12 moves frontward, the holder 163 and the round bar 164 squeeze-deforms the energy-absorbing member 161. At the same time, the lower energy-absorbing member 165 is plastically deformed by means of the collar 73.

In this case, since secondary collision energy is absorbed by means of squeeze-deformation of the energy-absorbing member 161 caused by the holder 163 and the round bar 164 and plastic deformation of the energy-absorbing member 165 caused by the collar 73, an absorption load for secondary collision energy is larger than that in the case where the upward component of load is small. In this case, squeeze-deformation of the energy-absorbing member 161 caused by the holder 163 and the round bar 164 is substantially constant irrespective of variations in a secondary collision load input substantially horizontally to the steering column 12.

As described above, according to the eighth embodiment, in the event of a secondary collision of the occupant H with the steering system, energy-absorption-load-changing means including the energy-absorbing member 161, the guide plate 162, the holder 163, the round bar 164, and the support bracket 31 in the upper support mechanism A changes an absorption load for secondary collision energy in accordance with the direction and load of a secondary collision of the occupant H with the steering system. In other words, the eighth embodiment can be mechanically implemented by means of appropriately setting, for example, the shape of the projection 161a of the energy-absorbing member 161, the shape of the holder 163, the shape of the round bar 164, and the shape and arrangement of the support bracket 31 in the upper support mechanism A, without need to employ electrical control, whose cost is high, and thus at low cost.

FIGS. 51 to 58 show a ninth embodiment of the impact-absorbing steering column apparatus according to the present invention. In the ninth embodiment, collision-energy-absorbing means for absorbing secondary collision energy of the occupant H includes an energy-absorbing member 171 provided in the upper support mechanism A, the deformable portion 31e provided in the plate 31A of the support bracket 31 in the upper support mechanism A, and an energy-absorbing member 173 provided in the lower support mechanism B. Structural features other than the collision-energy-absorbing means for absorbing secondary collision energy of the occupant H are substantially identical with those of the above-described first embodiment and are thus denoted by common reference numerals, and repeated description thereof is omitted.

The energy-absorbing member 171 is a thin iron plate and plastically deformed when moving frontward while being engaged with the reinforcement plate 31B of the support bracket 31 in the upper support mechanism A, thereby absorbing secondary collision energy. The energy-absorbing member 171, together with a base plate 172, is welded to the upper surface of the steering column 12. The energy-absorbing member 171 includes a bulge portion 171a bulging upward and extending from its intermediate portion to its rear end portion. The bulge portion 171a extends along the axial direction of the steering column 12 and can be engaged with a curved lower end portion of the reinforcement plate 31B, which is bent to have an L-shaped cross section.

The deformable portion 31e provided on the plate 31A of the support bracket 31 in the upper support mechanism A is formed by means of forming in the plate 31A the elongated hole 31e1 extending in the front-rear direction. When the deformable portion 31e receives an upward load equal to or greater than a set value from the collar 42 and the lock bolt 41 of the clamp means 40, the deformable portion 31e is plastically deformed upward, thereby allowing the bulge portion 171a of the energy-absorbing member 171 to be engaged with the curved lower end portion of the reinforcement plate 31B.

Figure 51:
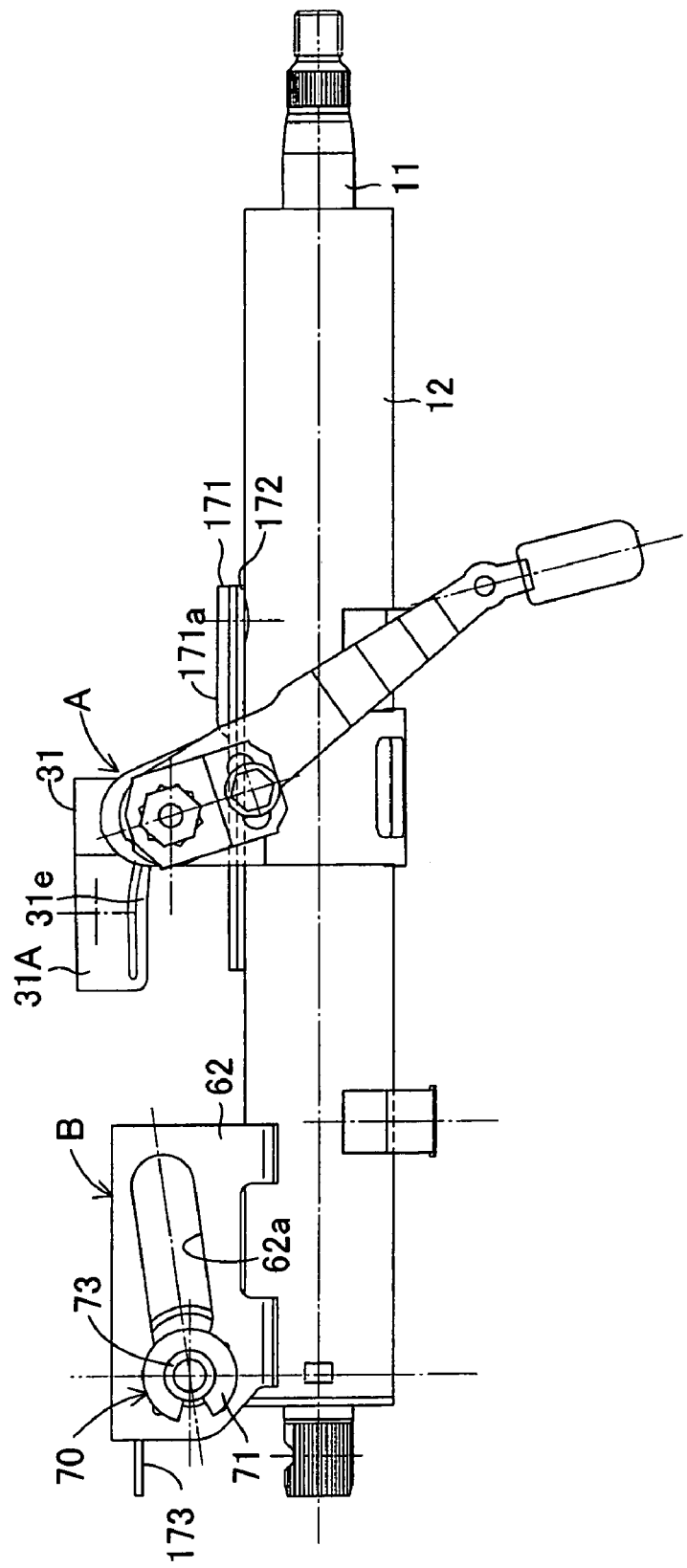
FIG. 51 is a side view showing a ninth embodiment of the impact-absorbing steering column apparatus according to the present invention.
Figure 52:
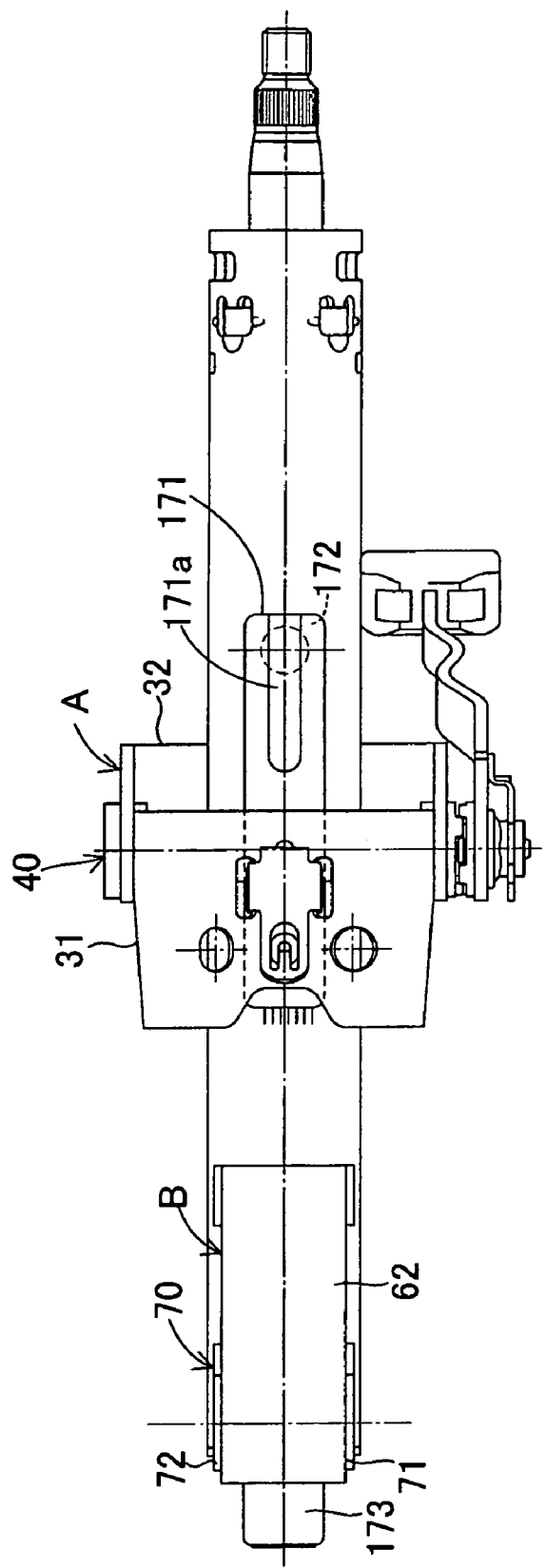
FIG. 52 is a plan view of the steering column assembly shown in FIG. 51.
Figure 53:
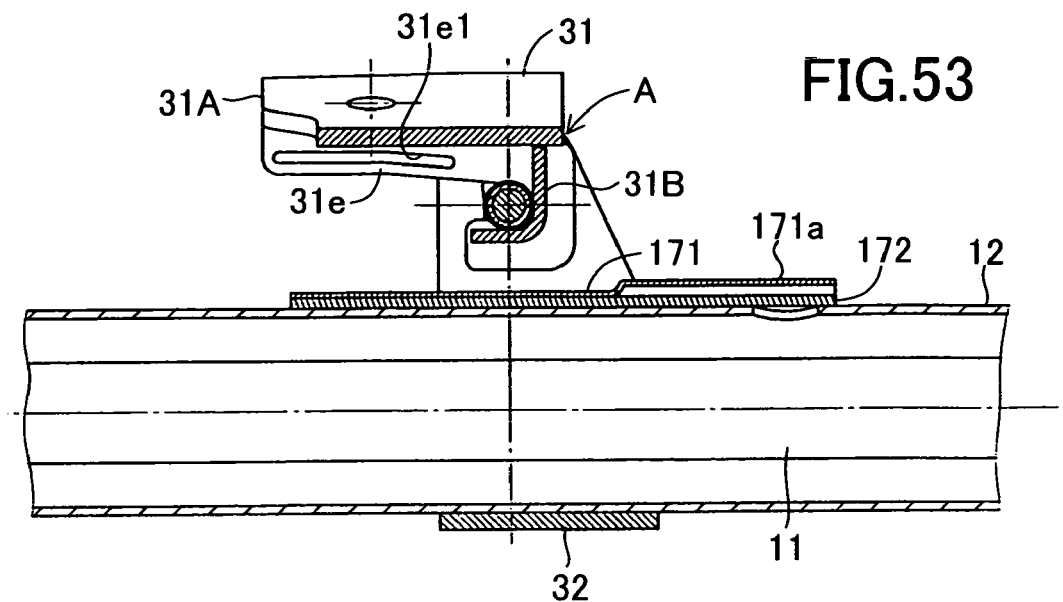
FIG. 53 is a vertical, longitudinal sectional view showing the configurational relation between an upper energy-absorbing member and a support bracket shown in FIG. 51.
Figure 54:
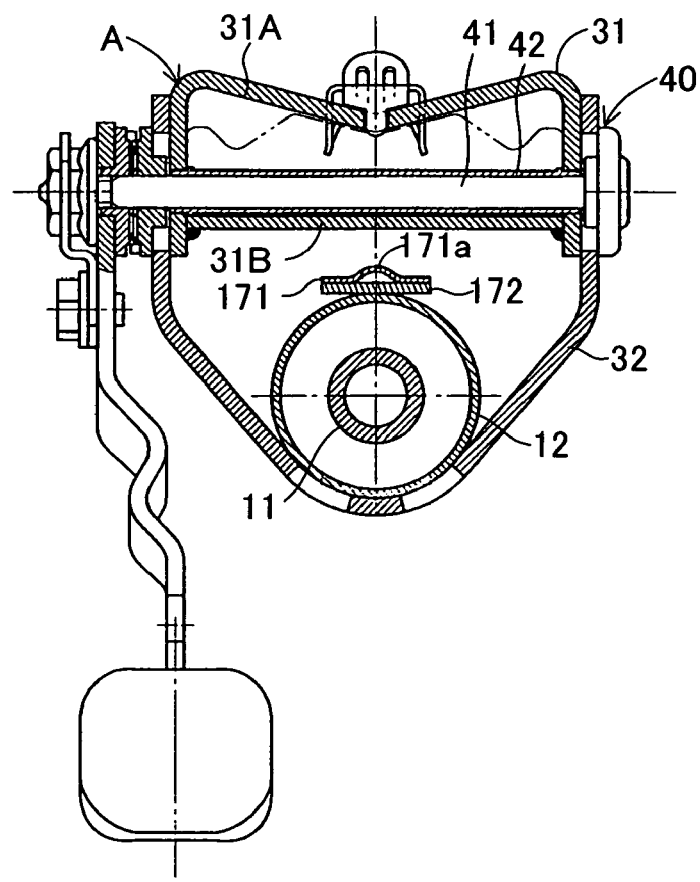
FIG. 54 is a vertical, transverse sectional view showing the configurational relation between the upper energy-absorbing member and the support bracket shown in FIG. 51.

As shown in FIGS. 51 and 52, the energy-absorbing member 173 provided in the lower support mechanism B is an elongated plate. When the steering column 12 moves frontward, the energy-absorbing member 173 is engaged with the collar 73 of the connection means 70 and plastically deformed to thereby absorb secondary collision energy. The energy-absorbing member 173 is fixedly attached, at its one end portion, to the column-side bracket 62 in the lower support mechanism B; loops around the collar 73; and extends frontward.

Figure 55:
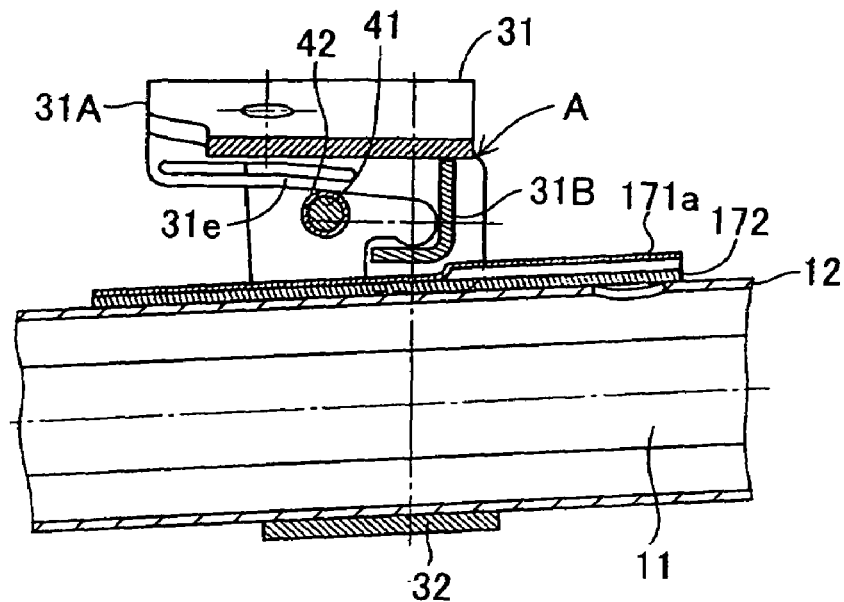
FIG. 55 is an explanatory view for explaining an action as viewed at its initial stage in the case where the upper component of a secondary collision load input to a steering column of the steering column assembly shown in FIG. 51 is small.
Figure 56:
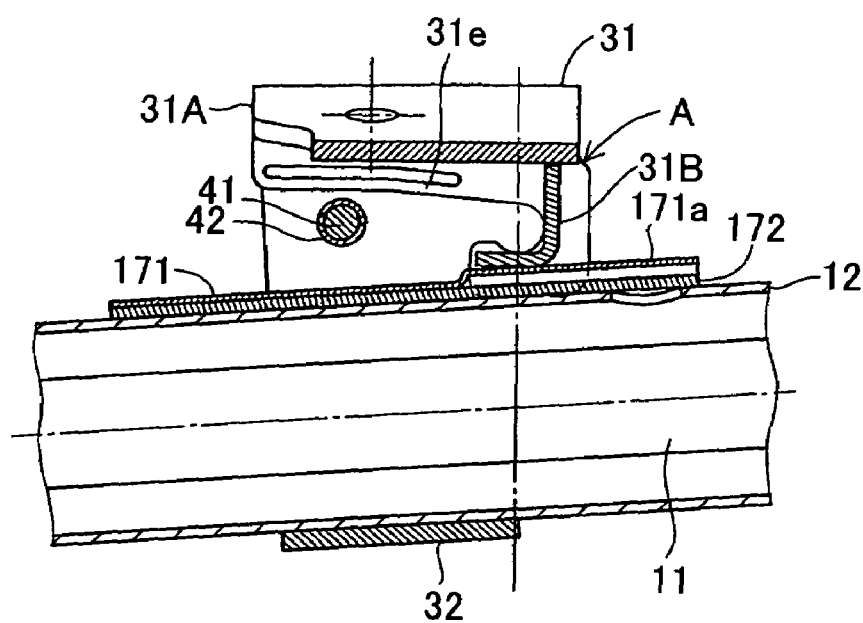
FIG. 56 is an explanatory view for explaining an action as viewed at its intermediate stage in the case where the upper component of the secondary collision load input to the steering column of the steering column assembly shown in FIG. 51 is small.

According to the thus-configured ninth embodiment, in the event of a secondary collision that accompanies a collision of the vehicle, usually, in accordance with a secondary collision load input to the steering column 12 via the steering shaft 11, the steering column 12 tilts upward at the initial stage of the secondary collision and subsequently moves frontward along its axial direction. In the case where the upward component of the secondary collision load input to the steering column 12 is small, as shown in FIGS. 55 and 56, the deformable portion 31e provided on the plate 31A of the support bracket 31 in the upper support mechanism A is not plastically deformed; and the bulge portion 171a of the upper energy-absorbing member 171 is engaged with the curved lower end portion of the reinforcement plate 31B of the support bracket 31, but is not plastically deformed. In this case, the lower energy-absorbing member 173 is plastically deformed by means of the collar 73. Since secondary collision energy is absorbed by means of plastic deformation of only the energy-absorbing member 173 caused by the collar 73, an absorption load for secondary collision energy is small.

Figure 57:
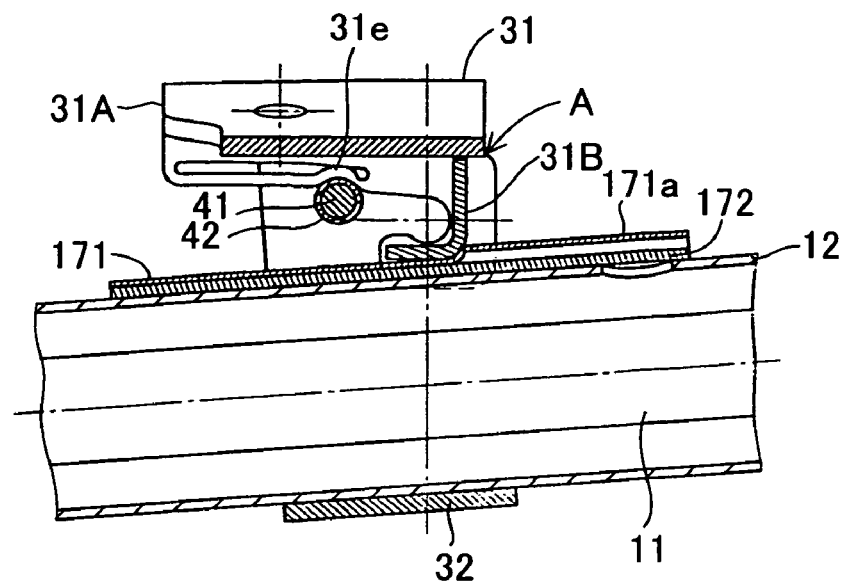
FIG. 57 is an explanatory view for explaining an action as viewed at its initial stage in the case where the upper component of the secondary collision load input to the steering column of the steering column assembly shown in FIG. 51 is large.
Figure 58:
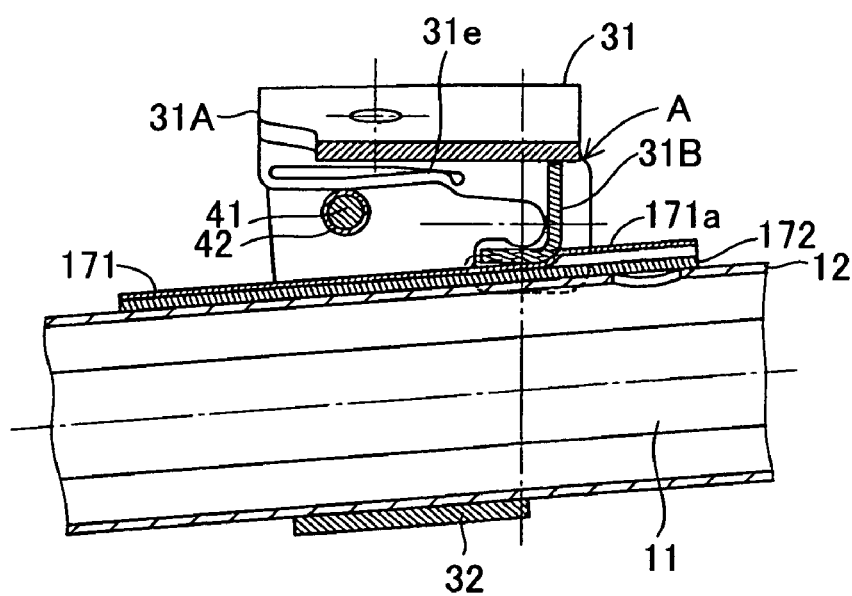
FIG. 58 is an explanatory view for explaining an action as viewed at its intermediate stage in the case where the upper component of the secondary collision load input to the steering column of the steering column assembly shown in FIG. 51 is large.

In the case where the upward component of the secondary collision load input to the steering column 12 is large, as shown in FIGS. 57 and 58, the deformable portion 31e provided on the plate 31A of the support bracket 31 receives an upward load equal to or greater than a set value from the collar 42 and the lock bolt 41 of the clamp means 40 to thereby be plastically deformed upward. The bulge portion 171a of the upper energy-absorbing member 171 is engaged with the curved lower end portion of the reinforcement plate 31B of the support bracket 31. As a result, as the steering column 12 moves frontward, the bulge portion 171a of the upper energy-absorbing member 171 is plastically deformed by means of the reinforcement plate 31B of the support bracket 31. At the same time, the lower energy-absorbing member 173 is plastically deformed by means of the collar 73.

In this case, since secondary collision energy is absorbed by means of plastic deformation of the energy-absorbing member 171 caused by the reinforcement plate 31B of the support bracket 31 and plastic deformation of the energy-absorbing member 165 caused by the collar 73, an absorption load for secondary collision energy is larger than that in the case where the upward component of load is small. In this case, the quantity of plastic deformation of the energy-absorbing member 171 caused by the reinforcement member 31B of the bracket 31 varies dependently on the upward component of the secondary collision load input to the steering column 12.

As described above, according to the ninth embodiment, in the event of a secondary collision of the occupant H with the steering system, energy-absorption-load-changing means including the energy-absorbing member 171 and the support bracket 31 in the upper support mechanism A changes an absorption load for secondary collision energy in accordance with the direction and load of a secondary collision of the occupant H with the steering system. In other words, the ninth embodiment can be mechanically implemented by means of appropriately setting, for example, the shape of the bulge portion 171a of the energy-absorbing member 171 and the shape and arrangement of the support bracket 31 in the upper support mechanism A, without need to employ electrical control, whose cost is high, and thus at low cost.

FIGS. 59 to 64 show a tenth embodiment of the impact-absorbing steering column apparatus according to the present invention. In the tenth embodiment, collision-energy-absorbing means for absorbing secondary collision energy of the occupant H includes an energy-absorbing member 181 provided in the upper support mechanism A, a squeezing plate 31C provided on the reinforcement plate 31B of the support bracket 31 in the upper support mechanism A, and an energy-absorbing member 183 provided in the lower support mechanism B. Structural features other than the collision-energy-absorbing means for absorbing secondary collision energy of the occupant H are substantially identical with those of the above-described first embodiment and are thus denoted by common reference numerals, and repeated description thereof is omitted.

The energy-absorbing member 181 is a thin iron plate and squeeze-deformed when the steering column 12 moves frontward with the energy-absorbing member 181 being engaged with the squeezing plate 31C provided on the reinforcement plate 31B of the support bracket 31 in the upper support mechanism A, thereby absorbing secondary collision energy. The energy-absorbing member 181 is welded, at its front end portion, to the upper surface of the steering column 12. The energy-absorbing member 181 includes a curved portion 181a located in its axially intermediate region, curved upward, and adapted to accommodate a round bar 182, and laterally paired arm portions 181b for restricting lateral movement of the round bar 182. The curved portion 181a, which accommodates the round bar 182, can be engaged with an engagement hole 31g formed in the squeezing plate 31C by means of being fitted into the engagement hole 31g.

The squeezing plate 31C provided on the reinforcement plate 31B of the support bracket 31 in the upper support mechanism A is an iron plate and causes squeeze-deformation of the energy-absorbing member 181 in cooperation with the round bar 182. The squeezing plate 31C is welded to the lower surface of the reinforcement plate 31B. The round bar 182 is a solid iron rod; is incorporated in the curved portion 181a of the energy-absorbing member 181; and is movable along the upper surface of the steering column 12 in the direction of the column axis.

Figure 59:
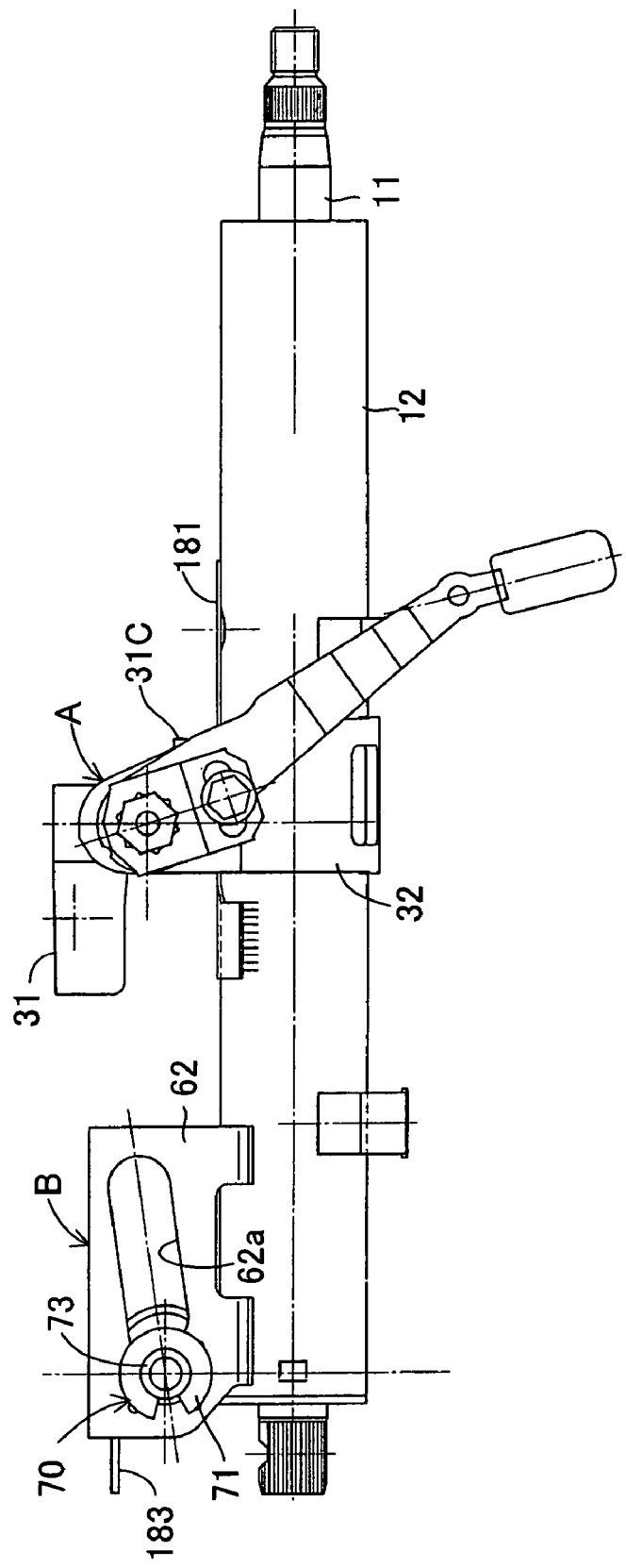
FIG. 59 is a side view showing a tenth embodiment of the impact-absorbing steering column apparatus according to the present invention.
Figure 60:
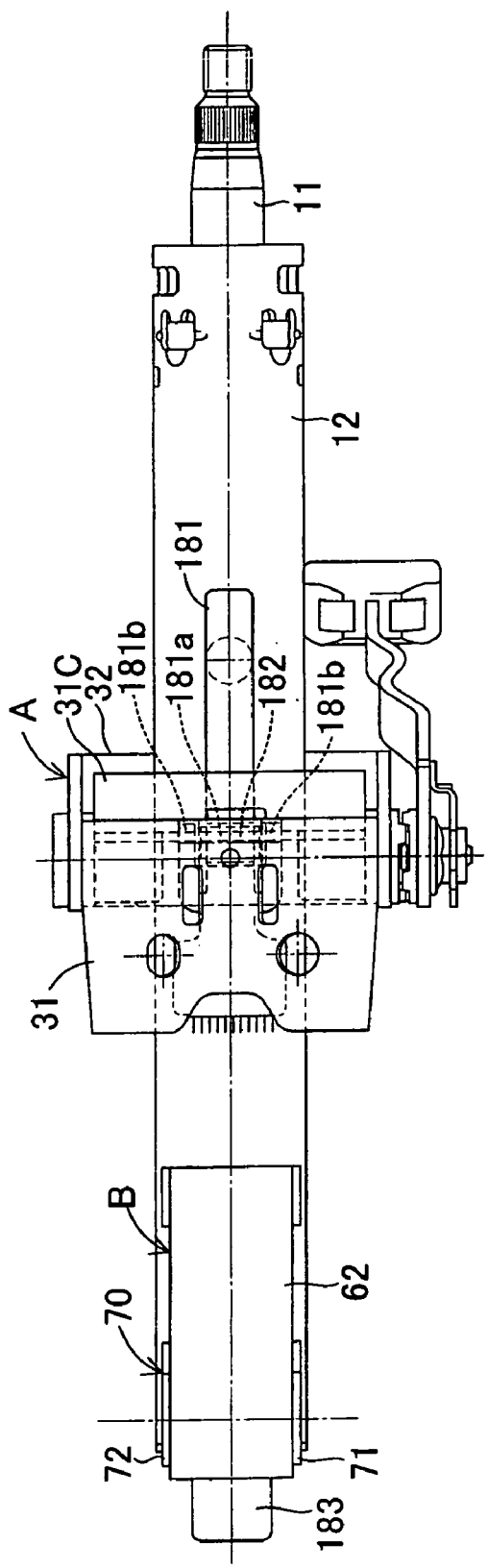
FIG. 60 is a plan view of the steering column assembly shown in FIG. 59.
Figure 61:
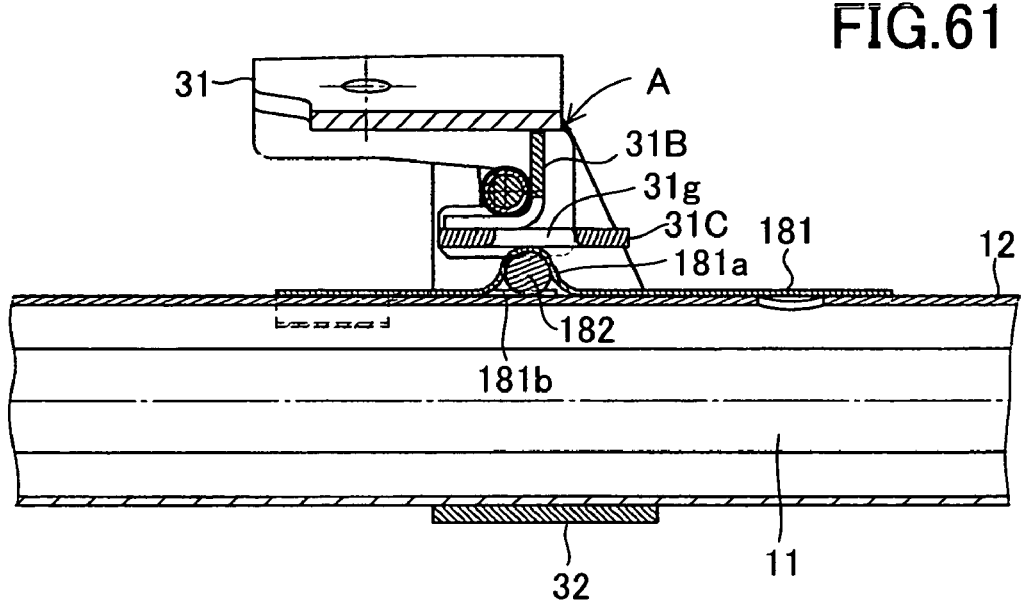
FIG. 61 is a vertical, longitudinal sectional view showing the configurational relation between an upper energy-absorbing member and a squeezing plate provided on a reinforcement plate of a support bracket in an upper support mechanism shown in FIG. 59.
Figure 62:
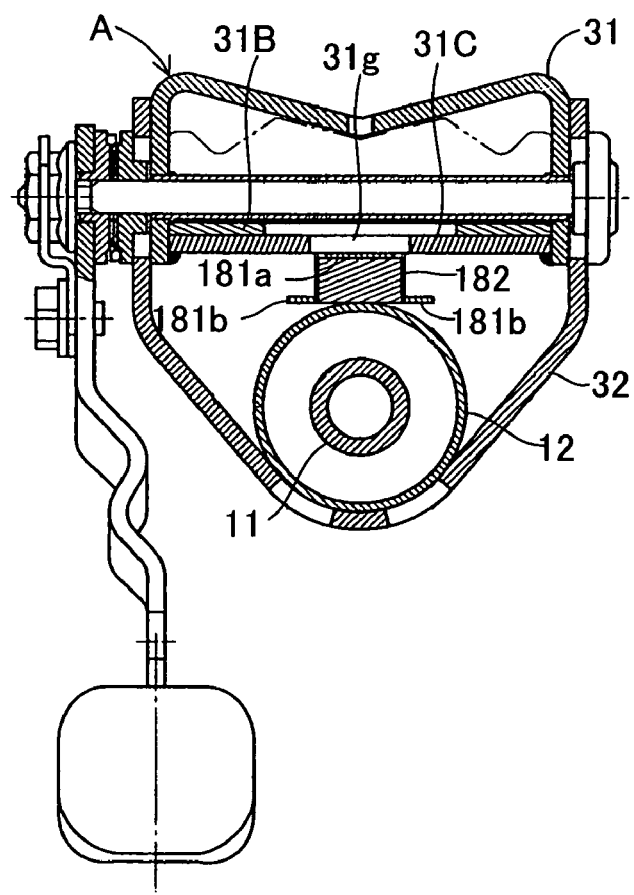
FIG. 62 is a vertical, transverse sectional view showing the configurational relation between the upper energy-absorbing member and the squeezing plate provided on the reinforcement plate of the support bracket in the upper support mechanism shown in FIG. 59.

As shown in FIGS. 59 and 60, the energy-absorbing member 183 provided in the lower support mechanism B is an elongated plate. When the steering column 12 moves frontward, the energy-absorbing member 183 is engaged with the collar 73 of the connection means 70 and plastically deformed to thereby absorb secondary collision energy. The energy-absorbing member 183 is fixedly attached, at its one end portion, to the column-side bracket 62 in the lower support mechanism B; loops around the collar 73; and extends frontward.

Figure 63:
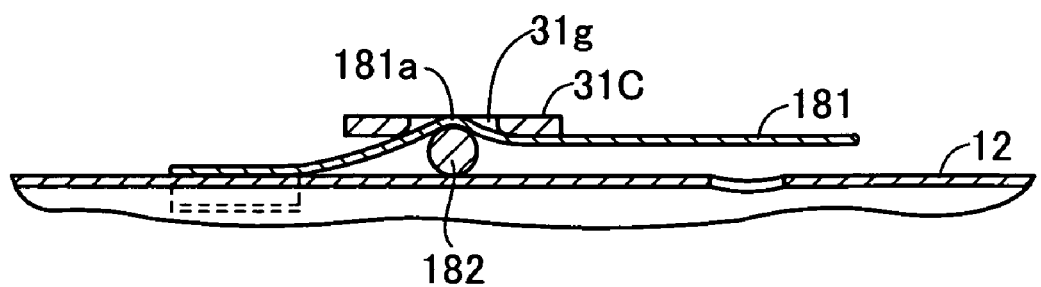
FIG. 63 is an explanatory view for explaining an action in the case where the upper component of a secondary collision load input to a steering column of the steering column assembly shown in FIG. 59 is small.

According to the thus-configured tenth embodiment, in the event of a secondary collision that accompanies a collision of the vehicle, usually, in accordance with a secondary collision load input to the steering column 12 via the steering shaft 11, the steering column 12 tilts upward at the initial stage of the secondary collision and subsequently moves frontward along its axial direction. In the case where an upward component of the secondary collision load input to the steering column 12 is small, as shown in FIG. 63, while the curved portion 181a of the upper energy-absorbing member 181 and the round bar 182 are slightly engaged with the engagement hole 31g of the squeezing plate 31C provided on the reinforcement plate 31B of the support bracket 31, the upper energy-absorbing member 181 is drawn frontward as a result of frontward movement of the steering column 12. In this case, since secondary collision energy is absorbed by means of slight squeeze-deformation of the energy-absorbing member 181 caused by the squeezing plate 31C and the round bar 182 and plastic deformation of the energy-absorbing member 183 caused by the collar 73, an absorption load for secondary collision energy is small.

Figure 64:
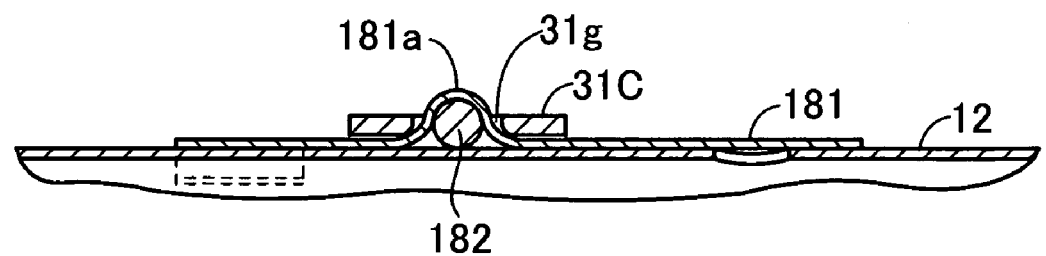
FIG. 64 is an explanatory view for explaining an action in the case where the upper component of the secondary collision load input to the steering column of the steering column assembly shown in FIG. 59 is large.

In the case where the upward component of the secondary collision load input to the steering column 12 is large, as shown in FIG. 64, while the curved portion 181a of the upper energy-absorbing member 181 and the round bar 182 are sufficiently engaged with the engagement hole 31g of the squeezing plate 31C provided on the reinforcement plate 31B of the support bracket 31, the upper energy-absorbing member 181 is drawn frontward as a result of frontward movement of the steering column 12. Thus, the squeezing plate 31C and the round bar 182 cause the energy-absorbing member 181 to be sufficiently squeeze-deformed, and the lower energy-absorbing member 1183 is plastically deformed by means of the collar 73.

In this case, since secondary collision energy is absorbed by means of sufficient squeeze-deformation of the energy-absorbing member 181 caused by the squeezing plate 31C and the round bar 182 and plastic deformation of the energy-absorbing member 183 caused by the collar 73, an absorption load for secondary collision energy is larger than that in the case where the upward component of load is small. In this case, the quantity of squeeze-deformation of the energy-absorbing member 181 caused by the squeezing plate 31C and the round bar 182 varies dependently on the upward component of the secondary collision load input to the steering column 12.

As described above, according to the tenth embodiment, in the event of a secondary collision of the occupant H with the steering system, energy-absorption-load-changing means including the energy-absorbing member 181, the round bar 182, and the squeezing plate 31C provided on the reinforcement plate 31B of the support bracket 31 in the upper support mechanism A changes an absorption load for secondary collision energy in accordance with the direction and load of a secondary collision of the occupant H with the steering system. In other words, the tenth embodiment can be mechanically implemented by means of appropriately setting, for example, the shape of the energy-absorbing member 181, the shape of the round bar 182, and the shape and arrangement of the squeezing plate 31C provided on the reinforcement plate 31B of the support bracket 31 in the upper support mechanism A, without need to employ electrical control, whose cost is high, and thus at low cost.

The invention claimed is:

1. An impact-absorbing steering column apparatus comprising collision-energy-absorbing means for absorbing secondary collision energy of an occupant in the event of a collision of a vehicle, the collision-energy-absorbing means comprising energy-absorption-load-changing means for changing an absorption load for the secondary collision energy, and the energy-absorption-load-changing means being adapted to change the absorption load in accordance with displacement of a steering column in at least a first direction when a secondary collision of the occupant with a steering column occurs in a first direction and a second direction when the secondary collision of the occupant with the steering column occurs in a second direction.

2. An impact-absorbing steering column apparatus comprising collision-energy-absorbing means for absorbing secondary collision energy of an occupant in the event of a collision of a vehicle, the collision-energy-absorbing means comprising energy-absorption-load-changing means for changing an absorption load for the secondary collision energy, and the energy-absorption-load-changing means being adapted to change an absorption load path in accordance with displacement of a steering column in a direction intersecting a direction of relative movement of the steering column for absorbing collision energy induced by a secondary collision of the occupant.

3. An impact-absorbing steering column apparatus as described in claim 1, wherein the energy-absorption-load-changing means changes the absorption load in accordance with a mode of displacement of the steering column.

4. An impact-absorbing steering column apparatus as described in claim 3, wherein the energy-absorption-load-changing means comprises an energy-absorbing member, and engagement means capable of engaging with the energy-absorbing member, and an engagement relation between the energy-absorbing member and the engagement means varies in accordance with a mode of displacement of the steering column, thereby changing the absorption load.

5. An impact-absorbing steering column apparatus as described in claim 4, wherein the engagement means is squeezing means for squeezing the energy-absorbing member; the energy-absorbing member has an energy-absorbing portion, which is squeezed by the squeezing means to thereby absorb energy; and an engagement relation between the squeezing means and the energy-absorbing portion varies in accordance with a mode of displacement of the steering column, thereby changing the absorption load.

6. An impact-absorbing steering column apparatus as described in claim 4, wherein the engagement means is squeezing means for squeezing the energy-absorbing member; the energy-absorbing member has a plurality of energy-absorbing portions that differ in energy absorption load in relation to the squeezing means; and an engagement relation between the squeezing means and one of the plurality of energy-absorbing portions is selected in accordance with a mode of displacement of the steering column, thereby changing the absorption load.

7. An impact-absorbing steering column apparatus as described in claim 4, wherein the engagement means is squeezing means for squeezing the energy-absorbing member; the squeezing means has a plurality of squeezing portions that differ in the quantity of squeeze in squeezing the energy-absorbing member; and an engagement relation between the energy-absorbing member and one of the plurality of squeezing portions is selected in accordance with a mode of displacement of the steering column, thereby changing the absorption load.

8. An impact-absorbing steering column apparatus as described in claim 4, wherein the energy-absorbing member is a linear member capable of engaging with the engagement means; the engagement means is engaged with or is not engaged with the linear member in accordance with a mode of displacement of the steering column, thereby changing the absorption load.

9. An impact-absorbing steering column apparatus as described in claim 4, wherein the energy-absorbing member is a plurality of linear members capable of engaging with the engagement means; the number of the linear members to be engaged with the engagement means varies in accordance with a mode of displacement of the steering column, thereby changing the absorption load.

10. An impact-absorbing steering column apparatus as described in claim 4, wherein the steering column comprises the energy-absorbing member, a ball adapted to plastically deform the energy-absorbing member, and ball support means for adjusting the quantity of plastic deformation to be effected by the ball; and the ball support means is moved in accordance with a mode of displacement of the steering column in such a manner as to vary an engagement relation between the energy-absorbing member and the ball in accordance with the mode, thereby changing the absorption load.

11. An impact-absorbing steering column apparatus as described in claim 4, wherein the energy-absorbing member has an elongated groove having a predetermined width; the engagement means is squeezing means assuming a special shape and capable of being displaced in the elongated groove in relation to the energy-absorbing member; and an engagement relation between the special-shape squeezing means and the elongated groove of the energy-absorbing member varies in accordance with a mode of displacement of the steering column, thereby changing the absorption load.

12. An impact-absorbing steering column apparatus as described in claim 4, wherein an energy-absorbing member is provided on either a vehicle-body-side member or the steering column, the energy-absorbing member generating an energy absorption load by means of displacement in relation to either the vehicle-body-side member or the steering column on which the energy-absorbing member is provided; the engagement means capable of engaging with the energy-absorbing member is provided on either the vehicle-body-side member or the steering column on which the energy-absorbing member is not provided; and when the energy-absorbing member is engaged with the engagement means in accordance with a mode of displacement of the steering column, the mode of displacement changing dependently on a secondary collision, the energy-absorbing member incrementally changes the absorption load by means of displacement in relation to either the vehicle-body-side member or the steering column on which the energy-absorbing member is provided.

13. An impact-absorbing steering column apparatus as described in claim 1, wherein the energy-absorption-load-changing means changes the absorption load in accordance with displacement of the steering column, the displacement changing dependently on the direction of a secondary collision of the occupant with the steering system.

14. An impact-absorbing steering column apparatus as described in claim 1, wherein the energy-absorption-load-changing means changes the absorption load in accordance with displacement of the steering column, the displacement changing dependently on the direction of a secondary collision of the occupant with the steering system at an initial stage of the secondary collision.

15. An impact-absorbing steering column apparatus as described in claim 1, wherein when a collision load associated with a secondary collision of the occupant with the steering system is equal to or greater than a predetermined value, the energy-absorption-load-changing means increases the absorption load.

16. An impact-absorbing steering column apparatus as described in claim 1, wherein the energy-absorption-load-changing means increases the absorption load in accordance with such displacement that the steering column tilts upward as a result of a secondary collision of the occupant with the steering system.

17. An impact-absorbing steering column apparatus as described in claim 1, wherein the energy-absorption-load-changing means changes the absorption load in accordance with a displaced position of the steering column, the displaced position changing dependently on the direction of a secondary collision of the occupant with the steering system.

18. An impact-absorbing steering column apparatus as described in claim 1, wherein impact-absorbing means for absorbing a predetermined collision load is provided separately from the collision-energy-absorbing means.

19. An impact-absorbing steering column apparatus as described in claim 1, wherein the collision-energy-absorbing means selectively produces the absorption load, or changes the magnitude of the absorption load.

20. An impact-absorbing steering column apparatus as described in claim 1, wherein in accordance with a load pressing the steering column against a vehicle-body-side member and a load of moving the steering column toward the front of the vehicle, the loads changing dependently on a secondary collision of the occupant with the steering system, deformation of an energy-absorbing member provided on either the steering column or the vehicle-body-side member is passively changed by engagement means provided on either the steering column or the vehicle-body-side member on which the energy-absorbing member is not provided, whereby the energy-absorption-load-changing means changes the absorption load.

21. An impact-absorbing steering column apparatus as described in claim 20, wherein the engagement means is formed on the vehicle-body-side member; the energy-absorbing member is provided on the steering column in opposition to the engagement means and assumes an elongated shape extending along an axis of the steering column; and the engagement means provided on the vehicle-body-side member causes the deformation of the energy-absorbing member provided on the steering column.

22. An impact-absorbing steering column apparatus as described in claim 20, wherein only when a collision load imposed on the vehicle-body-side member from the steering column is equal to or greater than a predetermined value, abutment between the engagement means and the energy-absorbing member is enabled.

23. An impact-absorbing steering column apparatus as described in claim 1, wherein in the event of a secondary collision, the steering column is allowed to be displaced in such a manner as to tilt toward a vehicle-body-side member.

24. An impact-absorbing steering column apparatus as described in claim 1, wherein the absorption load is increased with a load of pressing the steering column against a vehicle-body-side member.

25. An impact-absorbing steering column apparatus as described in claim 1, wherein impact-absorbing means for absorbing a predetermined collision load is provided separately from the collision-energy-absorbing means.

* * * * *